US010691637B2

(12) United States Patent
Badey et al.

(10) Patent No.: US 10,691,637 B2
(45) Date of Patent: Jun. 23, 2020

(54) MANAGEMENT OF CLONED OBJECTS IN FILE SYSTEMS

(71) Applicant: Hitachi Vantara LLC, Santa Clara, CA (US)

(72) Inventors: Zahra Badey, Palo Alto, CA (US); Daniel Picken, Palo Alto, CA (US); Jon Smith, Bracknell (GB); Chris Aston, Hughenden Valley (GB); Joseph Smith, Reading (GB); Namita Lal, Palo Alto, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 279 days.

(21) Appl. No.: 15/522,307

(22) PCT Filed: Feb. 5, 2015

(86) PCT No.: PCT/IB2015/000603
§ 371 (c)(1),
(2) Date: Apr. 27, 2017

(87) PCT Pub. No.: WO2016/124959
PCT Pub. Date: Aug. 11, 2016

(65) Prior Publication Data
US 2018/0267985 A1 Sep. 20, 2018

(51) Int. Cl.
G06F 16/11 (2019.01)
G06F 16/16 (2019.01)
G06F 16/178 (2019.01)
G06F 16/182 (2019.01)
G06F 16/22 (2019.01)

(52) U.S. Cl.
CPC .......... *G06F 16/128* (2019.01); *G06F 16/162* (2019.01); *G06F 16/178* (2019.01); *G06F 16/184* (2019.01); *G06F 16/2246* (2019.01)

(58) Field of Classification Search
CPC .. G06F 16/128; G06F 16/162; G06F 16/2246; G06F 16/184; G06F 16/178
See application file for complete search history.

(56) References Cited

U.S. PATENT DOCUMENTS 7,457,822 B1    11/2008  Barrall et al.
8,412,688 B1 *  4/2013   Armangau ............ G06F 16/128
                                                      707/695

(Continued)

OTHER PUBLICATIONS

International Search Report of PCT/IB2015/000603 dated Oct. 19, 2015.

*Primary Examiner* — Mohammed R Uddin
*Assistant Examiner* — Mohammad Solaiman Bhuyan
(74) *Attorney, Agent, or Firm* — Mattingly & Malur, PC

(57) ABSTRACT

The present disclosure relates to management of cloned objects and corresponding snapshot objects in file systems by a file server. Aspects may relate to one or more processes for managing file system objects of a file system in a data storage system comprising a file system server, wherein the file system server comprises: a computer system including a processor configured to execute an operating system and further software components executed on the operating system, and a programmable logic device interfacing with the computer system and including a file system management unit configured to manage a file system.

12 Claims, 38 Drawing Sheets

(56) References Cited

U.S. PATENT DOCUMENTS

| | | | |
|---|---|---|---|
| 9,442,955 B1* | 9/2016 | Pawar | G06F 17/00 |
| 10,216,757 B1* | 2/2019 | Armangau | G06F 16/178 |
| 2012/0130949 A1 | 5/2012 | Picken et al. | |
| 2014/0324925 A1* | 10/2014 | Krishnamurthy | G06F 16/162 |
| | | | 707/822 |
| 2016/0034356 A1* | 2/2016 | Aron | G06F 16/2246 |
| | | | 707/649 |

* cited by examiner

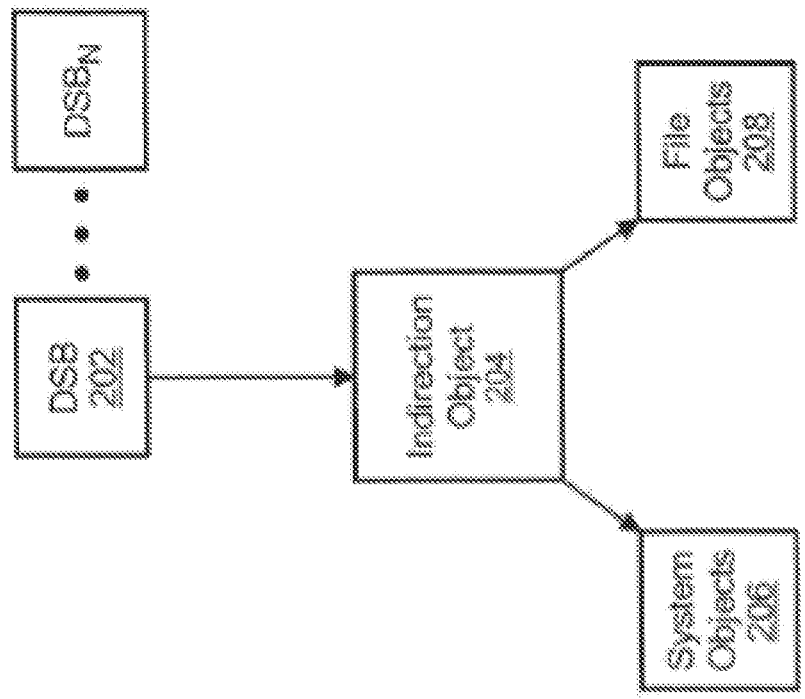
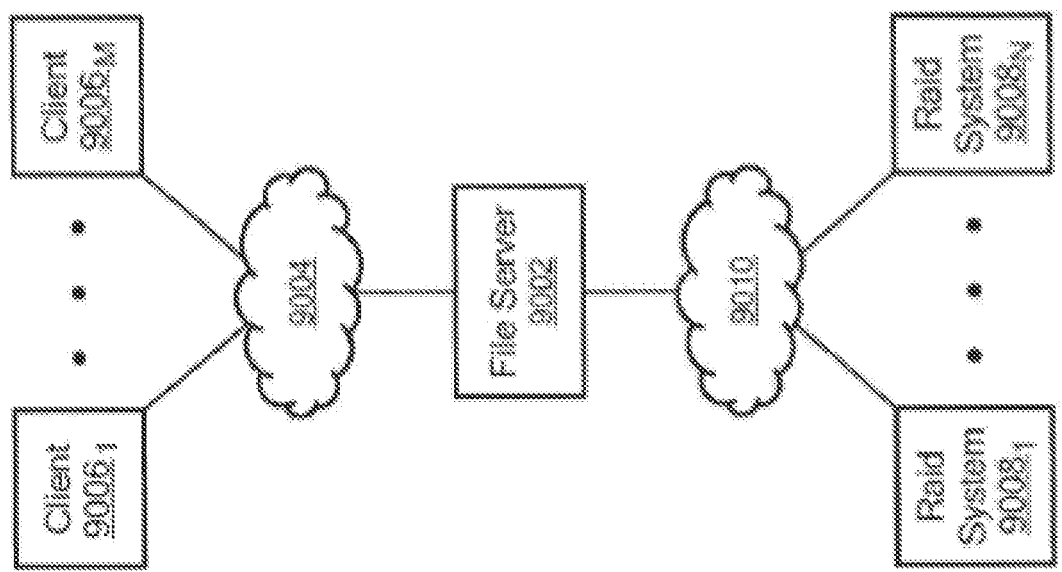

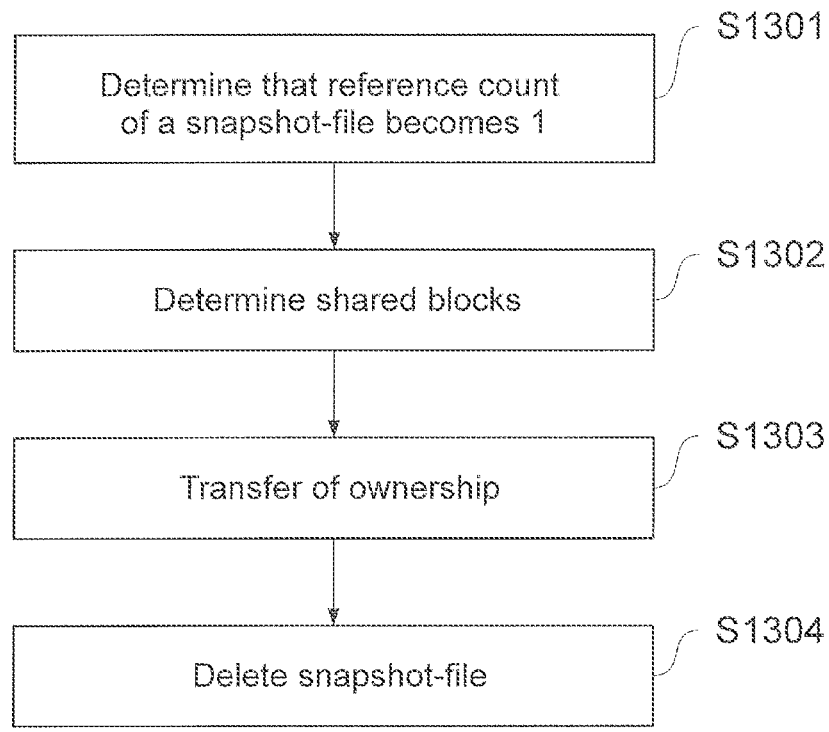
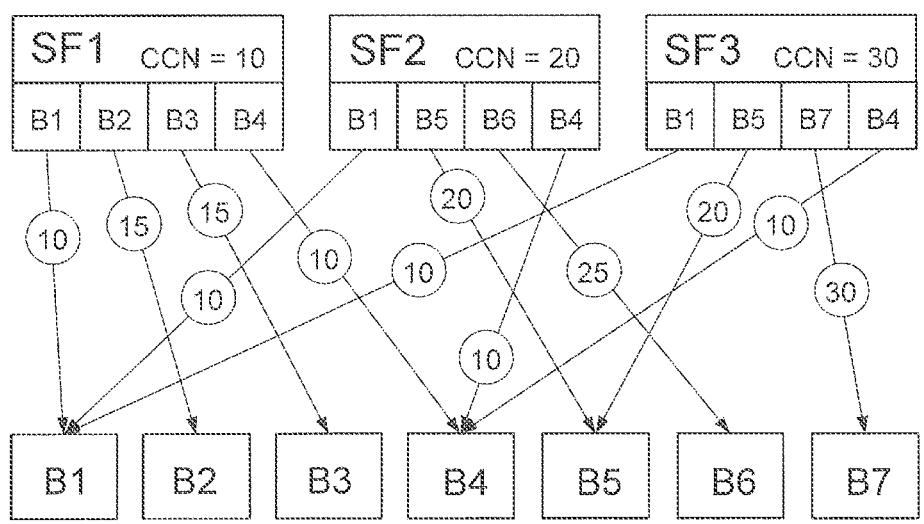

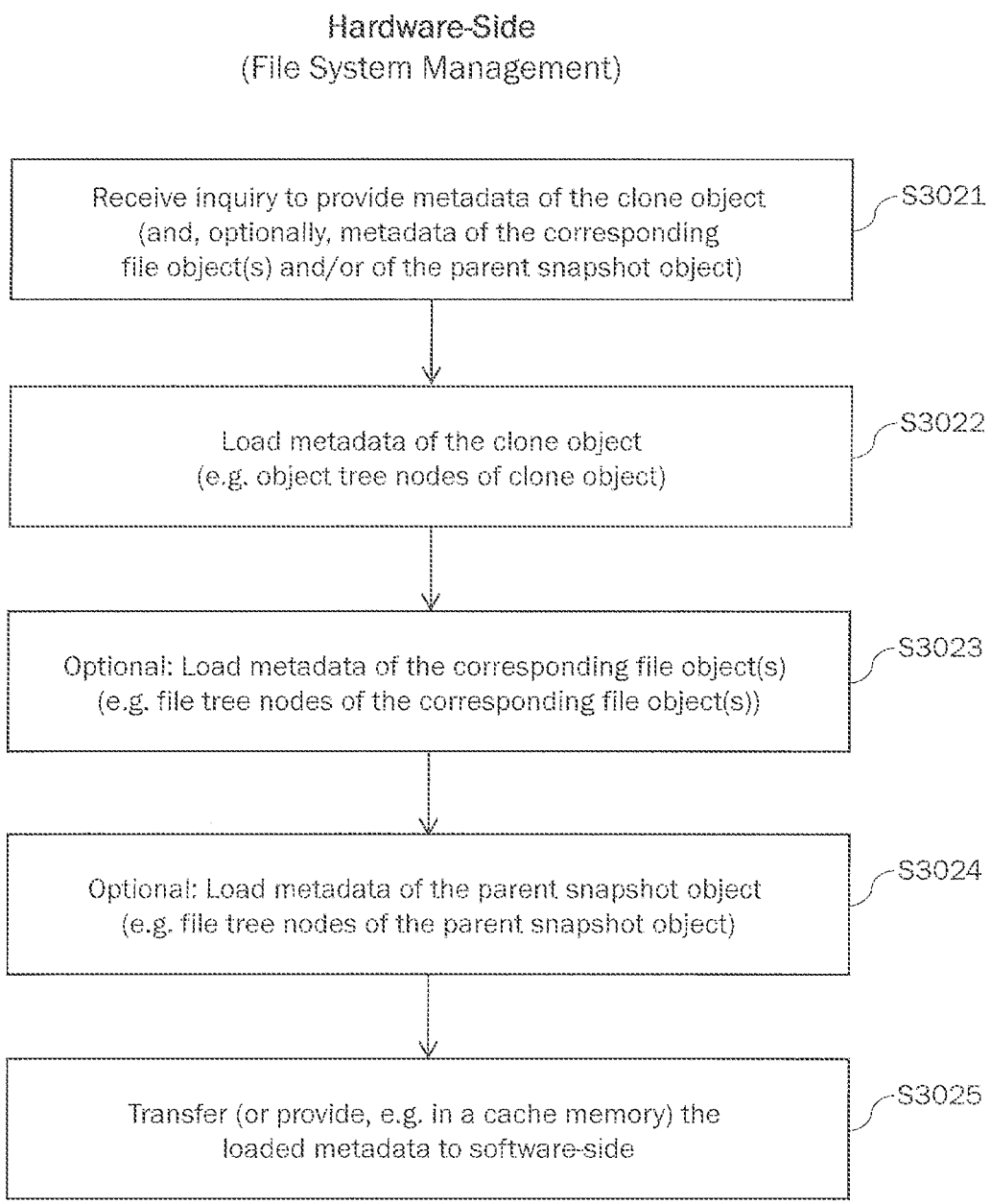

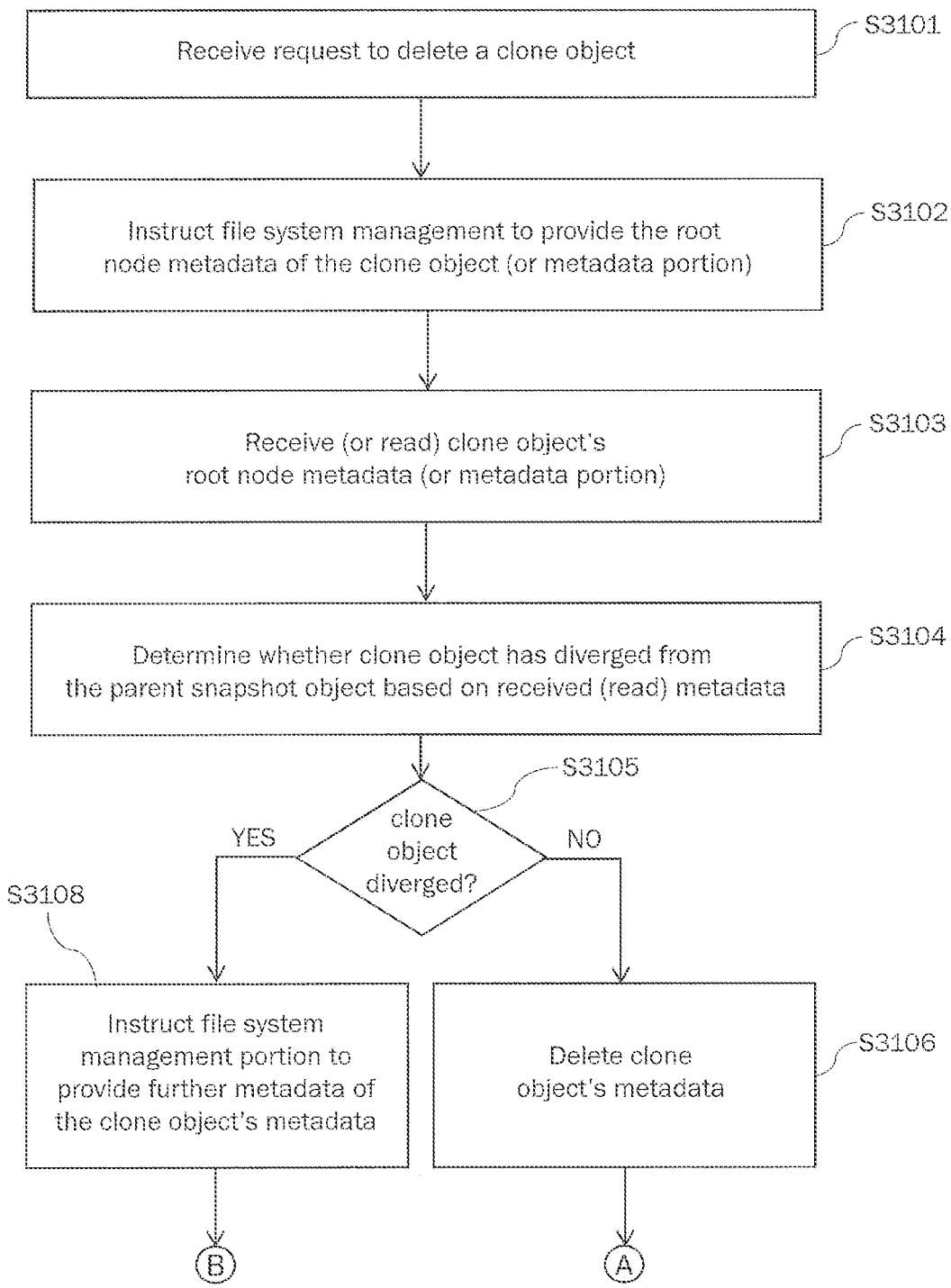

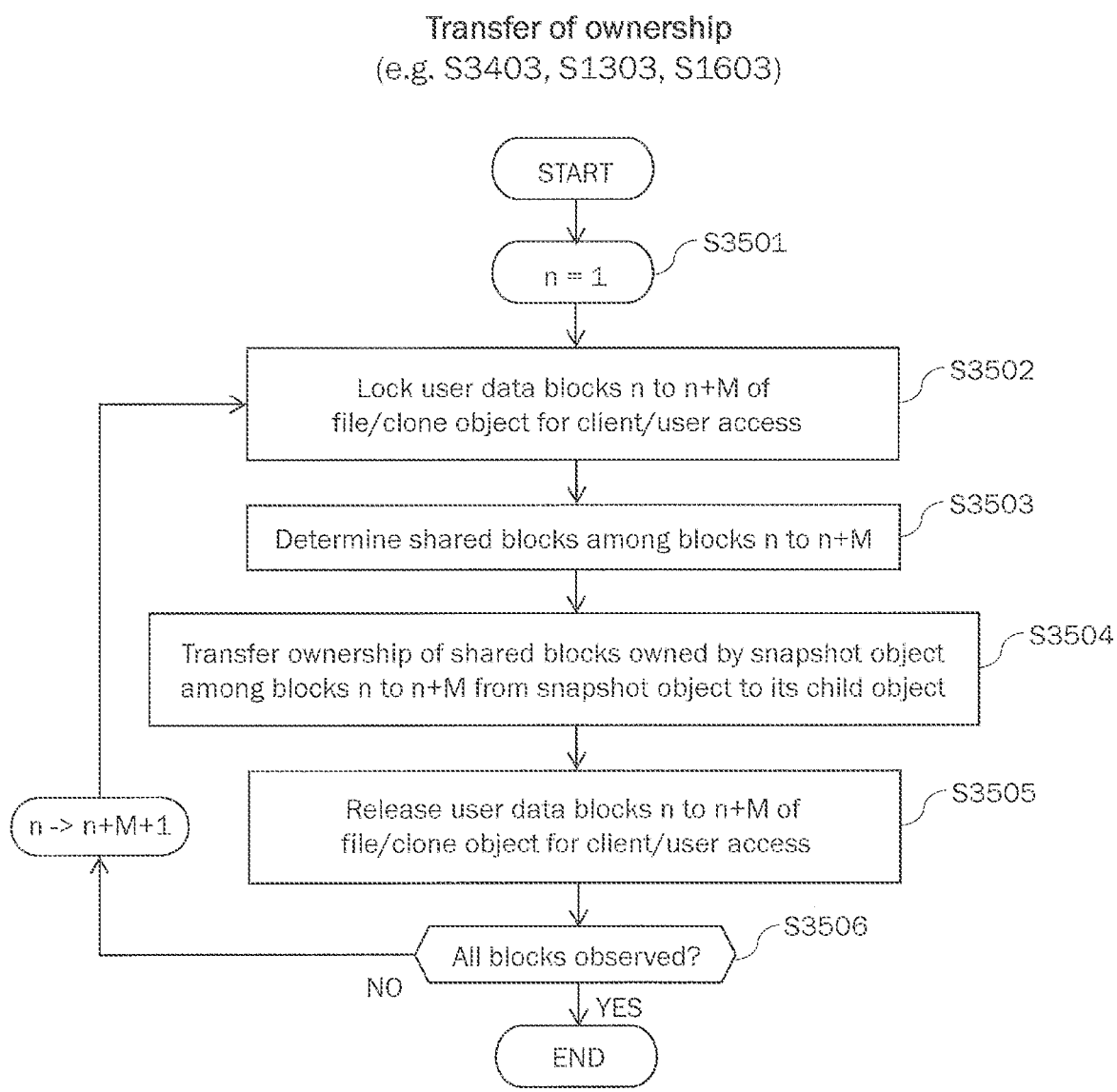

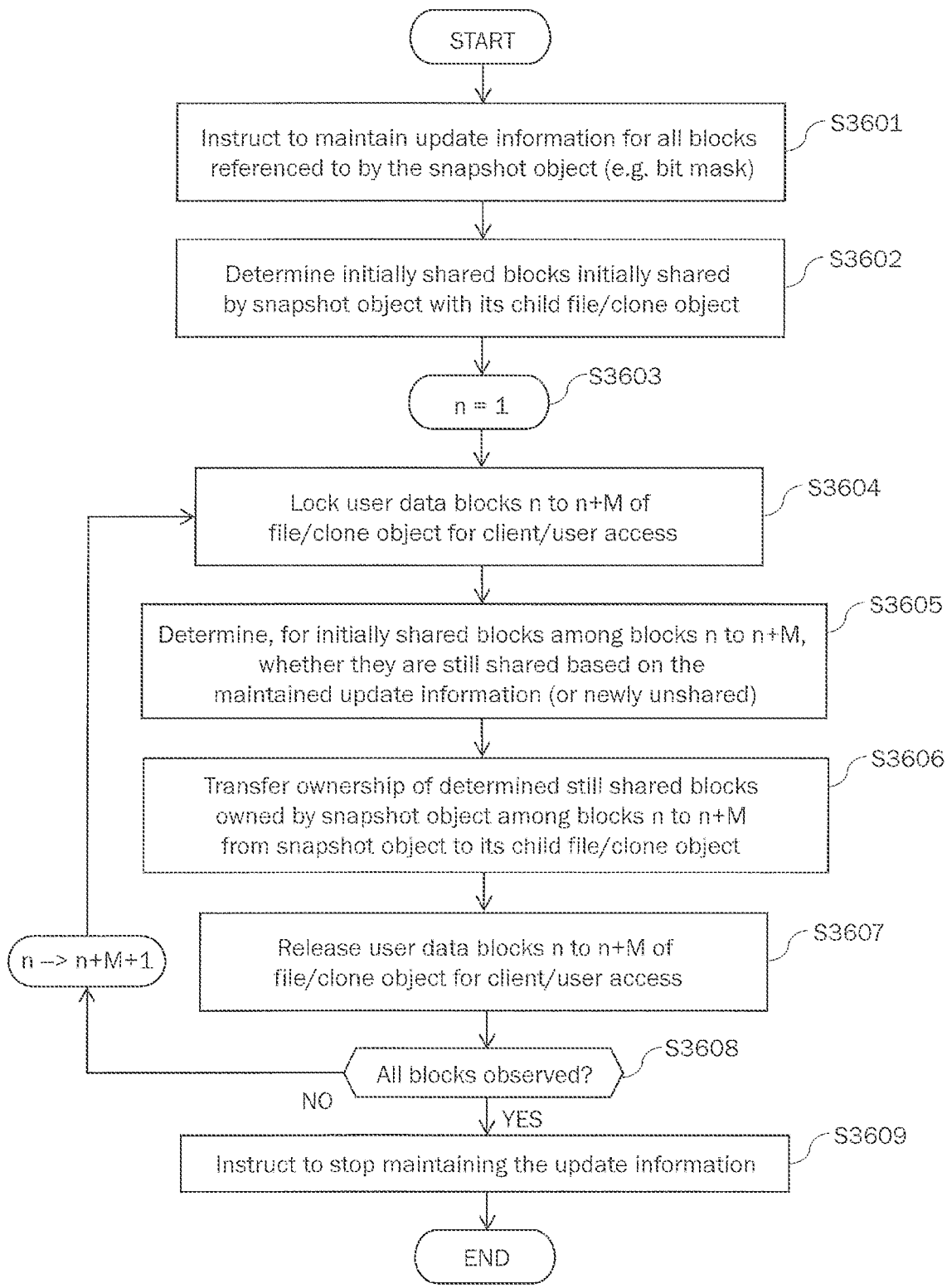

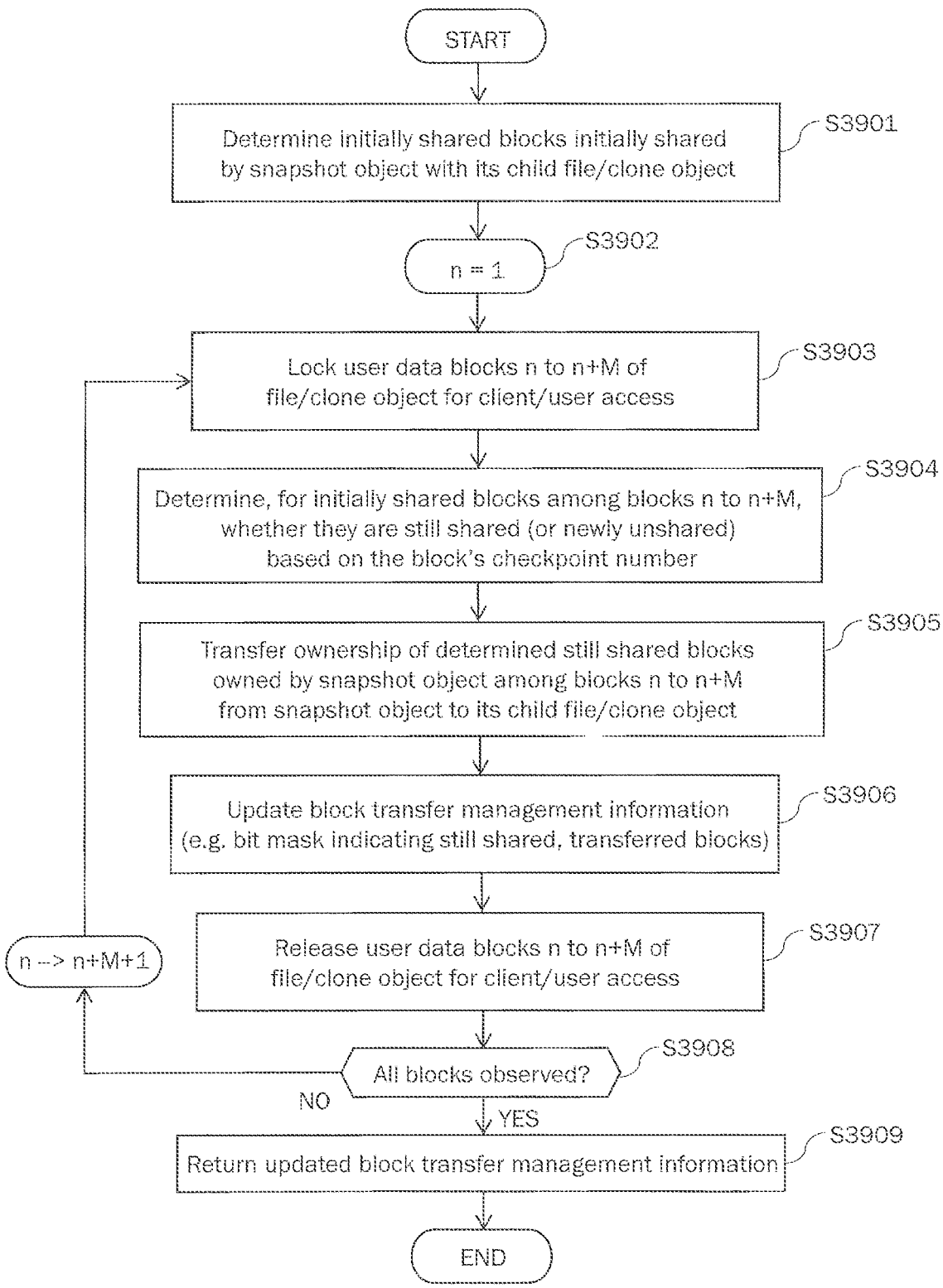

MANAGEMENT OF CLONED OBJECTS IN FILE SYSTEMS

The present specification relates to management of file system(s) in particular for management of cloned objects in file system(s), and in relation to, in particular, aspects of deleting clones, transfer of ownership, removing a snapshot-file and/or changing parent snapshot-files of snapshot-files in the file system(s), in particular for de-cloning of snapshot-files in the file system.

Aspects and exemplary embodiments may relate to computer program products and methods of managing one or more file systems, and apparatus, file servers, and data storage systems for managing one or more file systems, in particular for management of cloned objects in file system(s).

BACKGROUND

Recently, an approach for cloning (and de-cloning of files in a file system) was described in US 2012/0130949 A1 which relates to a file cloning mechanism that allows for quickly creating copies (clones) of files within a file system, such as when a user makes a copy of a file. A clone of a source object can be at least initially represented by a structure containing references to various elements of the source object (e.g., indirect nodes, direct nodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct nodes) associated with the source file need to be copied at the time the clone is created. Also, at appropriate times, cloned files may be "de-cloned." The contents of US 2012/0130949 A1 are herewith incorporated by reference and the mechanism will be summarized in more detail below.

In a data storage system, some or all objects of a file system (e.g. a source file system) may be replicated to another file system (exemplarily referred to herein as the "target file system"), for example, to allow for archiving, backup, maintenance, or disaster recovery. Unlike data mirroring, where data is stored in two separate locations, replication of data may generally involve the creation of a copy of a source object in the target file system, wherein the target object may be stored in a manner that is quite different from the manner in which the source object is stored.

For example, the source object may be stored in non-contiguous blocks while the target object may be stored in contiguous blocks because all blocks for the target object may be allocated at one time whereas the blocks for the source object may have been allocated over an extended period of time and hence may have been allocated from different areas of storage.

Generally speaking, file system replication can be performed at the file level or at the object (sub-file) level. Examples of file-level and object-level replication are discussed generally in Hitachi NAS Platform Software: BlueArc® JetMirror datasheet available from Hitachi Data Systems.

Clone files may often be handled like any other regular files during an object-based replication and therefore may be replicated as a deep copy on the target file system. Such deep copying of the clone files results in creating clone files that do not share any data blocks with their snapshot-files, thus increasing their storage cost on the target file system.

A method of managing a file system and particularly for managing snapshots of a file system is described in U.S. Pat. No. 8,356,013 B2. However, the term "snapshot" as used for images of a file system at a certain point in time in the present specification and in the afore-mentioned document is to be distinguished clearly from what is meant by terms such as "snapshot object", "snapshot file" or "snapshot-file object" in the context of the present specification (being a file or a file system object being managed similar to files or file objects of the file system).

SUMMARY

Aspects and exemplary embodiments may relate to a computer program product comprising computer-readable program instructions which, when running on or loaded into a file system server of computer connected to a file system server or when being executed by one or more processors or processing units of the file system server or the computer, cause the file system server to execute a method for managing file system objects of a file system in a data storage system comprising the file system server; wherein the file system server comprises: a computer system including a processor configured to execute an operating system and further software components executed on the operating system (e.g. a first-type processing device including at least one processor configured to execute one or more computer program stored in a memory of the first-type processing device; software-sided processing section), and a programmable logic device interfacing with the computer system and including a file system management unit configured to manage a file system (e.g. a second-type processing device including at least one programmable hardware-implemented chip; hardware-sided processing section).

Aspects and exemplary embodiments may relate computer program product comprising computer-readable program instructions which, when running on or loaded into a file system server or computer connected to a file system server or when being executed by one or more processors or processing units of the file system server or the computer, cause the file system server to execute a method comprising: managing, by the programmable logic device, a first file system object of the file system on the basis of metadata being indicative of a first object tree structure including a plurality of metadata nodes and a second file system object of the file system on the basis of metadata being indicative of a second object tree structure including a plurality of metadata nodes, the first object tree structure having one or more portions being diverged with respect to the second object tree structure and/or one or more portions being shared with respect to the second object tree structure; obtaining, by the programmable logic device, first object tree structure information being associated with metadata of the first file system object, determining, by the programmable logic device, diverged portions of metadata of the first object tree structure at least based on the obtained first object tree structure information, and/or providing, by the programmable logic device, the determined diverged portions of metadata of the first object tree structure for deletion of the first file system object.

In some exemplary embodiments, determining, by the programmable logic device, diverged portions of metadata of the first object tree structure based on the obtained first object tree structure information includes determining, for one or more metadata nodes of the first object tree structure, whether the respective metadata node is shared with the second object tree structure, wherein in particular the respective metadata node is determined to be diverged with respect to the second object tree structure if the respective metadata node is determined to not be shared with the second object tree structure.

In some exemplary embodiments, determining whether the respective metadata node of the first object tree structure is shared with the second object tree structure is based on a comparison of a first-type checkpoint number associated with the first file system object, in particular with a time or checkpoint of cloning (or creation in connection with cloning of another file object) of the first file system object, and a second-type checkpoint number associated with the respective metadata node and/or associated with a pointer of another metadata node of the first object tree structure pointing to the respective metadata node.

Please note that in some embodiments, the time of cloning is not necessarily the time of creation. For example, when a file object is cloned, the file object itself may become a clone object, or one of two or more clone objects, and its cloned-in-checkpoint number (first-type checkpoint number) may be set greater than its creation checkpoint (e.g. indicated by a second-type checkpoint number).

In some exemplary embodiments, determining whether the respective metadata node of the first object tree structure is shared with the second object tree structure is based on a comparison of at least portions of the first and second object tree structure.

In some exemplary embodiments, the comparison of at least portions of the first and second object tree structures is successively performed for each of a plurality of pairs of corresponding portions of the first and second object tree structures.

In some exemplary embodiments, obtaining, by the programmable logic device, first object tree structure information being associated with metadata of the first file system object is successively performed for a plurality of portions of the first object tree structure, and/or the programmable logic device refrains from obtaining first object tree structure information being associated with a second portion of the first object tree structure if it is determined that the second portion of the first object tree structure is a shared portion based on obtained first object tree structure information being associated with a first portion of the first object tree structure.

In some exemplary embodiments, the method may further comprise: requesting, by the computer system, the programmable logic device to provide at least one or more portions of the first object tree structure information, wherein the programmable logic device provides, in response to the request, determined diverged portions of metadata of the first object tree structure for deletion of the first file system object.

In some exemplary embodiments, the method may further comprise: obtaining, by the computer system, at least portions of root node metadata of the first object tree structure, and/or determining, by the computer system, whether the obtained portions of obtained root node metadata of the first object tree structure indicates that the remaining metadata portions of the first object tree structure are shared with the second object tree structure, wherein requesting, by the computer system, the programmable logic device to provide at least portions of the first object tree structure information may be performed if the remaining metadata portions of the first object tree structure are indicated to include at least one diverged portion of metadata of the first object tree structure.

In some exemplary embodiments, the method may further comprise: deleting the first file system object if the obtained portions of obtained root node metadata of the first object tree structure indicates that the remaining metadata portions of the first object tree structure are shared with the second object tree structure; or successively truncating the first file system object if the obtained portions of obtained root node metadata of the first object tree structure indicates that the remaining metadata portions of the first object tree structure include at least one diverged portion of metadata of the first object tree structure based on the provided first object tree structure information.

Aspects and exemplary embodiments may relate to computer program product comprising computer-readable program instructions which, when running on or loaded into a file system server of computer connected to a file system server or when being executed by one or more processors or processing units of the file system server or the computer, cause the file system server to execute a method for managing file system objects of a file system in a data storage system comprising the file system server; wherein the file system server comprises: a computer system including a processor configured to execute an operating system and further software components executed on the operating system, and a programmable logic device interfacing with the computer system and including a file system management unit configured to manage a file system; the method performing to remove a parent snapshot object referencing a single child object, comprising: identifying one or more data blocks which are owned by the parent snapshot object and which are shared between the parent snapshot object and its child object, transferring ownership of the identified data blocks from the parent snapshot object to its child object, and/or deleting at least portions of the parent snapshot object after performing the transfer of ownership, wherein deleting at least portions of the parent snapshot object may comprise preserving data of one or more data blocks which are still owned by the parent snapshot object after performing the transfer of ownership, if the respective one or more data blocks are related to a previous snapshot of the file system managed by the file system server.

In some exemplary embodiments, deleting at least portions of the parent snapshot object comprises freeing one or more data blocks which are still owned by the parent snapshot object after performing the transfer of ownership, if the respective one or more data blocks are not related to the previous snapshot of the file system managed by the file system server.

In some exemplary embodiments, the method may further comprise: relocating data of one or more data blocks which are still owned by the parent snapshot object after performing the transfer of ownership, if the respective one or more data blocks are related to the previous snapshot of the file system managed by the file system server, and/or freeing the respective one or more data blocks after relocating the data; and/or determining whether data blocks, which are still owned by the parent snapshot object after performing the transfer of ownership, are related to the previous snapshot of the file system based on a comparison of their associated block pointer's second-type checkpoint numbers and a second-type checkpoint number being associated with the previous snapshot of the file system.

Aspects and exemplary embodiments may relate to computer program product comprising computer-readable program instructions which, when running on or loaded into a file system server of computer connected to a file system server or when being executed by one or more processors or processing units of the file system server or the computer, cause the file system server to execute a method for managing file system objects of a file system in a data storage system comprising the file system server; wherein the file system server comprises: a computer system including a processor configured to execute an operating system and further software components executed on the operating system, and a programmable logic device interfacing with the computer system and including a file system management unit configured to manage a file system; the method performing to remove a parent snapshot object referencing a single child object, comprising: identifying one or more data blocks which are owned by the parent snapshot object and which are shared between the parent snapshot object and its child object, transferring ownership of the identified data blocks from the parent snapshot object to its child object, and/or deleting at least portions of the parent snapshot object after performing the transfer of ownership, wherein transferring ownership of the identified data blocks from the parent snapshot object to its child object may be performed successively for plural groups of data blocks, the method preferably comprising, for each group of data blocks, holding off client access to the data blocks of the respective group of data blocks before transferring ownership of the data blocks of the respective group of data blocks.

In some exemplary embodiments, the method may further comprise: for each group of data blocks, releasing the data blocks of the respective group of data blocks for client access after transferring ownership of the data blocks of the respective group of data blocks and/or before transferring ownership of data blocks of a next group of data blocks.

In some exemplary embodiments, identifying one or more data blocks which are owned by the parent snapshot object and which are shared between the parent snapshot object and its child object include: identifying, by the computer system or the programmable logic device, one or more data blocks which are owned by the parent snapshot object and which are initially shared between the parent snapshot object prior to holding off client access to the respective data blocks, and/or identifying, preferably by the programmable logic device, among the identified initially shared data blocks, one or more data blocks which are no longer shared between the parent snapshot object and its child object based on a second-type checkpoint number being associated with the respective data block, wherein transferring ownership from the parent snapshot object to its child object is preferably performed for the initially identified data blocks which are determined to be still shared when identifying, among the identified initially shared data blocks, one or more data blocks which are no longer shared between the parent snapshot object and its child object.

For example, ownership transfer (transfer of ownership) of a set of blocks may involve touching the blocks/block pointers by the programmable logic device in the child object based on a first instruction issued from the software-side/computer system, and then touching the respective blocks by the programmable logic device in the parent snapshot object based on a second instruction issued from the software-side/computer system. The programmable logic device may be configured in some preferred exemplary embodiments to identify, e.g. upon receiving the first instruction which may identify the initially shared blocks, the blocks that remained shared (i.e. are still shared) when/before touching the child object, e.g. to only touch the determined still shared blocks/block pointers, and to provide the software-side/computer system with information in return to the first instruction about which are the actually touched (i.e. still shared) blocks. The software-side/computer-system then may issues another inquiry (e.g. the second instruction) to the programmable logic device to touch the same blocks in the parent snapshot object e.g. based on the information (e.g. bit mask indicating the actually touched blocks or actually still shared blocks) returned after the first instruction.

Aspects and exemplary embodiments may relate to method for managing file system objects of a file system in a data storage system comprising a file system server, wherein the file system server comprises: a computer system including a processor configured to execute an operating system and further software components executed on the operating system, and a programmable logic device interfacing with the computer system and including a file system management unit configured to manage a file system; the method comprising: managing, by the programmable logic device, a first file system object of the file system on the basis of metadata being indicative of a first object tree structure including a plurality of metadata nodes and a second file system object of the file system on the basis of metadata being indicative of a second object tree structure including a plurality of metadata nodes, the first object tree structure having one or more portions being diverged with respect to the second object tree structure and/or one or more portions being shared with respect to the second object tree structure, obtaining, by the programmable logic device, first object tree structure information being associated with metadata of the first file system object, determining, by the programmable logic device, diverged portions of metadata of the first object tree structure at least based on the obtained first object tree structure information, and/or providing, by the programmable logic device, the determined diverged portions of metadata of the first object tree structure for deletion of the first file system object.

Aspects and exemplary embodiments may relate to method for managing file system objects of a file system in a data storage system comprising a file system server, wherein the file system server comprises: a computer system including a processor configured to execute an operating system and further software components executed on the operating system, and a programmable logic device interfacing with the computer system and including a file system management unit configured to manage a file system; the method performing to remove a parent snapshot object referencing a single child object, comprising: identifying one or more data blocks which are owned by the parent snapshot object and which are shared between the parent snapshot object and its child object, transferring ownership of the identified data blocks from the parent snapshot object to its child object, and/or deleting at least portions of the parent snapshot object after performing the transfer of ownership, wherein deleting at least portions of the parent snapshot object may comprise preserving data of one or more data blocks which are still owned by the parent snapshot object after performing the transfer of ownership, if the respective one or more data blocks are related to a previous snapshot of the file system managed by the file system server.

Aspects and exemplary embodiments may relate to method for managing file system objects of a file system in a data storage system comprising a file system server, wherein the file system server comprises: a computer system including a processor configured to execute an operating system and further software components executed on the operating system, and a programmable logic device interfacing with the computer system and including a file system management unit configured to manage a file system; the method performing to remove a parent snapshot object referencing a single child object, comprising: identifying one or more data blocks which are owned by the parent snapshot object and which are shared between the parent snapshot object and its child object, transferring ownership of the identified data blocks from the parent snapshot object to its child object, and/or deleting at least portions of the parent snapshot object after performing the transfer of ownership, wherein transferring ownership of the identified data blocks from the parent snapshot object to its child object is preferably performed successively for plural groups of data blocks, the method preferably comprising, for each group of data blocks, holding off client access to the data blocks of the respective group of data blocks before transferring ownership of the data blocks of the respective group of data blocks.

Aspects and exemplary embodiments may relate to an apparatus, in particular file system server, for managing file system objects of a file system in a data storage system comprising a file system server, the apparatus being configured to execute at least one of the methods above.

The above-described embodiments and aspects can be combined or provided as independent aspects. In particular, the present specification discloses various independent aspects and embodiments in connection with deleting clones, transfer of ownership, removing a snapshot-file and/or changing parent snapshot-files of snapshot-files in the file system, in particular for de-cloning of snapshot-files in the file system, independent of whether replication is involved or not. Furthermore, the present specification discloses various independent aspects and embodiments in connection with performing a transfer of ownership in the file system independent of whether replication is involved or not, and independent of whether the ownership is transferred from a snapshot-file to another snapshot-file or to a live file/clone. Furthermore, the present specification discloses various independent aspects and embodiments in connection with performing deletion of one or more clone objects in the file system independent of whether replication is involved or not, and independent of aspects of transfer of ownership.

BRIEF DESCRIPTION OF DRAWINGS

FIG. 7 is an exemplary schematic block diagram of a file storage system in accordance with an exemplary embodiment of the present invention;

FIG. 8 is an exemplary schematic block diagram showing the general format of a file system in accordance with an exemplary embodiment of the present invention;

FIG. 21 is an exemplary logic flow diagram schematically showing removing a snapshot-file and/or changing a parent snapshot-file in accordance with exemplary embodiments;

FIGS. 22A to 22C exemplarily illustrate an example of transfer of ownership in accordance with exemplary embodiments;

FIG. 25B is an exemplary logic flow diagram schematically illustrating an exemplary partial process of deleting a cloned object according to exemplary embodiments;

FIG. 30 is an exemplary logic flow diagram schematically illustrating another exemplary process of transferring ownership according to exemplary embodiments;

FIG. 31A is another exemplary logic flow diagram schematically illustrating another exemplary process of transferring ownership according to exemplary embodiments;

FIG. 31B is another exemplary logic flow diagram schematically illustrating another exemplary process of transferring ownership according to exemplary embodiments;

DETAILED DESCRIPTION OF EMBODIMENTS AND THE ACCOMPANYING DRAWINGS

Figure 1:
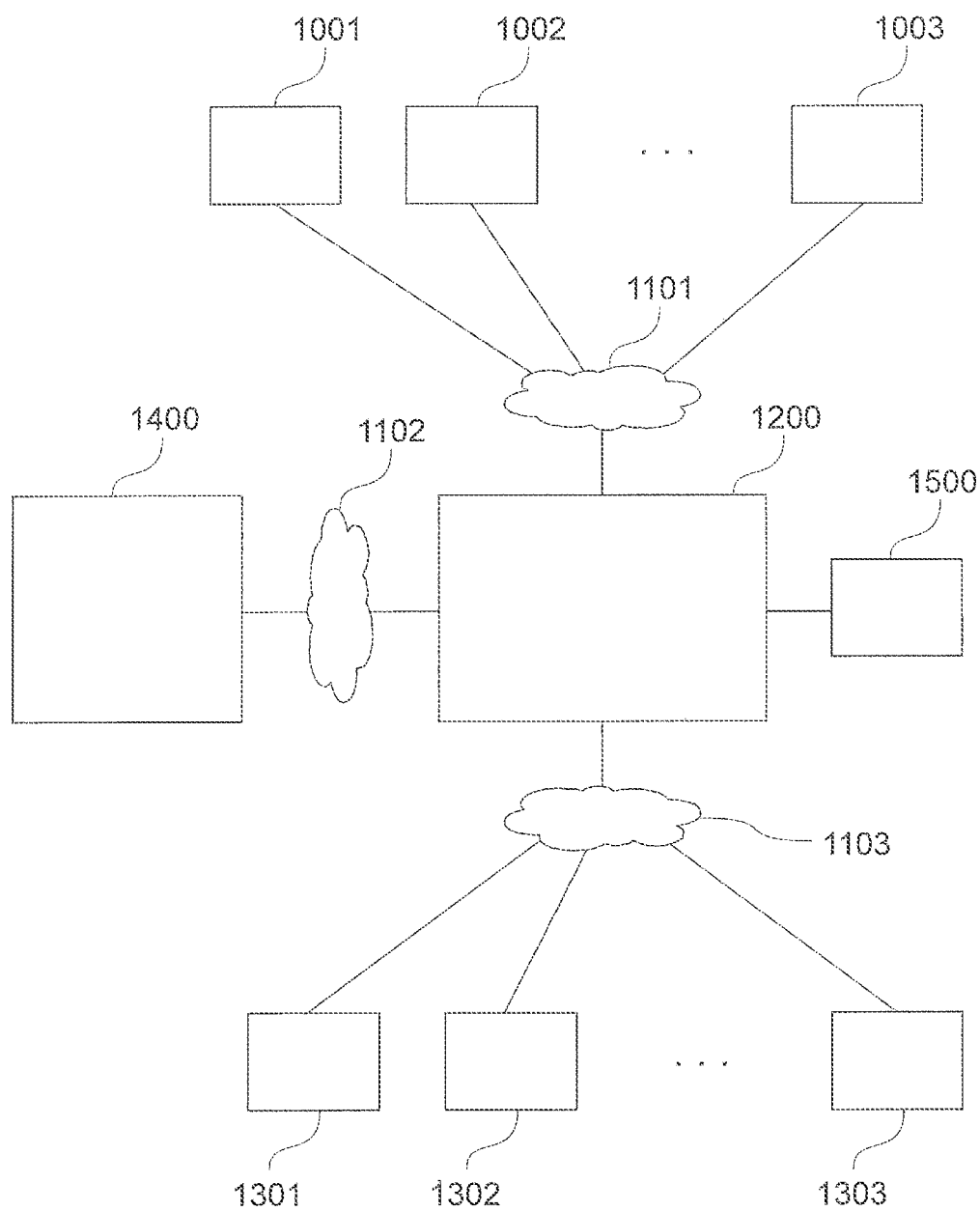
FIG. 1 is an exemplary schematic diagram showing a data storage system according to an exemplary embodiment of the present invention.

In the following, preferred aspects and exemplary embodiments will be described in more detail with reference to the accompanying figures. Same or similar features in different drawings and embodiments are sometimes referred to by similar reference numerals. It is to be understood that the detailed description below relating to various preferred aspects and preferred embodiments are not to be meant as limiting the scope of the present invention.

1. Terminology

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs referred to as ranges, stripesets, and spans. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

A "snapshot-file" or "SF" is a file system object that is created as part of an object cloning process e.g. as described in US 2012/0130949 A1 which is hereby incorporated herein by reference in its entirety, and as used in some embodiments of the present invention. A snapshot-file is a data stream snapshot object generated during the cloning process which takes ownership of the shared user/metadata blocks and is referenced by the clones sharing these user/metadata blocks. In embodiments, snapshot-files are hidden file system objects and/or snapshot-files are read-only file system objects.

A "successor" or "child" of a snapshot-file is either a regular file clone (also referred to as a live-file) or another snapshot-file referencing the snapshot-file. If a snapshot-file is the "child" of another snapshot-file, it may be referred to as "child snapshot-file". A child snapshot-file of a child snapshot-file of a certain snapshot-file may be referred to as "indirect successor" of the certain snapshot-file A "parent" or "parent snapshot-file" of a clone or of another snapshot-file is the snapshot-file referenced to by the clone or the other snapshot-file. Accordingly, if a first snapshot-file in a snapshot-file tree references a second snapshot-file, the first snapshot-file represents the "child snapshot-file" and the second snapshot-file represents the "parent snapshot-file". Typically, in embodiments, a "parent snapshot-file" may have no, one or two "child snapshot-files". But other embodiments in which three or more "child snapshot-files" can be supported are feasible.

A "root snapshot-file" is a snapshot-file without a parent. Accordingly, while the "root snapshot-file" may be typically referenced by no, one or two other snapshot-files, the "root snapshot-file" itself does not reference any other snapshot-files.

Since a "child snapshot-file" of a certain "parent snapshot-file" may itself have other respective "child snapshot-file(s)" and/or the "parent snapshot-file" may itself have another respective "parent snapshot-file", multiple snapshot-files may be structured according to a snapshot-file tree having at least two snapshot-files including the single "root snapshot-file" having at least one "child snapshot-file", which may be referenced by another snapshot-file, live-file and/or clone.

An "ancestor snapshot-file" of a certain snapshot-file is an "older" snapshot-file that is directly referenced or indirectly referenced though one or more other snapshot-files by the certain snapshot-file. Accordingly, while the parent of a certain snapshot-file represents an "ancestor snapshot-file" or "ancestor" of the certain snapshot-file, so does the parent of the parent etc, so that the "root snapshot-file" is an ancestor for all other snapshot-files of the snapshot-file tree.

A "snapshot" may represent an image of the file system or a portion thereof, including multiple file system objects, including directories, file objects, clone objects, and/or snapshot objects/snapshot-files, at a certain point in time, i.e. when taking the snapshot (sometimes also referred to as a checkpoint). It is to be noted that the term "snapshot-file"/"snapshot object" is very different to what is referred to as a "snapshot", and in particular the term "snapshot-file"/"snapshot object" refers to an object (file object or hidden file object) of the file system in contrast to the term "snapshot".

A "new snapshot" is the snapshot taken on the source that is being replicated to the target, e.g. a snap shot that is taken currently.

A "previous snapshot" is the latest snapshot (or at least one of the earlier snapshots) that has been replicated to the target file system, e.g. previous to the new snapshot or the next snapshot.

A "new object" or "created object" is an object with a creation checkpoint number greater than the checkpoint number of the previous snapshot.

An "old object" or "unmodified object" is an object with a creation checkpoint number less than or equal to the checkpoint number of the previous snapshot.

A "modified object" is an object having a last modified checkpoint number (representing the last checkpoint in which the object was created or modified) higher than the checkpoint number of the previous snapshot.

A "deleted object" is an object that existed in the previous snapshot and was deleted in the new snapshot.

In the context of this specification, the term "clone" will refer to an object of type regular file or snapshot-file that references a parent snapshot-file.

With respect to a given replication cycle, a "cloned object" is an object that existed as a clone object in the previous replication cycle (and may have been modified, deleted, de-cloned, or gained a new parent snapshot-file object since the previous replication cycle) or has become a clone object since the previous replication cycle (e.g., a newly created clone object or a previously replicated object that has gained the properties of a clone).

A "set" of values may include one or more values.

Headings are used below for convenience and are not to be construed as limiting the present invention in any way.

2. Exemplary File Storage System

Exemplary embodiments of the present invention are described with reference to an exemplary file system of the type used in various file servers e.g. as sold by Hitachi Data Systems and known generally as BlueArc Titan™ and Mercury™ file servers, although it should be noted that various concepts may be applied to other types of file systems.

FIG. 1 exemplarily shows a schematic illustration of a configuration of a data storage system. The data storage system comprises a file system server 1200 connected to at least one host computer (client) and in FIG. 1 exemplarily a plurality of host computers (clients) 1001, 1002 and 1003 via a communication network 1101 (which may be organized and managed as a LAN, for example). The file system server 1200 is further connected to a plurality of storage apparatuses 1301, 1302 and 1303 via another communication network 1103 (which may be organized and managed as a SAN, for example). In other embodiments, only one storage apparatus may be connected to the file system server 1200, or in other embodiments the file system server and the one or more storage apparatuses may be implemented within one single device.

The file system server 1200 is adapted to manage one or a plurality of file systems, each file system being accessible by one or more of the host computers 1001 to 1003, possibly depending on individually set access rights, and, for accessing the one or more file systems, the host computers issue access requests to the file system server 1200.

Such access may include operations such as write new user data (e.g. write new files) and create new directories of the file system(s), read user data (read user data of one or more files), lookup directories, delete user data (such as delete existing files) and delete directories, modify user data (e.g. modify an existing file such as by modifying the file data or extend the file data by adding new user data to the file), create copies of files and directories, create soft links and hard links, rename files and directories etc. Also, the host computers 1001 to 1003 may issue inquiries with respect to metadata of the file system objects (e.g. metadata on one or more files and metadata on one or more directories of the file systems).

The file system server 1200 manages the access requests and inquiries issued from the host computers 1001 to 1003, and the file system server 1200 manages the file systems that are accessed by the host computers 1001 to 1003. The file system server 1200 manages user data and metadata. The host computers 1001 to 1003 can communicate via one or more communication protocols with the file system server 1200, and in particular, the host computers 1001 to 1003 can send I/O requests to the file system server 1200 via the network 1101.

A management computer 1500 is exemplarily connected to the file system server 1200 for enabling control and management access to the file system server 1200. An administrator/user may control and adjust settings of the file system management and control different functions and settings of the file system server 1200 via the management computer 1500. For controlling functions and settings of the file system management of the file system server 1200, the user can access the file system server 1200 via a Graphical User Interface (GUI) and/or via a Command Line Interface (CLI). In other embodiments such control of the file system management of the file system server 1200 can be performed via one or more of the host computers instead of the management computer 1500.

The file system server 1200 is additionally connected to the one or more storage apparatuses 1301 to 1303 via the network 1103, and the user data (and potentially also the metadata of the one or more file systems managed on the file system server 1200) is stored to storage devices of the storage apparatuses 1301 to 1303, wherein the storage devices may be embodied by plural storage disks and/or flash memory devices. In some embodiments, the storage devices of the storage apparatuses 1301 to 1303 may be controlled according to one or more RAID configurations of specific RAID levels.

Exemplarily, the file system server 1200 is additionally connected to a remote storage apparatus 1400 via another communication network 1102 for remote mirroring of the file system data (user data and/or metadata) to a remote site. Such remote mirroring may be performed synchronously and asynchronously, for example, and settings of the function of the remote mirror operation may be controlled also via the management computer 1500. The storage apparatus 1400 may be comprised of one or more apparatuses similar to the storage apparatuses 1301 to 1303 or it may be embodied by another remote file system server connected to one or more apparatuses similar to the storage apparatuses 1301 to 1303.

Figure 2:
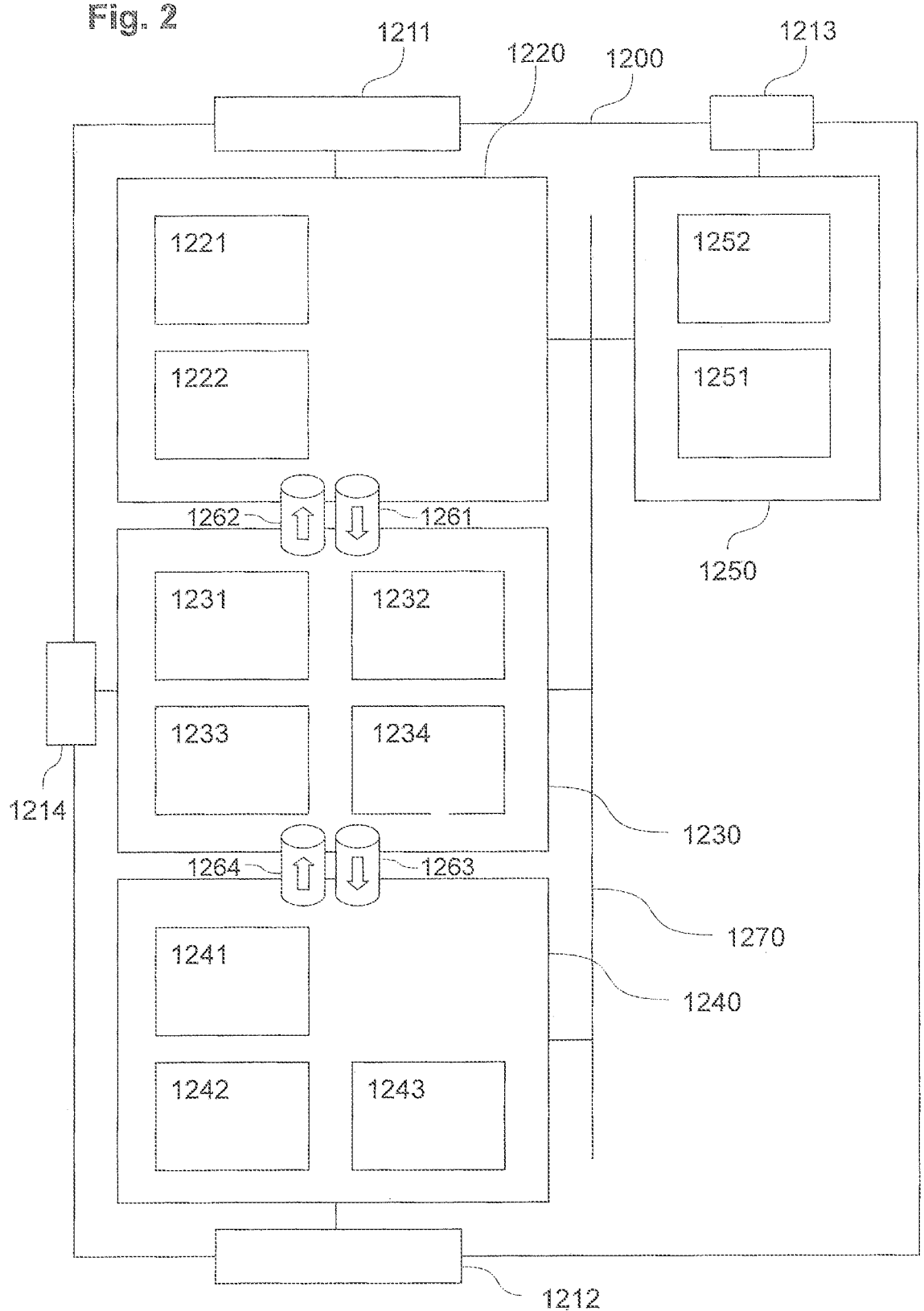
FIG. 2 is an exemplary schematic diagram showing an architecture of a file system server according to an exemplary embodiment of the present invention.
Figure 24:
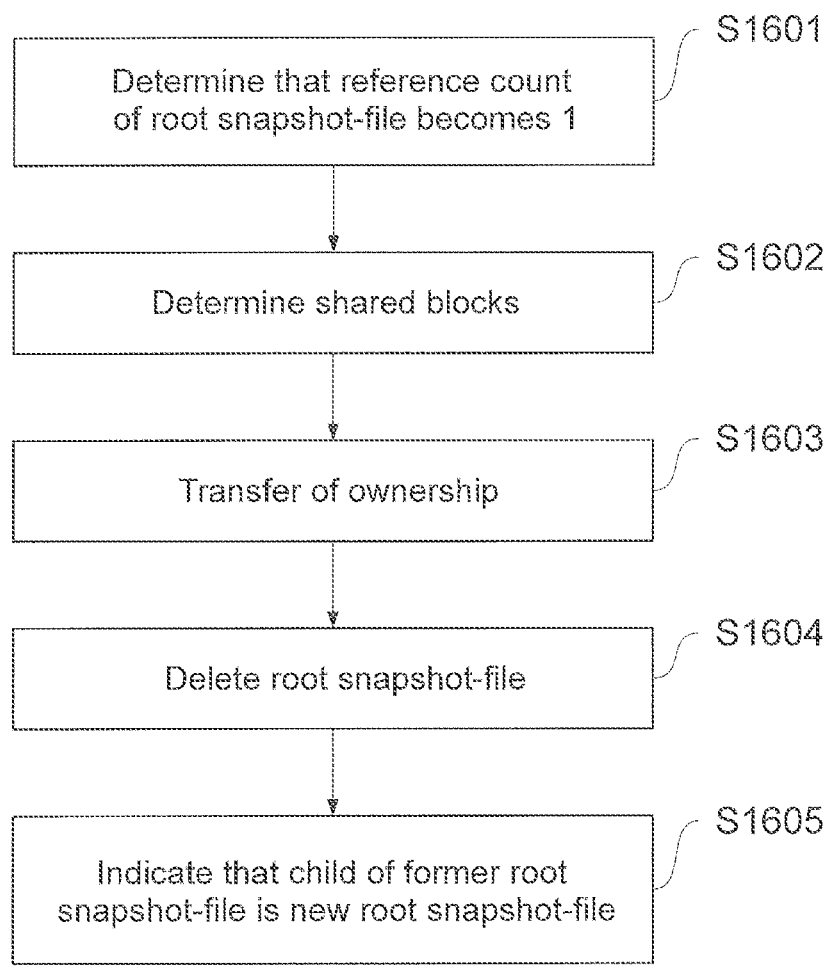
FIG. 24 is an exemplary logic flow diagram schematically showing removing a root snapshot-file in accordance with exemplary embodiments.

FIG. 2 exemplarily shows a schematic illustration of a configuration of a file system server 1200 (file system management apparatus) according to exemplary embodiments, please also see FIGS. 24 and 25 for related implementations.

The file system server 1200 comprises a network interface 1211 for connection to the host computers 1001 to 1003 (e.g. based on Ethernet connections or other technologies), a disk interface 1212 (or also referred to as a storage interface in that the "disk interface" of the file system server may not connect to a disk itself but rather connect to a network for communicating with a storage apparatus such as one or more storage arrays) for connection to the storage apparatuses 1301 to 1303 (e.g. based on Fibre Channel connections or other technologies), a management interface 1213 for connection to the management computer 1500 (e.g. based on Ethernet connections or other technologies), and a remote network interface 1214 for connection to the remote storage apparatus 1400 (e.g. based on Fibre Channel or Ethernet connections or other technologies).

The inner architecture of the file system server 1200 exemplarily comprises four functionally and/or structurally separated portions, each of which may be implemented as a software-based implementation, as a hardware-based implementation or as a combination of software-based and hardware-based implementations. For example, each of the portions may be provided on a separate board, in a separate module within one chassis or in a separate unit or even in a separate physical chassis.

Specifically, the file system server 1200 comprises a network interface portion 1220 (also referred to as NIP) that is connected to the network interface 1211, a data movement and file system management portion 1230 (also referred to as DFP) which may be further separated (functionally and/or structurally) into a data movement portion (also referred to as DMP) and a file system portion (also referred to as FMP), a disk interface portion 1240 (also referred to as DIP) that is connected to the disk interface 1212, and a management portion 1250 (also referred to as MP). The various components may be connected by one or more bus systems and communication paths such as, e.g. the bus system 1270 in FIG. 2. Exemplarily, the data movement and file system management portion 1230 is connected to the remote network interface 1214.

The network interface portion 1220 is configured to manage receiving and sending data packets from/to hosts via the network interface 1211. The network interface portion 1220 comprises a processing unit 1221 (which may comprises one or more processors such as one or more CPUs (in particular, here and in other aspects, one or more CPUs may be provided as single-core CPUs or even more preferably as one or more multi-core CPUs) and/or one or more programmed or programmable hardware-implemented chips or ICs or VLSI(s) such as for example one or more Field Programmable Gate Arrays referred to as FPGAs) and a network interface memory 1222 for storing packets/messages/requests received from the host(s), prepared response packets/messages prior to sending the packets to host(s), and/or for storing programs for control of the network interface portion 1220 and/or the processing unit 1221.

The network interface portion 1220 is connected to the data movement and file system management portion 1230 via the fastpath connections 1262 and 1261 for sending received packets, messages, requests and user data of write requests to the data movement and file system management portion 1230 and for receiving packets, messages, requests, file system metadata and user data in connection with a host-issued read request from the data movement and file system management portion 1230. The fastpath connections (communication paths 1261 and 1262) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 is configured to manage data movement (especially of user data) between the network interface portion 1220 and the disk interface portion 1240, and to further manage the one or more file system(s), in particular manage file system objects of the one or more file systems and metadata thereof, including the management of association information indicating an association relation between file system objects and actual data stored in data blocks on the storage devices or the storage apparatuses 1301 to 1303.

The data movement and file system management portion 1230 comprises a processing unit 1231 (which may comprises one or more processors such as one or more CPUs and/or one or more programmed or programmable hardware-implemented chips or ICs or VLSI(s) such as for example one or more Field Programmable Gate Arrays referred to as FPGAs) and a DFP memory 1232 for storing packets/messages/requests received from the NIP, prepared response packets/messages prior to sending the packets to the NIP, and/or for storing programs for control of the data movement and file system management portion 1230 and/or the processing unit 1231.

The data movement and file system management portion 1230 is connected to the disk interface portion 1240 via the fastpath connections 1263 and 1264 for sending received packets, messages, requests and user data of write requests to the disk interface portion 1240 and for receiving packets, messages, requests, and user data in connection with a host-issued read request from the disk interface portion 1240. The fastpath connections (communication paths 1263 and 1264) may be embodied, for example, a communication connection operating according to Low Differential Voltage Signaling (LVDS, see e.g. ANSI EIA/TIA-644 standard) such as one or more LVDS communication paths so as to allow for high and efficient data throughput and low noise.

The data movement and file system management portion 1230 exemplarily further comprises a metadata cache 1234 for storing (or temporarily storing) metadata of the file system(s) and file system objects thereof used for managing the file system.

The data movement and file system management portion 1230 exemplarily further comprises a non-volatile memory 1233 (such as e.g. an NVRAM) for storing data of packets, messages, requests and, especially, for storing user data associated with write requests and read requests. Especially, since the data of write requests can be saved quickly and efficiently to the non-volatile memory 1233 of the DFP 1230, the response to the hosts can be issued quickly directly after the associated data has been safely stored to the non-volatile memory 1233 even before actually writing the data to one or more caches or to the storage devices of the storage apparatuses 1301 to 1303.

The disk interface portion 1240 is configured to manage receiving and sending user data, data packets, messages, instructions (including write instructions and read instructions) from/to storage apparatuses 1301 to 1303 via the network interface 1212.

The disk interface portion 1240 comprises a processing unit 1241 (which may comprises one or more processors such as one or more CPUs and/or one or more programmed or programmable hardware-implemented chips or ICs or VLSI(s) such as for example one or more Field Programmable Gate Arrays referred to as FPGAs) and a disk interface memory 1242 for storing packets/messages/requests received from the DFP and/or for storing programs for control of the disk interface portion 1240 and/or the processing unit 1241.

In addition, the disk interface portion 1240 exemplarily further comprises a user data cache 1243 (sometimes also referred to as disk interface cache or sector cache, not to be confused with a cache of a storage apparatus described later) for storing or temporarily storing data to be written to storage apparatuses and/or data read from storage apparatuses via the disk interface 1212.

Finally, the management portion 1250 connected to the management interface 1213 comprises a processing unit 1251 (which may comprises one or more processors such as one or more CPUs and/or one or more programmed or programmable hardware-implemented chips or ICs or VLSI(s) such as for example one or more Field Programmable Gate Arrays referred to as FPGAs) and a management memory 1252 for storing management information, management setting information and command libraries, and/or for storing programs for control of the management portion 1250 and/or the processing unit 1251, e.g. for controlling a Graphical User Interface and/or a Command Line Interface provided to the user of the management computer 1500.

Figure 3A:
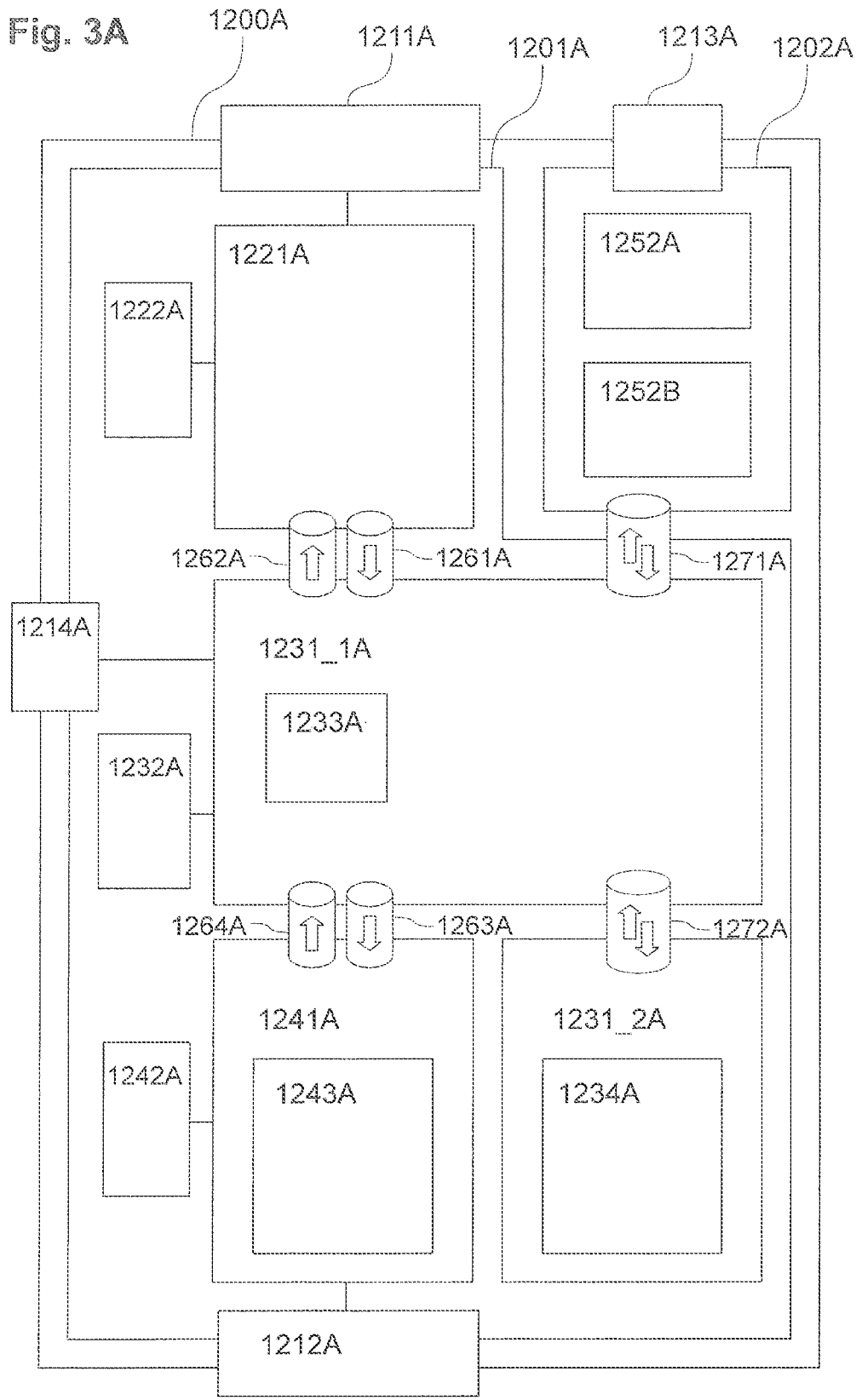
FIG. 3A is another exemplary schematic diagram showing an architecture of a file system server according to an exemplary embodiment of the present invention.

FIG. 3A exemplarily shows a schematic illustration of a more specific configuration of a file system server 1200A (file system management apparatus) according to an exemplary embodiment. Exemplarily, the file system server 1200A comprises a file system unit 1201A and a management unit 1202A. In some embodiments, the file system unit 1201A and the management unit 1202A may be embodied by separate boards, i.e. a file system board and a management board, that may be implemented in one server module (one or more of the modules may be implemented in one server chassis) or as separate modules, e.g. as a file system module and a management module, which may be implemented in one or more server chassis.

In this embodiment of FIG. 3A, the management unit 1202A may functionally and/or structurally correspond to the management portion 1250 of FIG. 2. The management unit 1202A (e.g. a management board) comprises the management interface 1213A (corresponding to the management interface 1213), the processing unit 1251A (corresponding to the processing unit 1251), preferably comprising one or more CPUs, and the management memory 1252A (corresponding to the management memory 1252).

The file system unit 1201A may functionally and/or structurally correspond to the portions 1220 to 1240 of FIG. 2. The file system unit 1201A (e.g. a file system board) comprises the network interfaces 1211A (corresponding to network interface 1211), the disk interface 1212A (corresponding to disk interface 1212), and the remote network interface 1214A (corresponding to remote network interface 1214).

Corresponding to the network interface portion 1220, the file system unit 1201A comprises a network interface memory 1222A and a network interface unit (NIU) 1221A which corresponds to processing unit 1221 and may be embodied by one or more programmed or programmable hardware-implemented chips or ICs or VLSI(s) such as for example one or more Field Programmable Gate Arrays referred to as FPGAs.

Corresponding to the disk interface portion 1240, the file system unit 1201A comprises a disk interface memory 1242A and a disk interface unit 1241A (DIU), which corresponds to processing unit 1241, and may be embodied by one or more programmed or programmable hardware-implemented chips or ICs such as for example one or more Field Programmable Gate Arrays referred to as FPGAs. The disk interface unit 1241A comprises the sector cache memory 1243A (corresponding to the sector cache memory 1243).

Corresponding to the data movement portion of the DFP 1230, the file system unit 1201A comprises a DM memory 1232A (corresponding to DMP memory 1232), a DM unit 1231_1A (data movement management unit—DMU) and a FS unit 1231_2A (file system management unit—FSU) corresponding to processing unit 1231, and both being possibly embodied by one or more programmed or programmable hardware-implemented chips or ICs such as for example one or more Field Programmable Gate Arrays referred to as FPGAs.

The DM unit 1231_1A comprises or is connected to the non-volatile memory 1233A (corresponding to the non-volatile memory 1233) and the FS unit 1231_2A comprises or is connected to the metadata cache memory 1234A (corresponding to the metadata cache memory 1234). The FS unit 1231_2A is configured to handle management of the file system(s), file system objects and metadata thereof and the DM unit 1231_1A is configured to manage user data movement between the network and disk interface units 1221A and 1241A.

The network interface unit 1221, the DM unit 1231_1A and the disk interface unit 1241A are respectively connected to each other by the data connection paths 1261A and 1262A, and 1263A and 1264A (e.g. fastpath connections corresponding to paths 1261 to 1264). In addition, the DM unit 1231_1A is connected to the management unit 1202A by communication path 1271A and to the DM unit 1231_1A by communication path 1272A (which may be implemented via fastpaths or regular data connections such as via an internal bus system etc.).

Figure 3B:
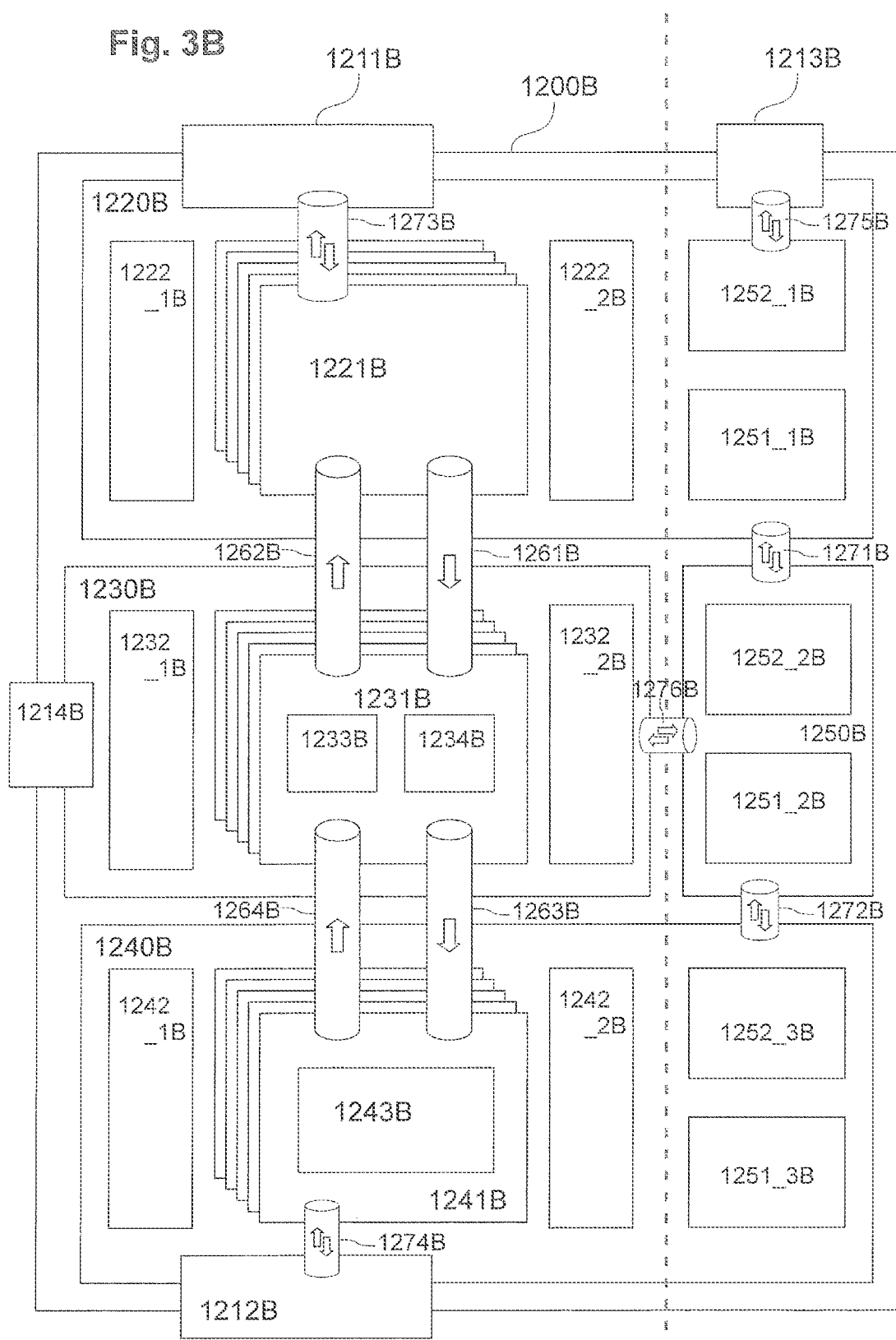
FIG. 3B is another exemplary schematic diagram showing an architecture of a file system server according to an exemplary embodiment of the present invention.

FIG. 3B exemplarily shows a schematic illustration of another more specific configuration of a file system server 1200B (file system management apparatus) according to an embodiment. Exemplarily, the file system server 1200B comprises a network interface module 1220B, a data movement and file system management module group comprising the data movement and file system module 1230B and a management module 1250B, and a disk interface module 1240B. In some embodiments, each of the above modules may be provided separately and inserted into a physical server chassis to be connected to each other according to a modular assembly (i.e. single modules may be exchanged if required, or some or all of the modules may be provided at a higher number depending on the requirements).

For management purposes, each of the network interface module 1220B, the management module 1250B and the disk interface module 1240B comprises a respective management memory 1252_1B, 1252_2B and 1252_3B and a respective processing unit 1251_1B, 1251_2B and 1251_3B (each of which may comprises one or more processors such as one or more CPUs).

Accordingly, the components on the right side of the dashed line in FIG. 3B correspond to the management portion 1250 of FIG. 2 or portion 1202A of FIG. 3A, however, exemplarily, different processing units and associated memories are provided for controlling management of the network interfaces, the file system and data movement management, and the disk interfaces. The respective portions of the modules are communicably connected via communication paths 1271B, 1272B and 1275B to allow for communication to the management computer 1500 via the interface 1213B (the communication paths 1271B, 1272B and 1275B may be implemented via fastpaths or regular data connections such as via a bus system etc.).

Corresponding to the network interface portion 1220, the network interface module 1220B exemplarily comprises two network interface memories 1222_1B and 1222_2B and a plurality of network interface units (NIU) 1221B (corresponding to processing unit 1221) which are connected to the network interface via communication path 1273B and may be embodied by a plurality of programmed or programmable hardware-implemented chips or ICs or VLSI(s) such as for example Field Programmable Gate Arrays referred to as FPGAs.

Corresponding to the disk interface portion 1240, the disk interface module 1240B exemplarily comprises two disk interface memories 1242_1B and 1242_2B and a plurality of disk interface units 1241B (DIU), which corresponds to processing unit 1241, and which may be embodied by a plurality of programmed or programmable hardware-implemented chips or ICs or VLSI(s) such as for example one or more Field Programmable Gate Arrays referred to as FPGAs. The disk interface units 1241B comprise or are connected to the sector cache memory 1243B (corresponding to the sector cache memory 1243) and are connected to the disk interface 1212B via communication path 1274B.

Corresponding to the DFP 1230, the file system and data movement management module 1201A comprises a data movement management memory 1232_1 B, a file system management memory 1232_2B and a plurality of DFP units 1231B (corresponding to processing unit 1231) and which may be embodied by a plurality of programmed or programmable hardware-implemented chips or ICs or VLSI(s) such as for example Field Programmable Gate Arrays referred to as FPGAs. Preferably, one or more of the DFP units 1231B is/are responsible mainly for management of data movement (e.g. similar to the responsibilities of unit 1231_1A) and one or more of the DFP units 1231B is/are responsible mainly for management of the file system and metadata (e.g. similar to the responsibilities of unit 1231_2A). The DFP units 1231B comprise or are connected to the non-volatile memory 1233B (corresponding to the non-volatile memory 1233) and the metadata cache memory 1234B (corresponding to the metadata cache memory 1234).

In the above aspects, data connection lines and data connection paths between modules, boards and units of the file server architecture, in particular those other than fastpaths, may be provided as one or more bus systems, e.g. on the basis of PCI, in particular PCI-E.

Figure 4:
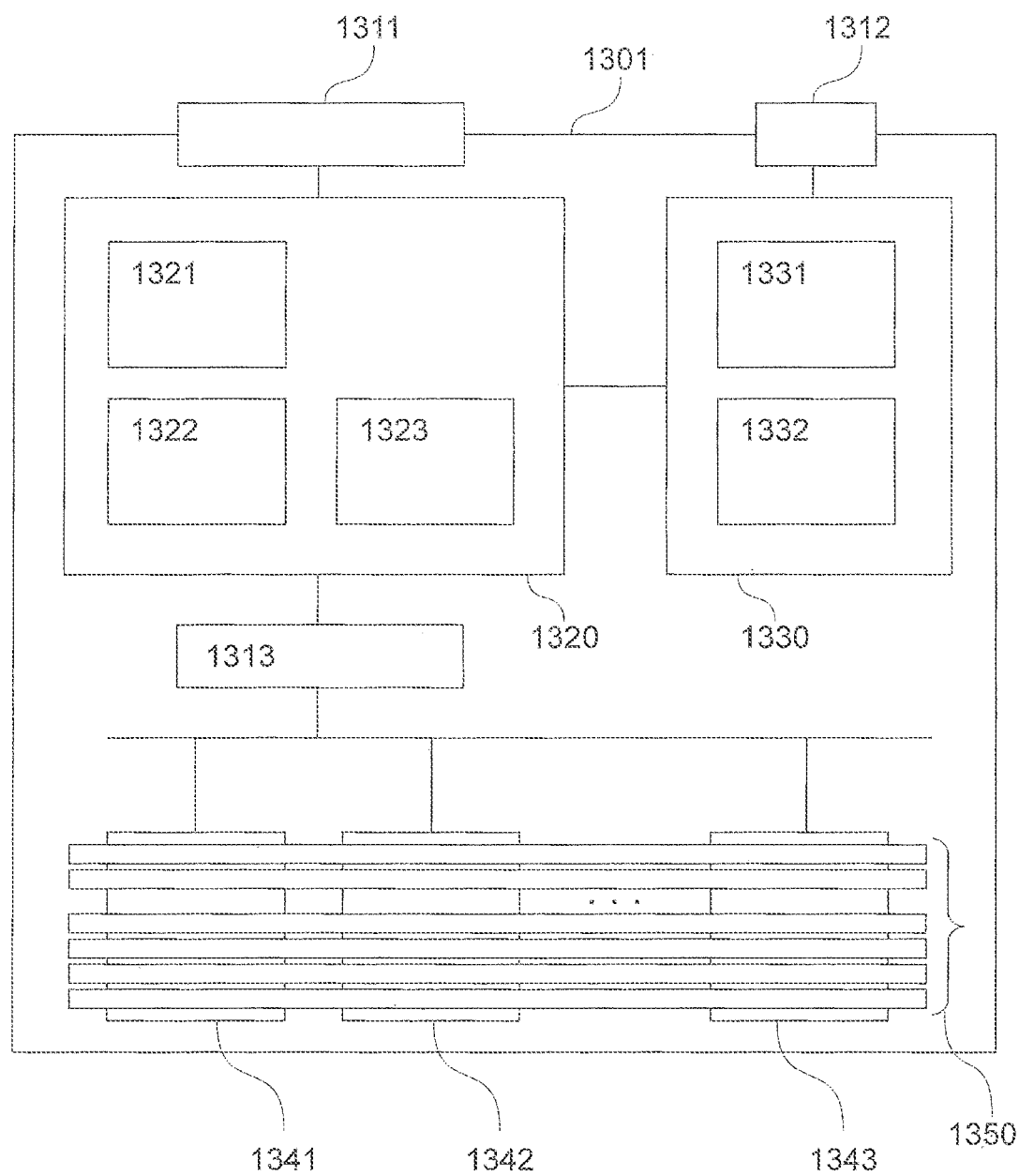
FIG. 4 is an exemplary schematic diagram showing an architecture of a storage apparatus according to an exemplary embodiment of the present invention.

FIG. 4 exemplarily shows a schematic illustration of a configuration of a storage apparatus 1301 according to an embodiment. The storage apparatus 1301 (e.g. a storage array) comprises a network interface 1311 for connection to the disk interface of the file system server 1200 via network 1103 and a memory control unit 1320 for controlling the data movement from/to the network interface 1311 and the disk interface 1313 that is connected to a plurality of storage devices 1341, 1342 and 1343 which may be embodied by storage drives such as storage disks such as Fibre Channel disks or SATA disks, by flash memory devices, flash memory drives, solid state drives, hybrid storage drives, magnetic drives and tapes and optical disks, or combinations thereof.

The memory control unit 1320 comprises a processing unit 1321, a memory 1322 and a cache memory 1323. The memory control unit 1320 (sometimes also referred to as storage control unit, storage controller or storage management unit/storage management section) is configured to manage receiving and sending user data, data packets, messages, instructions (including write instructions and read instructions) from/to the file system server 1200.

The processing unit 1321 may comprises one or more processors such as one or more CPUs and/or one or more programmed or programmable hardware-implemented chips or ICs such as for example one or more Field Programmable Gate Arrays referred to as FPGAs, and the memory 1322 is provided for storing packets/messages/requests received from the file system server and response packets to be sent to the file system server, and/or for storing programs for control of the memory control unit 1320 and/or the processing unit 1321. The cache 1323 (sometimes also referred to as disk cache) is provided for storing or temporarily storing data to be written to disk and/or data read from disk via the disk interface 1313.

Finally, a management unit 1330 of the storage apparatus 1301 is connected to a management interface 1312 and comprises a processing unit 1331 (which may comprises one or more processors such as one or more CPUs and/or one or more programmed or programmable hardware-implemented chips or ICs or VLSI(s) such as for example one or more Field Programmable Gate Arrays referred to as FPGAs) and a management memory 1332 for storing management information, management setting information and command libraries, and/or for storing programs for control of the management unit 1330 and/or the processing unit 1331, e.g. for controlling a Graphical User Interface and/or a Command Line Interface provided to a user of a management computer (not shown, or may be the management computer 1500) connected via the management interface 1312.

The data to be stored on the storage devices 1341 to 1343 (storage disks and/or flash memory devices, herein commonly referred to as disks) is controlled to be stored in RAID groups 1350. The management of RAID groups distributed over the plurality of storage devices 1341 to 1343, and calculation of required parities according to selected RAID configurations is preferably performed by the memory control unit 1320.

In the present description, configurations, aspects and features of implementations and background information on exemplary data storage systems and aspects thereof are described, wherein above aspects, features and embodiments may be applied to, embodied in or implemented together with configurations, aspects and features of implementations and background information as described below.

Figure 5:
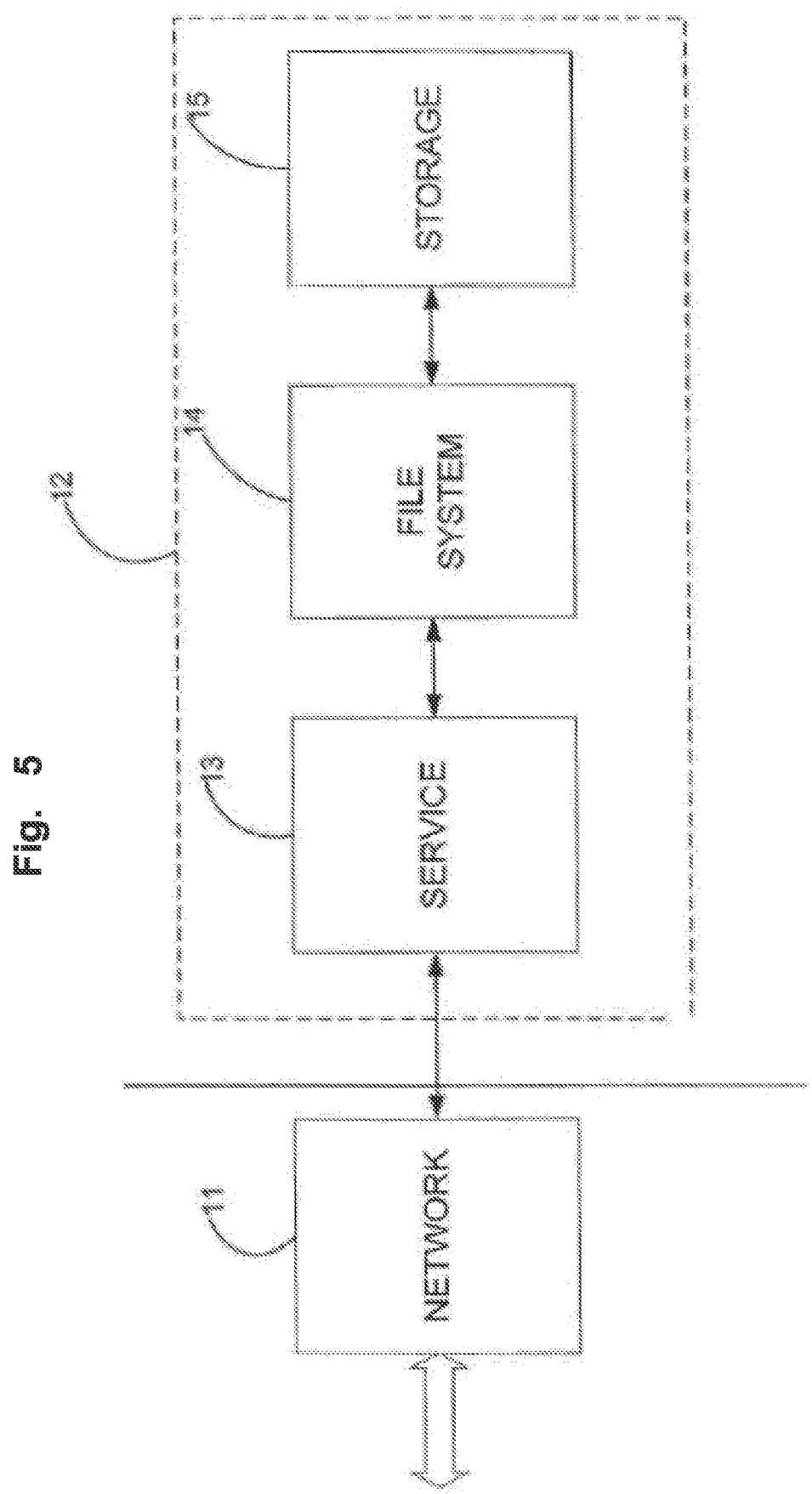
FIG. 5 is an exemplary logical block diagram of an embodiment of a file server to which various aspects of the present invention are applicable.

FIG. 5 is a logical block diagram of an exemplary embodiment of a file server to which various aspects and embodiments are applicable.

A file server of this type is described in U.S. Pat. No. 7,457,822, entitled "Apparatus and Method for Hardware-based File System" which is incorporated herein by reference and PCT application publication number WO 01/28179 A2, published Apr. 19, 2001, entitled "Apparatus and Method for Hardware Implementation or Acceleration of Operating System Functions" which is incorporated herein by reference. A file server 12 of FIG. 5 herein exemplarily has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a sector cache for file content data that is being read from and written to storage. Further, each of the various modules may be hardware implemented or hardware accelerated.

In exemplary implementations, the service module 13, file system module 14, and storage module 15 of FIG. 5 may be implemented by a network interface board 21, a file system board 22, and a storage interface board 23 respectively. For example, the storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions", which is incorporated herein by reference.

However, in alternative exemplary implementations, the service module 13, file system module 14, and storage module 15 of FIG. 5 can be implemented integrally on a singular board such as a board having a single field programmable array chip (FPGA). In yet another alternative implementation, the network interface board 21 can be configured on a first board which is separate from the file system board 22 and storage interface board 23 which are configured together on a second board. It should be noted that the present invention is in no way limited to these specific board configurations or any particular number of boards.

Figure 6:
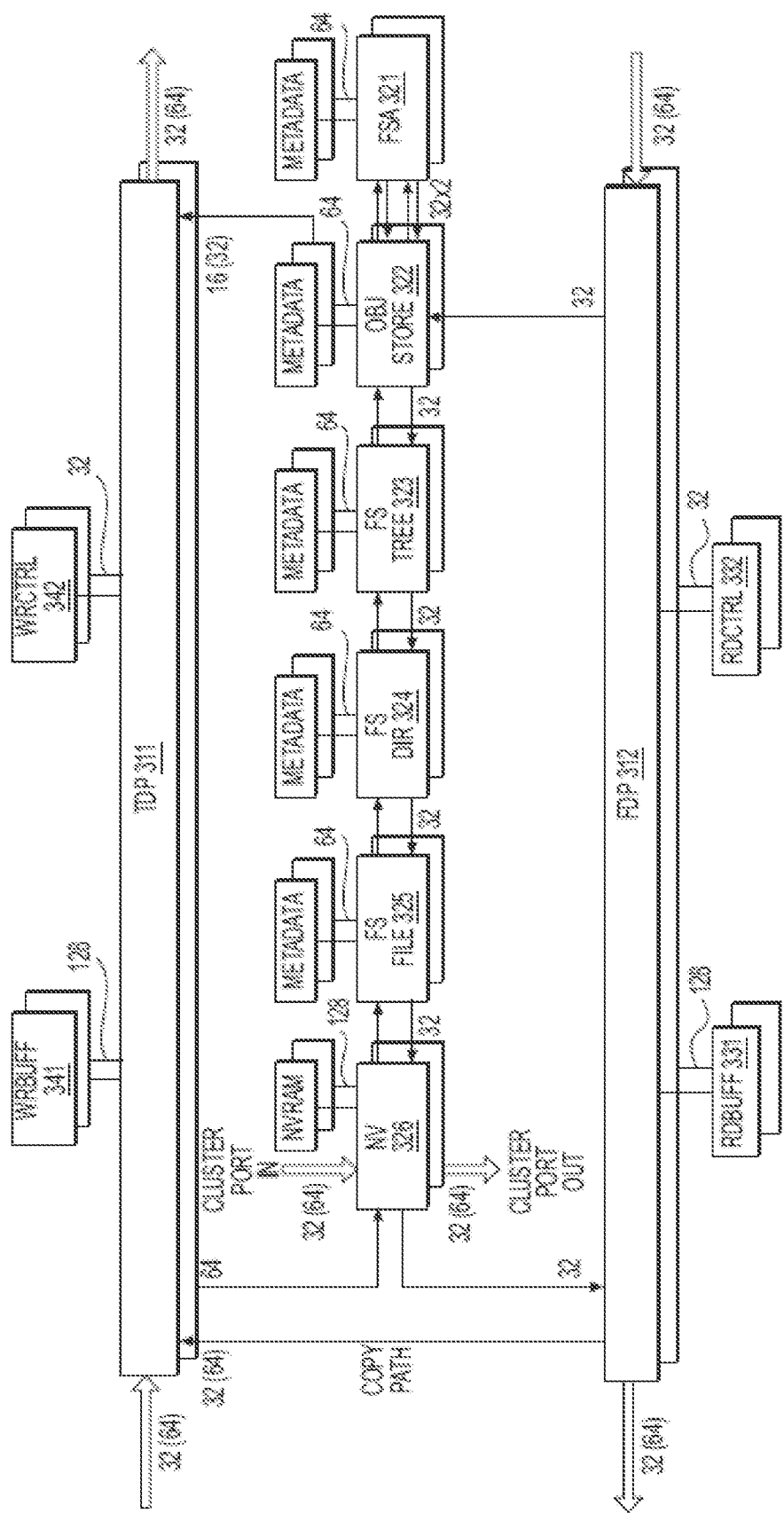
FIG. 6 is an exemplary block diagram of a file system module in accordance with an embodiment of the present invention.

FIG. 6 is an exemplary block diagram of an embodiment of a file system module. The file system module embodiment may be used in systems of the type described in FIG. 5 and/or in system implementations according to FIGS. 2 to 3B.

Exemplary bus widths for various interfaces are shown, although it should be noted that the present invention is in no way limited to these bus widths or to any particular bus widths.

The data is shown by upper bus 311, which is labeled TDP, for To Disk Protocol, and by lower bus 312, which is labeled FDP, for From Disk Protocol, such Protocols referring generally to communication with the storage module 15 of FIG. 5 as may be implemented, for example, by storage interface board 23. The file system module always uses a control path that is distinct from the data buses 311 and 312, and in this control path uses pointers to data that is transported over the buses 311 and 312. The buses 311 and 312 are provided with a write buffer WRBUFF and read buffer RDBUFF respectively. For back up purposes, such as onto magnetic tape, there is provided a direct data path, identified in the left portion of the drawing as COPY PATH, from bus 312 to bus 311, between the two buffers.

A storage module 15 according to exemplary embodiments may be configured by a storage part configured from a plurality of hard disk drives, and a control unit for controlling the hard disk drives (otherwise referred to as a disk) of the storage part, see also FIG. 4 and the description thereof for exemplary implementations.

The hard disk drive, for instance, is configured from an expensive disk drive such as an FC (Fibre Channel) disk, or an inexpensive disk such as a SATA (Serial AT Attachment) disk drive or an optical disk drive or the like. One or more logical volumes are defined in the storage areas (hereinafter referred to as "RAID groups") provided by one or more of the hard disk drives. Data from the host system can be accessed (read from and written into) the logical volumes in block units (data storage units) of a prescribed size.

A unique identifier (Logical Unit Number: LUN) is allocated to each logical volume 26. In the case of this embodiment, the input and output of data are performed by setting the combination of the foregoing identifier and a unique number (LBA: Logical Block Address) that is allocated to the respective logical blocks as the address, and designating this address.

The control unit may comprise a plurality of interfaces (I/F), a disk adapter, a cache memory, a memory controller, a bridge, a memory, and a CPU (and/or FPGA(s)).

The interface may be an external interface used for sending and receiving write data, read data and various commands to and from the storage system. The disk adapter may be an interface to the storage part, and, for example, is used for sending and receiving write data, read data or various commands to and from the storage part according to a fibre channel protocol.

The cache memory, for instance, can be configured from a nonvolatile semiconductor memory, and is used for temporarily storing commands and data to be read from and written into the storage part. The memory controller controls the data transfer between the cache memory and the memory, and the data transfer between the cache memory and the disk adapter. The bridge may be used for sending and receiving read commands and write commands and performing filing processing and the like between the memory controller and the CPU, or between the memory controller and the memory.

In addition to being used for retaining various control programs and various types of control information, the memory may also be used as a work memory of the CPU. The CPU is a processor for controlling the input and output of data to and from the storage part in response to the read command or write command, and controls the interface, the disk adapter, the memory controller and the like based on various control programs and various types of control information stored in the memory.

Returning to the example of FIG. 6, a series of separate sub-modules of the file system module handle the tasks associated with file system management. Each of these sub-modules typically has its own cache memory for storing metadata pertinent to the tasks of the sub-module. (Metadata refers to file overhead information as opposed to actual file content data; the file content data is handled along the buses 311 and 312 discussed previously.) These sub-modules are Free Space Allocation 321, Object Store 322, File System Tree 323, File System Directory 324, File System File 325, and Non-Volatile Storage Processing 326.

The sub-modules operate under general supervision of a processor, but are organized to handle their specialized tasks in a manner dictated by the nature of file system requests being processed. In particular, the sub-modules are hierarchically arranged, so that successively more senior sub-modules are located successively farther to the left. Each sub-module receives requests from the left, and has the job of fulfilling each request and issuing a response to the left, and, if it does not fulfill the request directly, it can in turn issue a request and send it to the right and receive a response on the right from a subordinate sub-module. A given sub-module may store a response, provided by a subordinate sub-module, locally in its associated cache to avoid resending a request for the same data. In one embodiment, these sub-modules are implemented in hardware, using suitably configured field-programmable gate arrays. Each sub-module may be implemented using a separate field-programmable gate array, or multiple sub-modules may be combined into a single field-programmable gate array (for example, the File System Tree 323 and File System Directory 324 sub-modules may be combined into a single field-programmable gate array). Alternatively, each sub-module (or combination of sub-modules) may be implemented, for example, using integrated circuitry or a dedicated processor that has been programmed for the purpose.

Although the storage system, with respect to which the file system embodiment herein is being used, is referred to as the "disk," it will be understood that the storage system may be any suitable large data storage arrangement, including but not limited to an array of one or more magnetic or magneto-optical or optical disk drives, solid state storage devices, and magnetic tapes.

The Free Space Allocation sub-module 321 manages data necessary for operation of the Object Store sub-module 322, and tracks the overall allocation of space on the disk as affected by the Object Store sub-module 322. On receipt of a request from the Object Store sub-module 322, the Free Space Allocation sub-module 321 provides available block numbers to the Object Store sub-module. To track free space allocation, the Free Space Allocation sub-module establishes a bit map of the disk, with a single bit indicating the free/not-free status of each block of data on the disk. This bit map is itself stored on the disk as a special object handled by the Object Store sub-module. There are two two-way paths between the Object Store and Free Space Allocation sub-modules since, on the one hand, the Object Store sub-module has two-way communication with the Free Space Allocation sub-module for purposes of management and assignment of free space on the disk, and since, on the other hand, the Free Space Allocation sub-module has two-way communication with the Object Store sub-module for purposes of retrieving and updating data for the disk free-space bit map.

The File System File sub-module 325 manages the data structure associated with file attributes, such as the file's time stamp, who owns the file, how many links there are to the file (i.e., how many names the file has), read-only status, etc. Among other things, this sub-module handles requests to create a file, create a directory, insert a file name in a parent directory, and update a parent directory. This sub-module in turn interacts with other sub-modules described below.

The File System Directory sub-module 324 handles directory management. The directory is managed as a listing of files that are associated with the directory, together with associated object numbers of such files. File System Directory sub-module 324 manages the following operations of directories: create, delete, insert a file into the directory, remove an entry, look up an entry, and list contents of directory.

The File System Directory sub-module 324 works in concert with the File System Tree sub-module 323 to handle efficient directory lookups. Although a conventional tree structure is created for the directory, the branching on the tree is handled in a non-alphabetical fashion by using a pseudo-random value, such as a CRC (cyclic redundancy check sum), that is generated from a file name, rather than using the file name itself. Because the CRC tends to be random and usually unique for each file name, this approach typically forces the tree to be balanced, even if all file names happen to be similar. For this reason, when updating a directory listing with a new file name, the File System Directory sub-module 324 generates the CRC of a file name, and asks the File System Tree sub-module 323 to utilize that CRC in its index. The File System Tree sub-module associates the CRC of a file name with an index into the directory table. Thus, the sub-module performs the lookup of a CRC and returns an index.

The File System Tree sub-module 323 functions in a manner similar to the File System Directory sub-module 324, and supports the following functions: create, delete, insert a CRC into the directory, remove an entry, look up an entry. But in each case the function is with respect a CRC rather than a file.

The Non-Volatile Storage Processing sub-module 326 interfaces with associated non-volatile storage (e.g. an NVRAM) to provide a method for recovery in the event of power interruption or other event that prevents cached data—which is slated for being saved to disk—from actually being saved to disk. In particular, since, at the last checkpoint, a complete set of file system structure has been stored, it is the task of the Non-Volatile Storage Processing sub-module 326 to handle storage of file system request data since the last checkpoint. In this fashion, recovery, following interruption of processing of file system request data, can be achieved by using the file system structure data from the last stored checkpoint and then reprocessing the subsequent file system requests stored in NVRAM.

In operation, the Non-Volatile Storage Processing sub-module 326, for every file system request that is received (other than a non-modifying request), is told by the processor whether to store the request in NVRAM, and, if so told, then stores in the request in NVRAM. (If this sub-module is a part of a multi-node file server system, then the request is also stored in the NVRAM of another node.) No acknowledgment of fulfillment of the request is sent back to the client until the sub-module determines that there has been storage locally in NVRAM by it (and any paired sub-module on another file server node). This approach to caching of file system requests is considerably different from prior art systems wherein a processor first writes the file system request to NVRAM and then to disk. This is approach is different because there is no processor time consumed in copying the file system request to NVRAM—the copying is performed automatically.

In order to prevent overflow of NVRAM, a checkpoint is forced to occur whenever the amount of data in NVRAM has reached a pre-determined threshold. A checkpoint is only valid until the next checkpoint has been created, at which point the earlier checkpoint no longer exists.

When file server systems are clustered, non-volatile storage may be mirrored using a switch to achieve a virtual loop.

As described herein, a consistent file system image (termed a checkpoint) can be stored on disk at regular intervals, and all file system changes that have been requested by the processor but have not yet been stored on disk in a checkpoint are stored in NVRAM by the Non-Volatile Storage Processing sub-module.

In the event of a system failure, the processor detects that the on disk file system is not "clean" and it begins the recovery procedure. Initially, the on disk file system is reverted to the state represented by the last checkpoint stored on disk. Since this is a checkpoint, it will be internally consistent. However, any changes that were requested following the taking of this checkpoint will have been lost. To complete the recovery procedure, these changes must be restored. This is possible since these changes would all have been caused by requests issued by the processor, and (as explained above) all file system changes that have been requested by the processor but have not yet been stored on disk in a checkpoint are stored in NVRAM. The lost changes can therefore be restored by repeating the sequence of file system changing operations that were requested by the processor from the time of the last checkpoint until the system failure.

When file server systems are clustered, non-volatile storage may be mirrored using a switch to achieve a virtual loop.

As described herein, a consistent file system image (termed a checkpoint) may be stored on disk at regular intervals, and all file system changes that have been requested by the processor but have not yet been stored on disk in a checkpoint are stored in NVRAM by the Non-Volatile Storage Processing sub-module. In order to prevent overflow of NVRAM, a checkpoint is forced to occur, for example, whenever the amount of data in NVRAM has reached a pre-determined threshold. A checkpoint is only valid until the next checkpoint has been created, at which point the earlier checkpoint is no longer considered current.

3. Exemplary File System

FIG. 7 is a schematic block diagram of an exemplary file storage system. The file storage system in FIG. 7 is also described in WO 2012/071335 and U.S. application Ser. No. 13/301,241 entitled "File Cloning and De-Cloning in a Data Storage System", which was filed on Nov. 21, 2011, and are incorporated herein by reference.

Among other things, the file storage system includes a number of file servers (a single file server 9002 is shown for the sake of simplicity and convenience) in communication with various client devices 90061-9006M over a communication network 9004 such as an Internet Protocol network (e.g., the Internet) and also in communication with various RAID systems 90081-9008N over a storage network 9010 such as a FibreChannel network. The client devices 90061-9006M and the file server 9002 communicate using one or more network file protocols, such as CIFS and/or NFS. The file server 9002 and the RAID systems 90081-9008N communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 9002 includes a storage processor for managing one or more file systems. The file server 9002 can be configured to allow client access to portions of the file systems, such as trees or sub-trees under designated names. In CIFS parlance, such access may be referred to as a "share" while in NFS parlance, such access may be referred to as an "export." Internally, the file server 9002 may include various hardware-implemented and/or hardware-accelerated subsystems, for example, as described in U.S. patent application Ser. Nos. 09/879,798 and 10/889,158, which were incorporated by reference above, and may include a hardware-based file system including a plurality of linked sub-modules, for example, as described in U.S. patent application Ser. Nos. 10/286,015 and 11/841,353, which were incorporated by reference above.

Each RAID system 9008 typically includes at least one RAID controller (and usually two RAID controllers for redundancy) as well as a number of physical storage devices (e.g., disks) that are managed by the RAID controller(s). The RAID system 9008 aggregates its storage resources into a number of SDs. For example, each RAID system 9008 may be configured with between 2 and 32 SDs. Each SD may be limited to a predetermined maximum size (e.g., 2 TB-64 TB or more).

3.1 File System Tree Structure

The file server 9002 stores various types of objects in the file system. The objects may be classified generally as system objects and file objects (sometimes referred to as file system objects, i.e. objects of the file system such as e.g. files, directories, clones or snapshot-files). File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information.

Free-space allocation objects are created for storage of free-space allocation information. Modified checkpoint objects list objects and modified retained objects list objects (both of which are described in more detail below) are created for storage of information relating to checkpoints and retained checkpoints, respectively. An software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

An instantiation of the file system is managed using a tree structure having root node (referred to as a dynamic super-block or DSB) that is preferably stored at a fixed location within the storage system. Among other things, storing the DSB at a fixed location makes it easy for the file server 9002 to locate the DSB. The file server 9002 may maintain multiple DSBs to store different versions of the file system representing different checkpoints (e.g., a current "working" version and one or more "checkpoint" versions). In an exemplary embodiment, the DSB includes a pointer to an indirection object (described in detail below), which in turn includes pointers to other objects.

FIG. 8 is an exemplary schematic block diagram showing the exemplary general format of a file system instantiation in accordance with an exemplary embodiments. The DSB 202 is a special structure that represents the root of the file system tree structure. Among other things, the DSB 202 includes a pointer to an indirection object 204, which in turn includes pointers to other objects in the file system including system objects 206 and file objects 208.

In some exemplary embodiments, N dynamic superblocks (N>2) are maintained for a file system, only one of which is considered to be the most up to date at any given point in time. The number of DSBs may be fixed or configurable. The DSBs are located at fixed locations and are used to record the state of the checkpoints on the disk. Each DSB points to an indirection object.

Among other things, the following information may be stored in each dynamic superblock: the checkpoint number associated with this dynamic superblock; the handle of the modified checkpoint objects list object for this checkpoint; the object number of the modified retained objects list object from the last retained checkpoint; the state of this checkpoint (i.e., whether or not a checkpoint has been created); and/or a CRC and various other information to allow the DSB and other structures (e.g., the indirection object) to be checked for validity.

In an exemplary embodiment, the DSBs are treated as a circular list (i.e., the first dynamic superblock is considered to successively follow the last dynamic superblock), and each successive checkpoint uses the next successive dynamic superblock in the circular list. When the file server 9002 opens the volume, it typically reads in all dynamic superblocks and performs various checks on the DSBs. The DSB having the latest checkpoint number with the checkpoint state marked as completed and various other sanity checks passed is considered to represent the latest valid checkpoint on this volume. The file server 9002 begins using the next DSB in the circular list for the next checkpoint.

The general format of the indirection object 204 is discussed below.

3.2 Object Tree Structure

Generally speaking, each object in the file system, including the indirection object 204, each of the system objects 206, and each of the file objects 208, is implemented using a separate tree structure that includes a separate object root node and optionally includes a number of indirect nodes, direct nodes, and storage blocks. The DSB 202 includes a pointer to the root node of the indirection object 204. The indirection object 204 includes pointers to the root nodes of the other objects.

Figure 9:
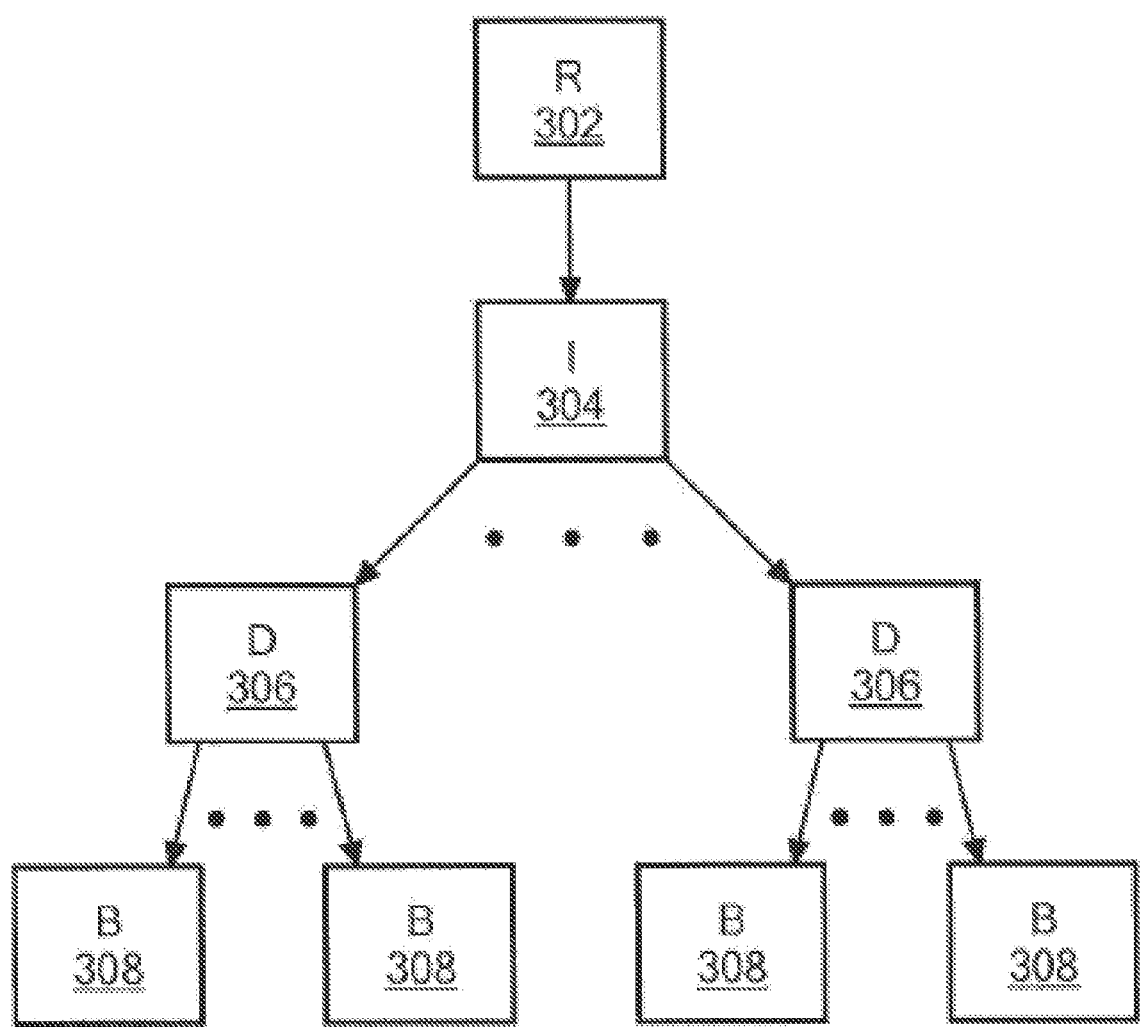
FIG. 9 is an exemplary schematic block diagram showing the general format of an object tree structure in accordance with an exemplary embodiment of the present invention.

FIG. 9 is a schematic block diagram showing the exemplary general format of an object tree structure in accordance with an exemplary embodiments.

A root ("R") node 302 may point to various indirect ("I") nodes 304, each of which may point to a number of direct ("D") nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

Figure 10:
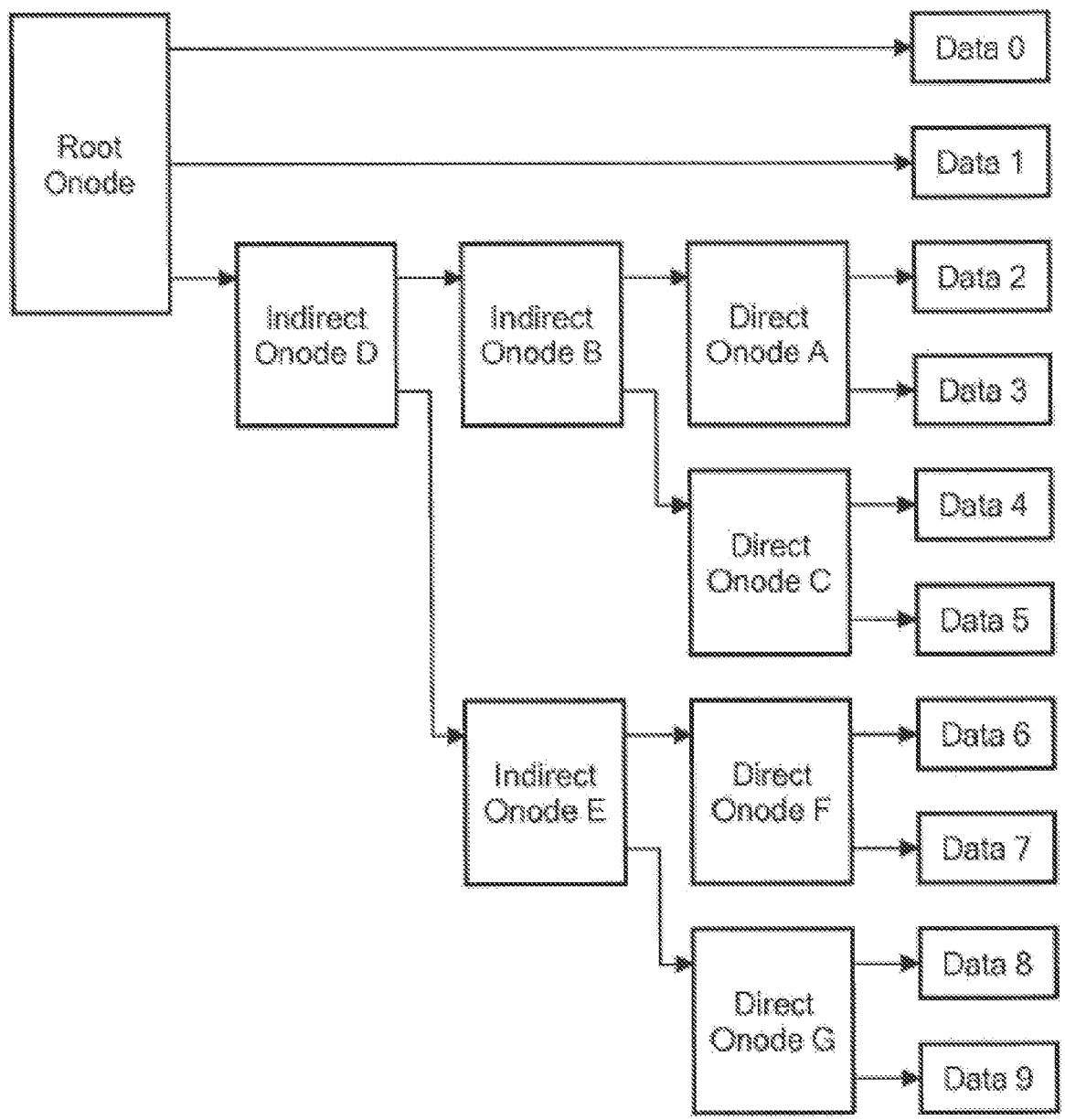
FIG. 10 is an exemplary block diagram illustrating use of multiple layers of indirect onodes placed between the root onode and the direct onodes in accordance with an exemplary embodiment of the present invention.

FIG. 10 is an exemplary block diagram illustrating use of multiple layers of indirect onodes placed between the root onode and the direct onodes in accordance with exemplary embodiments.

When an object (e.g. file object or system object) is created, an object root node is created for the object. Initially, the root node of such an "empty" object has no pointers to any indirect nodes, direct nodes, or data blocks.

As data is added to the object, it is first of all put into data blocks pointed to directly from the root node. For the sake of simplicity in FIG. 9, the root node is exemplarily shown as having only two data pointers and one single pointer to another direct or indirect node, and the indirect nodes are exemplarily shown as only having two indirect or direct node pointers, and direct nodes are exemplarily shown as having two data pointers. Of course, in other implementations, much more pointers may be used per node, and in particular the root node may have one, two or more pointers to other indirect and/or direct nodes.

Once all the direct block pointers in the root node are filled, then a direct node A is created with a pointer from the root node to the direct node. Note that the root node has multiple data block pointers but only a single pointer to either a direct or an indirect node.

If the data in the object grows to fill all the data pointers in the direct node, then an indirect node B is created. The pointer in the root node which was pointing to the direct node A, is changed to point at the indirect node B, and the first pointer in the indirect node B is set to point at the direct node A. At the same time a new direct node C is created, which is also pointed to from the indirect node B. As more data is created more direct nodes are created, all of which are pointed to from the indirect node.

Once all the direct node pointers in the indirect node B have been used another indirect node D is created which is inserted between the root node and the first indirect node B. Another indirect node E and direct node F are also created to allow more data blocks to be referenced. These circumstances are shown in FIG. 10, which exemplarily illustrates use of multiple layers of indirect nodes placed between the root node and the direct nodes.

This process of adding indirect nodes to create more levels of indirection is repeated to accommodate however much data the object contains.

The object root node may include a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node. Also in the object root node is a parameter to identify the type of object for which the object root node is providing metadata. The object type may, for example, be any of a free space object, file, or directory. In addition to object type, the object root node also has a parameter for the length of the object in blocks.

The object root node also carries a series of pointers. One of these is a pointer to any immediately preceding version of the object root node. If it turns out that a retained checkpoint has been taken for the pertinent checkpoint, then there may have been stored an immediately preceding version of the object root node in question, and the pointer identifies the sector number of such an immediately preceding version of the object root node.

For the actual data to which the object root node corresponds, the object root node includes a separate pointer to each block of data associated with the corresponding object. The location of up to 18 data blocks is stored in the object root node. For data going beyond 18 blocks, a direct node is additionally required, in which case the object root node also has a pointer to the direct node, which is identified in the object root node by sector number on the disk.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, irrespective of the file's fragmentation. Node structure may also be established, in an exemplary embodiment, in a manner to further reduce disk writes in connection with node structures. In the end, the node structure needs to accommodate the storage not only of file contents but also of file attributes. File attributes include a variety of parameters, including file size, file creation time and date, file modification time and date, read-only status, and access permissions, among others. This connection takes advantage of the fact that changing the contents of an object root node can be performed frequently during a given checkpoint, since the object root node is not yet written to disk (i.e., because disk writes of object root nodes are delayed, as discussed above). Therefore, in an exemplary embodiment, a portion of the object root node is reserved for storage of file attributes.

More generally, the following structures for storage of file attributes are defined in an exemplary embodiment: enode (little overhead to update, limited capacity; this structure is defined in the object root node and is 128 bytes in an exemplary embodiment); software metadata object (expensive in overhead to update, near infinite capacity; this is a dedicated object for storage of metadata and therefore has its own storage locations on disk); the object is identified in the enode.

Thus, in an exemplary embodiment, each object root node stores the following types of information: the checkpoint number; the data length for this version of the object; the number of levels of indirection used in the runlist for this object; the type of the object (this is primarily used as a sanity check when a request comes in to access the object); a pointer to an older root node version made for a retained checkpoint (if there is one); a pointer to a newer root node version (will only be valid if this is a copy of a root node made for a retained checkpoint); up to 16 (or more) data block pointers per root onode (each data block descriptor includes a pointer to a data block, the checkpoint number, and a bit to say whether the block is zero filled); a single pointer to either a direct node or an indirect node; the 128 bytes of enode data for this object; and/or a CRC and various sanity dwords to allow the root node to be checked for validity.

As discussed below, an object may include copies of root nodes that are created each time a retained checkpoint is taken. The pointer to the older root node version and the pointer to the newer root node version allow a doubly-linked list of root nodes to be created including the current root node and any copies of root nodes that are created for retained checkpoints. The doubly-linked list facilitates creation and deletion of retained checkpoints.

As discussed above, the indirect node provides a level of indirection between the root node and the direct node. The following information is stored in the indirect node in an exemplary embodiment: the checkpoint number; pointers to either indirect or direct nodes (e.g., up to 60 such pointers); and/or a CRC and various sanity dwords to allow the indirect node to be checked for validity.

As discussed above, the direct node provides direct pointers to data blocks on the disk. The following information is stored in the direct node in an exemplary embodiment: the checkpoint number; a number of data block descriptors (e.g., up to 62 such descriptors; each data block descriptor includes a pointer to a data block, the checkpoint number, and a bit to say whether the block is zero filled); and/or a CRC and various sanity dwords to allow the indirect node to be checked for validity.

As data is deleted from the object and data blocks and direct and indirect nodes are no longer required, they are returned to the free space allocation controller.

Within the file storage system, each object is associated with an object number that is used to reference the object. System objects typically have fixed, predefined object numbers, since they generally always exist in the system. File objects are typically assigned object numbers dynamically from a pool of available object numbers. These file object numbers may be reused in some circumstances (e.g., when a file is deleted, its object number may be freed for reuse by a subsequent file object).

The file system may include Z object numbers (where Z is variable and may grow over time as the number of objects increases). A certain range of object numbers is reserved for system objects 206 (in an example, object numbers 1-J), and the remaining object numbers (in this example, object numbers K-Z) are assigned to file objects 208. Typically, the number of system objects 206 is fixed, while the number of file objects 208 may vary.

In an exemplary embodiment, the indirection object 204 is logically organized as a table, with one table entry per object indexed by object number. For example, each entry in the table may include an object type field and a pointer field. A number of different values are defined for the object type field, but for the sake of discussion, one set of values is defined for "used" objects and another set of values is defined for "free" objects. Thus, the value in the object type field of a particular table entry will indicate whether the corresponding object number is used or free.

In an exemplary embodiment, the indirection object may be implemented as a "pseudo-file" having no actual storage blocks. In an exemplary embodiment, instead of having pointers to actual data blocks in the object tree structure, such pointers in the indirection object tree structure point to the root nodes of the corresponding objects. Thus, in an exemplary embodiment, the indirection object maps each object number to the sector address of the root node associated with the corresponding file system object. The indirection object tree structure can then be traversed based on an object number in order to obtain a pointer to the root node of the corresponding object.

A root directory object is a system object (i.e., it has a root node and a fixed predetermined object number) that maps file names to their corresponding object numbers. Thus, when a file is created, the file storage system allocates a root node for the file, assigns an object number for the file, adds an entry to the root directory object mapping the file name to the object number, and adds an entry to the indirection object mapping the object number to the disk address of the root node for the file. An entry in the indirection object maps the root directory object number to the disk address of the root directory object's root node.

As mentioned above, an entry in the indirection object maps the root directory object number to the disk address of the root directory object's root node, the root directory object maps file names to object numbers, and the indirection object maps object numbers to objects. Therefore, when the file server needs to locate an object based on the object's file name, the file server can locate the root directory object via the indirection object (i.e., using the object number associated with the root directory object), map the file name to its corresponding object number using the root directory object, and then locate the object via the indirection object using the object number.

3.3 Multi Way Checkpoints

In some exemplary embodiments, multiple checkpoints may be taken so that multiple versions of the file system can be maintained over time. For example, multiple separate root structures (referred to hereinafter as "dynamic superblocks" or "DSBs") are used to manage multiple instantiations of the file system. The DSBs are preferably stored in fixed locations within the storage system for easy access, although the DSBs may alternatively be stored in other ways. There are typically more than two DSBs, and the number of DSBs may be fixed or variable. There is no theoretical limit to the number of DSBs (although there may be practical limits for various implementations). In this way, if it becomes necessary or desirable to revert the file system back to a previous "checkpoint," there are multiple "checkpoints" from which to choose, providing a better chance that there will be an intact version of the file system to which the file system can be reverted or a checkpoint that contains a particular version of the file system.

With respect to each successive checkpoint, there is stored, on disk, current file structure information that supersedes previously stored file structure information from the immediately preceding checkpoint. Checkpoints are numbered sequentially and are used to temporally group processing of file requests.

As discussed above, some exemplary embodiments may maintain N DSBs (where N is greater than two, e.g., 16). The DSBs are used to take successive checkpoints.

Thus, at any given time, there is a current (working) version of the file system and one or more checkpoint versions of the file system. Because the storage system is typically quite dynamic, the current version of the file system will almost certainly begin changing almost immediately after taking a checkpoint. For example, file system objects may be added, deleted, or modified over time. In order to maintain checkpoints, however, none of the structures associated with stored checkpoints can be permitted to change, at least until a particular checkpoint is deleted or overwritten. Therefore, as objects in the current version of the file system are added, deleted, and modified, new versions of object tree structures are created as needed, and the various pointers are updated accordingly.

Figure 11:
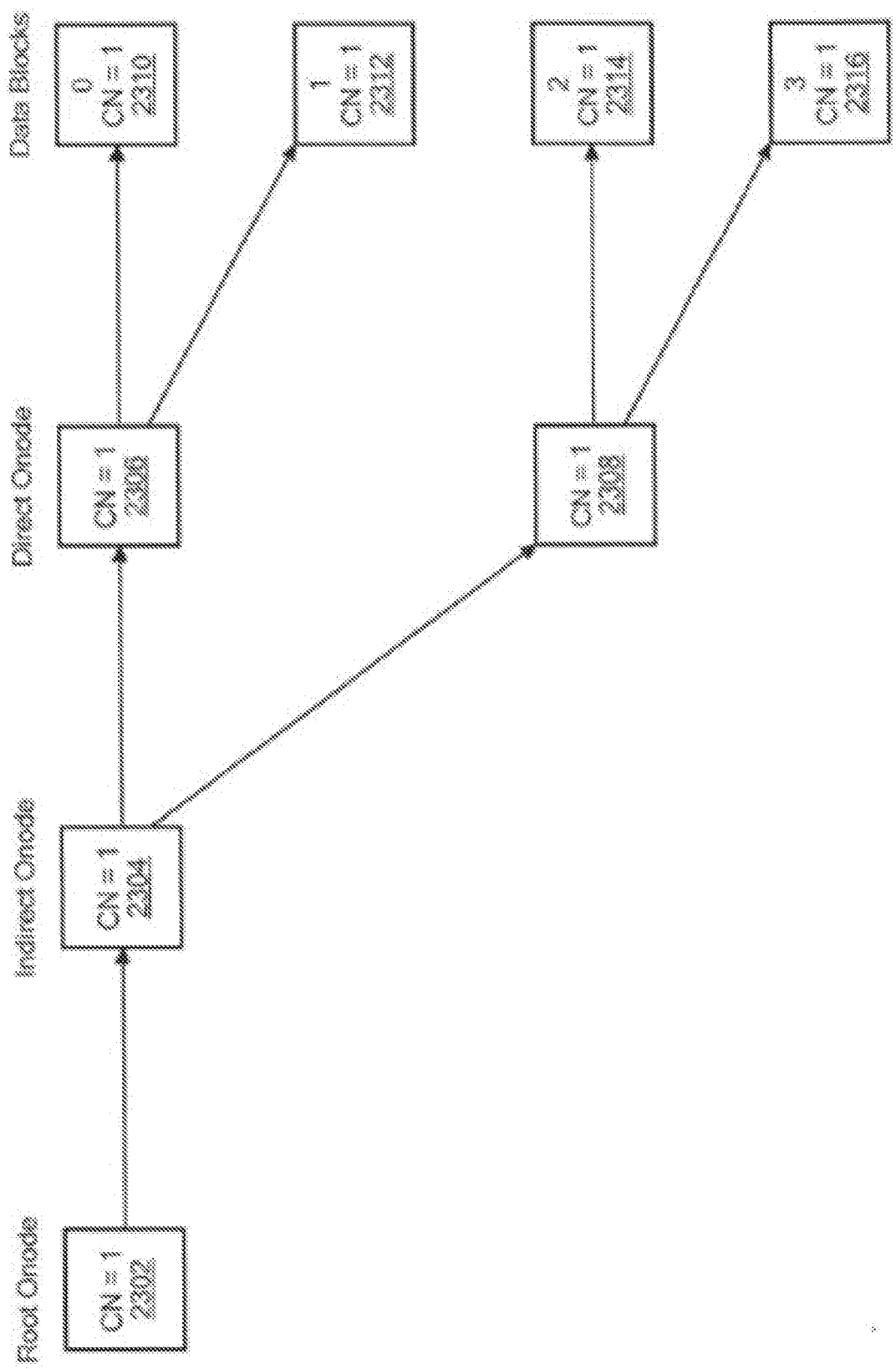
FIG. 11 is an exemplary schematic diagram that shows the structure of an exemplary object that includes four data blocks and various onodes at a checkpoint number 1 in accordance with an exemplary embodiment of the present invention.

For example, FIG. 11 schematically shows an object structure for an exemplary object that was created at a checkpoint number 1. The object includes four data blocks, namely data block 0 (2310), data block 1 (2312), data block 2 (2314), and data block 3 (2316). A direct node 2306 includes a pointer to data block 0 (2310) and a pointer to data block 1 (2312). A direct node 2308 includes a pointer to data block 2 (2314) and a pointer to data block 3 (2316). An indirect node 2304 includes a pointer to direct node 2306 and a pointer to direct node 2308. A root node 2302 includes a pointer to indirect node 2304. All nodes and all data blocks are marked with checkpoint number 1.

Suppose now that data block 0 (2310) is to be modified in checkpoint number 3. Since root node 2402 is part of an earlier checkpoint, it cannot be modified. Instead, the Object Store sub-module of the file server 9002 saves a copy of the old root node 2302 to free space on the disk and marks this new root node with checkpoint number 3 (i.e., the checkpoint at which it was created). At this point, both root node 2402 and new root node 2403 point to indirect node 2304.

The Object Store sub-module then traverses the object structure starting at the root node until it reaches the descriptor for data block 0 (2310). Since data block 0 (2310) is part of an earlier checkpoint, it cannot be modified. Instead, the Object Store sub-module creates a modified copy of data block 2310 in free space on the disk and marks this new data block with checkpoint number 3 (i.e., the checkpoint at which it was created).

The Object Store sub-module now needs to put a pointer to the new data block 2510 in a direct node, but the Object Store sub-module cannot put a pointer to the new data block 2510 in the direct node 2306 because the direct node 2306 is a component of the earlier checkpoint. The Object Store sub-module therefore creates a modified copy of direct node 2306 to free space on the disk including pointers to the new data block 0 (2510) and the old data block 1 (2312) and marks this new direct node with checkpoint number 3 (i.e., the checkpoint at which it was created).

The Object Store sub-module now needs to put a pointer to the new direct node 2606 in an indirect node, but the Object Store sub-module cannot put a pointer to the new direct node 2606 in the indirect node 2304 because the indirect node 2304 is a component of the earlier checkpoint. The Object Store sub-module therefore creates a modified copy of indirect node 2304 with pointers to the new direct node 2606 and the old direct node 2308. Finally, the Object Store sub-module writes a pointer to the new indirect node 2704 in the new root node 2403.

Figure 12:
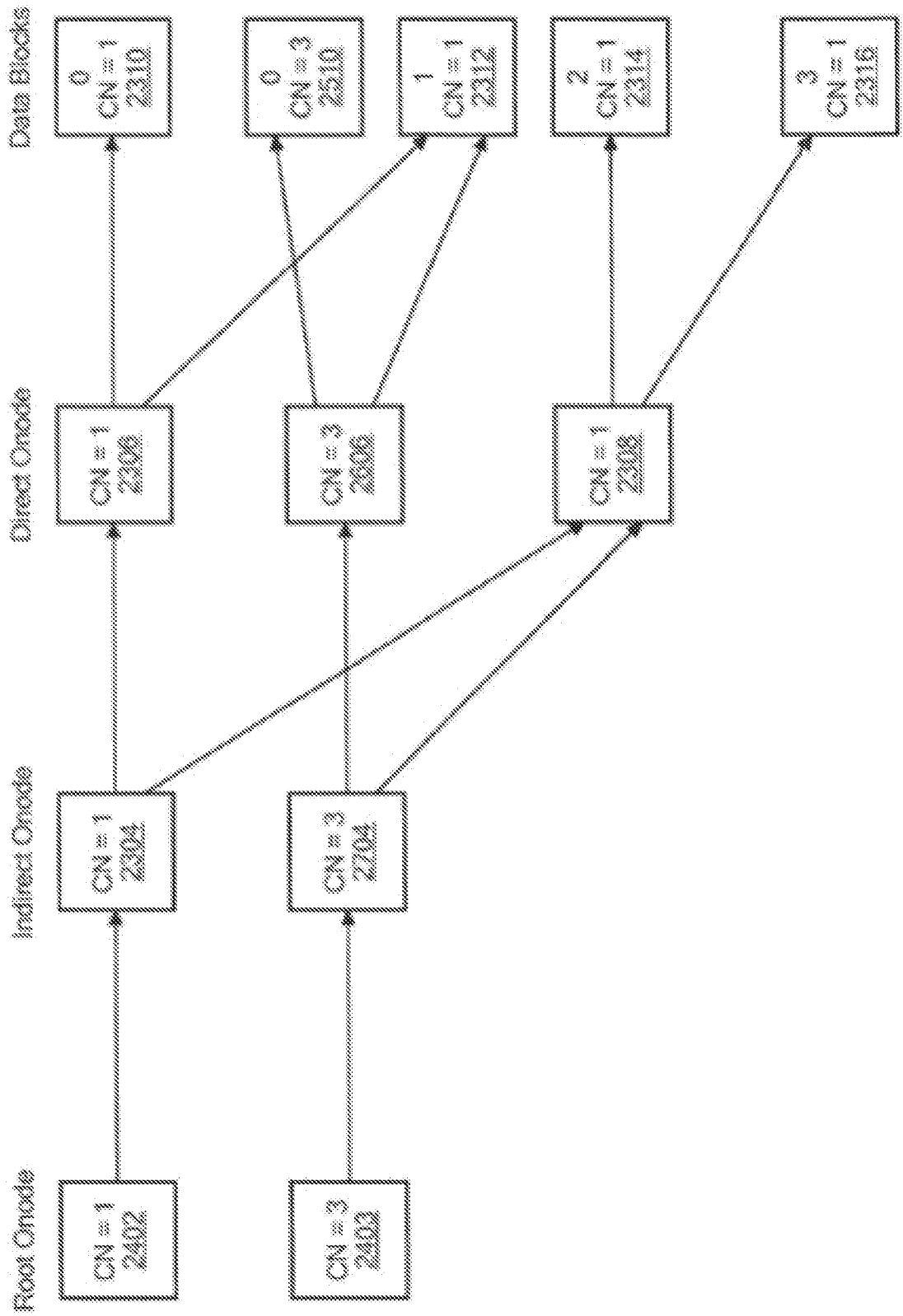
FIG. 12 is an exemplary schematic diagram that shows the structure of the exemplary object of FIG. 11 after a new root node is created for the modified object, after a modified copy of a data block is created, after a new direct onode is created to point to the modified copy of the data block, after a new indirect onode is created to point to the new direct onode, and after the new root node is updated to point to the new indirect onode in accordance with an embodiment of the present invention.

Then, FIG. 12 schematically shows the object structure after the pointer to the new indirect node 2704 is written into the new root node 2403.

It should be noted that, after modification of data block 0 is complete, blocks 2402, 2304, 2306, and 2310 are components of the checkpoint 1 version but are not components of the current checkpoint 3 version of the object; blocks 2308, 2312, 2314, and 2316 are components of both the checkpoint 1 version and the current checkpoint 3 version of the object; and blocks 2403, 2704, 2606, and 2510 are components of the current checkpoint 3 version of the object but are not components of the checkpoint 1 version.

It should also be noted that the new node do not necessarily need to be created in the order described above. For example, the new root node could be created last rather than first.

Thus, when a file system object is modified, the changes propagate up through the object tree structure so that a new root node is created for the modified object. A new root node would only need to be created for an object once in a given checkpoint; the new root node can be revised multiple times during a single checkpoint.

In order for the new version of the object to be included in the current version of the file system, the current indirection object is modified to point to the root node of the modified object rather than to the root node of the previous version of the object. For example, with reference again to FIG. 12, the current indirection object would be updated to point to root node 2403 rather than to root node 2402 for the object number associated with this object.

Similarly, if a new object is created or an existing object is deleted in the current version of the file system, the current indirection object is updated accordingly. For example, if a new object is created, the indirection object is modified to include a pointer to the root node of the new object. If an existing object is deleted, the indirection object is modified to mark the corresponding object number as free.

Since the indirection object is also a tree structure having a root node, modification of the indirection object also propagates up through the tree structure so that a new root node would be created for the modified indirection object. Again, a new root node would only need to be created for the indirection object once in a given checkpoint; the new root node can be revised multiple times during a single checkpoint.

Thus, when a new version of the indirection object is created during a particular checkpoint, the DSB associated with that checkpoint is updated to point to the new root node for the modified indirection object. Therefore, each version of the file system (i.e., the current version and each checkpoint version) generally will include a separate version of the indirection object, each having a different indirection object root node (but possibly sharing one or more indirect nodes, direct nodes, and/or data blocks).

Figures 13, 14:
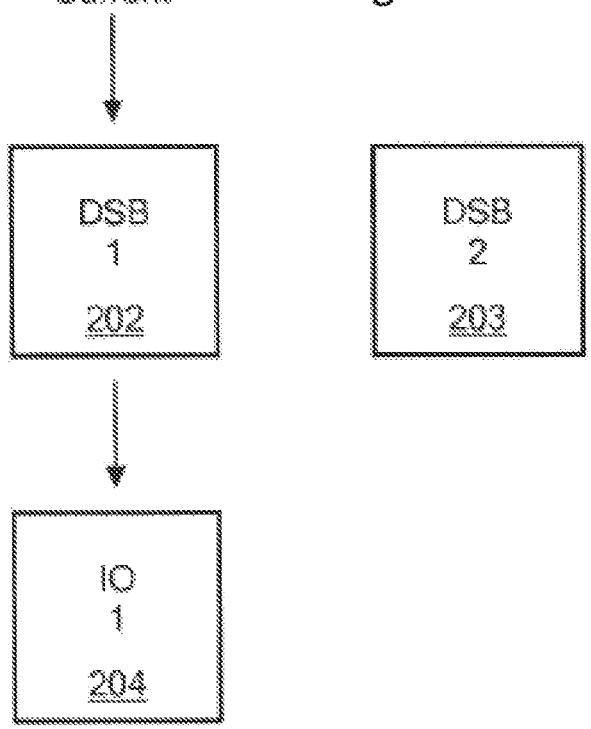
FIG. 13 is an exemplary schematic diagram showing various file system structures prior to the taking of a checkpoint, in accordance with an exemplary embodiment of the present invention using a circular list of DSBs to record checkpoints.
FIG. 14 is an exemplary schematic diagram showing the various file system structures of FIG. 13 after a checkpoint is taken and after modification of the indirection object, in accordance with an exemplary embodiment of the present invention using a circular list of DSBs to record checkpoints.

FIG. 13 is a schematic diagram showing various file system structures prior to the taking of a checkpoint, in accordance with some exemplary embodiments. Specifically, two DSBs numbered 202 and 203 are shown. DSB 202 is associated with the current version of the file system and includes a pointer to the root node of the current version of the indirection object 204. DSB 203 is the next available DSB.

In order to create a checkpoint from the current version of the file system, the next DSB in the circular list (i.e., DSB 203 in this example) is initialized for the new checkpoint. Among other things, such initialization includes writing the next checkpoint number into DSB 203 and storing a pointer to the root node of indirection object 204 into DSB 203.

At this point, DSB 202 represents the most recent checkpoint version of the file system, while DSB 203 represents the current (working) version of the file system.

As discussed above, the current version of the file system may change as objects are created, modified, and deleted. Also, as discussed above, when the current version of the file system changes, a new version of the indirection object (having a new root node) is created. Consequently, when the current version of the indirection object changes after a checkpoint is taken, such that a new indirection object root node is created, the DSB for the current file system version (i.e., DSB 203) is updated to point to the new indirection object root node rather than to the prior indirection object root node.

FIG. 14 is a schematic diagram showing the various file system structures after modification of the indirection object, in accordance with some exemplary embodiments. Here, DSB 202, which is associated with the checkpoint version of the file system, points to the checkpoint version of the indirection object 204, while DSB 203, which is associated with the current version of the file system, points to the root node of new indirection object 205.

Figure 15:
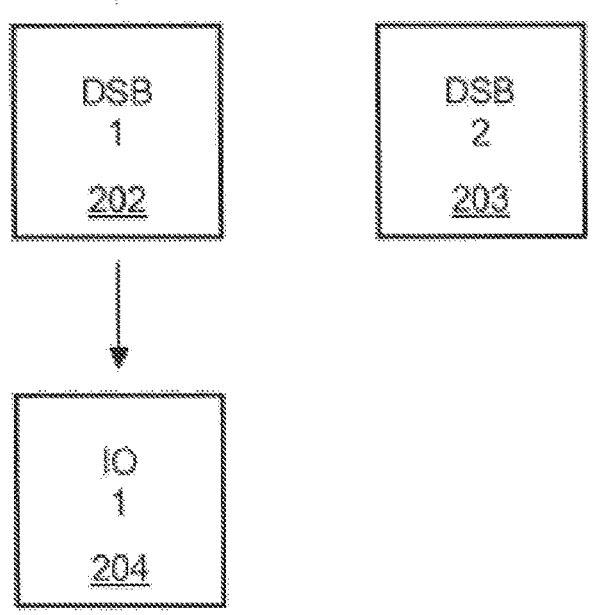
FIG. 15 is an exemplary schematic diagram showing various file system structures prior to the taking of a checkpoint, in accordance with an exemplary embodiment of the present invention in which one DSB is reused to create successive checkpoints.

FIG. 15 is a schematic diagram showing various file system structures prior to the taking of a checkpoint, in accordance with some exemplary embodiments. Specifically, two DSBs numbered 202 and 203 are exemplarily shown. DSB 202 is associated with the current version of the file system and includes a pointer to the root node of the current version of the indirection object 204. DSB 203 is the next available DSB.

In order to create a checkpoint from the current version of the file system, the next DSB 203 is initialized for the new checkpoint. Among other things, such initialization includes writing the next checkpoint number into DSB 203 and storing a pointer to the root node of indirection object 204 into DSB 203. At this point, DSB 203 represents the most recent checkpoint version of the file system, while DSB 202 continues to represent the current (working) version of the file system.

As discussed above, the current version of the file system may change as objects are created, modified, and deleted. Also, as discussed above, when the current version of the file system changes, a new version of the indirection object (having a new root node) is created. Consequently, when the current version of the indirection object changes after a checkpoint is taken, such that a new indirection object root node is created, the DSB for the current file system version (i.e., DSB 202) is updated to point to the new indirection object root node rather than to the prior indirection object root node.

Figure 16:
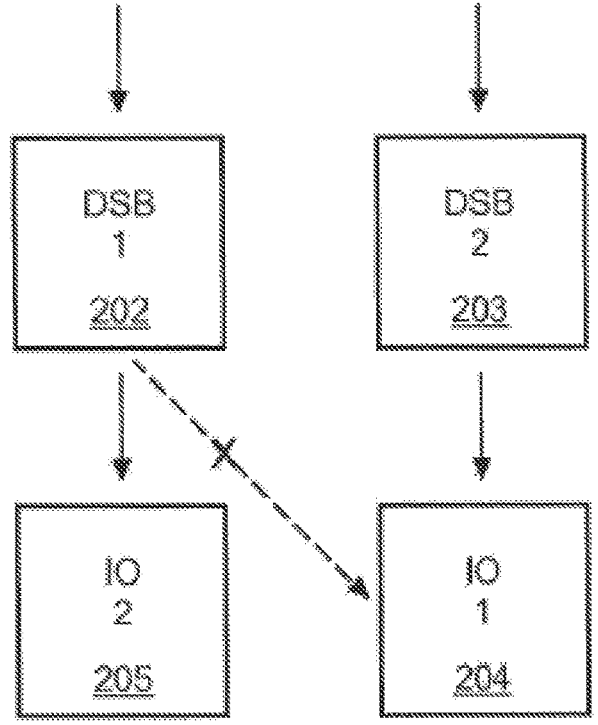
FIG. 16 is an exemplary schematic diagram showing the various file system structures of FIG. 15 after a checkpoint is taken and after modification of the indirection object, in accordance with an exemplary embodiment of the present invention in which one DSB is reused to create successive checkpoints.

FIG. 16 is a schematic diagram showing the various file system structures after modification of the indirection object, in accordance with some exemplary embodiments. Here, DSB 203, which is associated with the checkpoint version of the file system, points to the checkpoint version of the indirection object 204, while DSB 202, which continues to be associated with the current version of the file system, points to the root node of new indirection object 205.

3.4 Cloning and Decloning

The process of file cloning is explained in U.S. patent application Ser. No. 10/286,015 and, which is incorporated by reference above. Relevant portions of the process are reprinted below from U.S. patent application Ser. No. 10/286,015 and some portions are omitted. According to some embodiments of the present invention, file cloning is performed according to the following process.

In certain embodiments of the present invention, a file cloning mechanism is employed to allow for quickly creating copies (clones) of files within a file system, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created.

In exemplary embodiments, a file system object is cloned by first creating a new object that represents a read-only clone (snapshot) of the source object, referred to hereinafter as a "data-stream-snapshot" object or "DSS," and then creating a mutable clone of the object. The block pointers and onode block pointer in the root onode of the clone objects are initially set to point to the same blocks as the source object. Certain metadata from the source object (e.g., file times, security, etc.) and named data streams are not copied to the clone object. Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the file system users. Both the source object and the mutable clone object effectively become writable versions of the DSS object and effectively store their divergences from the DSS object.

Before creating the data-stream-snapshot object, the system preferably ensures that the source object is quiescent.

Some of the file cloning concepts described above can be demonstrated by the examples in U.S. patent application Ser. No. 10/286,015, which is incorporated by reference above. As is apparent from the present description of exemplary embodiments of the present invention, modifications to the cloning and checkpointing mechanisms described above can be implemented. Furthermore, in connection with aspects of removing snapshot objects (sometimes referred to as snapshot-file objects), further aspects are described in PCT patent application PCT/EP2014/051428, which is incorporated by reference herein.

3.4.1 Cloning of Files

In exemplary embodiments of the present invention, a file cloning mechanism, for example, as described in U.S. Patent Application Publication No. US 2012/0130949, which is hereby incorporated herein by reference in its entirety, can be included to allow for quickly creating copies (clones) of files within a file system, such as when a user makes a copy of a file. In exemplary embodiments, a clone of a source object is at least initially represented by a structure containing references to various elements of the source object (e.g., indirect onodes, direct onodes, and data blocks).

Both read-only and mutable (writable) clones can be created. The source data stream and the clone initially share such elements and continue to share unmodified elements as changes are made to the source data stream or mutable clone. None of the user data blocks or the metadata blocks describing the data stream (e.g., the indirect/direct onodes) associated with the source data stream need to be copied at the time the clone is created. At appropriate times, cloned files may be "de-cloned."

In exemplary embodiments, a file system object is cloned by first creating a new object that represents a read-only clone (snapshot) of the source object, referred to hereinafter as a "snapshot-file" ("DSS") or "snapshot-file" ("SF") object and then creating a mutable clone of the object. The block pointers and onode block pointer in the root onode of the clone objects are initially set to point to the same blocks as the source object.

Certain metadata from the source object (e.g., file times, security, etc.) and named data streams may not be copied to the clone object. Metadata is maintained in the source object and in the clone objects to link the snapshot-file object with the source object and the mutable clone object and also to link the source object and the mutable clone object with the snapshot-file object.

In exemplary embodiments, the snapshot-file object may be a "hidden" object in that it is not visible to the file system users.

Both the source object and the mutable clone object effectively may become writable versions of the DSS object (snapshot-file object) and effectively store their divergences from the DSS object.

Some characteristics of such file cloning include:

The data stream of a file system object can be effectively cloned quickly and in a relatively fixed amount of time regardless of the size of the source object's data stream, since none of the user data blocks from which the data stream is comprised need to be copied. Also, none of the metadata blocks describing the data stream (i.e., the indirect/direct onodes) needs to be copied.

A very small and constant number of metadata blocks are mutated.

The complexity of handling I/O to a cloned/clone object is equivalent to a regular object.

The number of times a file or clone can be cloned is limited only by the amount of free space in the file system.

The number of clones a file system can support is limited only by the amount free space in the file system.

This file cloning has an inherent file de-duplication characteristic in that, rather than creating full copies of a source file and later performing de-duplication, the clones are essentially created as de-duplicated files that share data and metadata blocks with the source file.

Corruption of a shared block would affect multiple files, although data corruption is mitigated through redundant storage (i.e., the RAID controller) and other mechanisms.

In exemplary embodiments, a file system object is cloned by first creating a new object that represents a read-only clone (snapshot-file) of the source object, referred to hereinafter as a "data-stream-snapshot" object or "DSS" or "snapshot-file" and then creating a mutable clone of the object.

The block pointers and onode block pointer in the root onode of the clone objects are initially set to point to the same blocks as the source object. Certain metadata from the source object (e.g., file times, security, etc.) and named data streams are not copied to the clone object.

Metadata is maintained in the source object and in the clone objects to link the data-stream-snapshot object with the source object and the mutable clone object and also to link the source object and the mutable clone object with the data-stream-snapshot object. In exemplary embodiments, the data-stream-snapshot object is a "hidden" object in that it is not visible to the file system users. Both the source object and the mutable clone object effectively become writable versions of the DSS object and effectively store their divergences from the DSS object.

Before creating the data-stream-snapshot object, the system preferably ensures that the source object is quiescent.

In an exemplary embodiment, this involves the following steps:

Step A1. Lock the source object against mutations.

Step A2. Perform a file system checkpoint, which effectively serializes the creation of clones on a given file system (although the creation rate will be limited by the rate at which the file system can commit the previous checkpoint to disk such that storage-side delays will result in longer create times). Then, after completion of the checkpoint, the system creates the data-stream-snapshot object, which involves the following steps:

Step A3. Create a data-stream-snapshot object (i.e. a snapshot-file).

Step A4. Copy the block pointers from the source object's root onode to the data-stream-snapshot object's root onode.

Step A5. Record the current checkpoint number in the source object's root onode. This is the object's cloned-in-checkpoint number ("CCN", an exemplary special embodiment of a first-type checkpoint number); it defines the earliest checkpoint in which the object's data stream can diverge from its associated data-stream-snapshot object's data stream (and the CCN as an exemplary special embodiment of a first-type checkpoint number basically indicates a time or time period of creation in step A3, i.e. specifically it indicates a time of cloning of the file object and can be regarded as a time of creation of the clone object).

The system also maintains the following metadata to associate the source object with the data-stream-snapshot object:

Step A6. The handle of the data-stream-snapshot object is recorded in the source object's metadata.

Step A7. A reference count and list of objects referencing the data-stream-snapshot object is recorded in the data-stream-snapshot object's metadata.

If the source object was already a clone (i.e., a clone is being cloned) then there are two additional steps between steps 4 and 5:

Step A4a. Associate the new data-stream-snapshot object with the source file's current data-stream-snapshot object.

Step A4b. Record the source file's current cloned-in-checkpoint number in the new data-stream-snapshot object's root onode.

Further objects that have a mutable clone of the data-stream-snapshot object's data stream can be created as follows:

Step B1. Create a new file system object.

Step B2. Copy the block pointers from the data-stream-snapshot object's root onode to the new object's root onode.

Step B3. Record the current checkpoint number in the new object's root onode.

Step B4. Record the handle of the data-stream-snapshot object in the new object's metadata.

Step B5. Increment the data-stream-snapshot object's reference count and add the new object's handle to the data-stream-snapshot object's list of references.

It should be noted that the cloned-in-checkpoint number (CCN) is distinct from an object's checkpoint number (labeled "CN"; e.g. an exemplary special embodiment of a second-type checkpoint number), which records the checkpoint of the last modification of the object. Both are stored in the object root onode. Specifically, an object's checkpoint number (labeled "CN") represents an example of a second-type checkpoint number and the cloned-in-checkpoint number (CCN) represents a first-type checkpoint number.

In this connection, it is emphasized that the CCN of the live-file does not actually indicate the time or time period of creation but of cloning thereof. Such CCN of a live-file shall still be interpreted as a first-type checkpoint number because also the CCN of a live-file will diverge from the CN of the live-file as soon as the live-file is modified since the last cloning thereof.

When modifying a user data or metadata block, the file system considers whether the block has already diverged from the clone object's associated data-stream-snapshot object, when deciding whether the block must be written to new space:

A change to a user/metadata block through a pointer with a checkpoint number less than the clone's clone-in-checkpoint number (an un-diverged block) must be written to new space.

A change to a user/metadata block through a pointer with a checkpoint number greater than or equal to the clone's cloned-in-checkpoint number (a diverged block) follows the usual rules for objects in the "live" file system substantially as described above.

Figure 17:
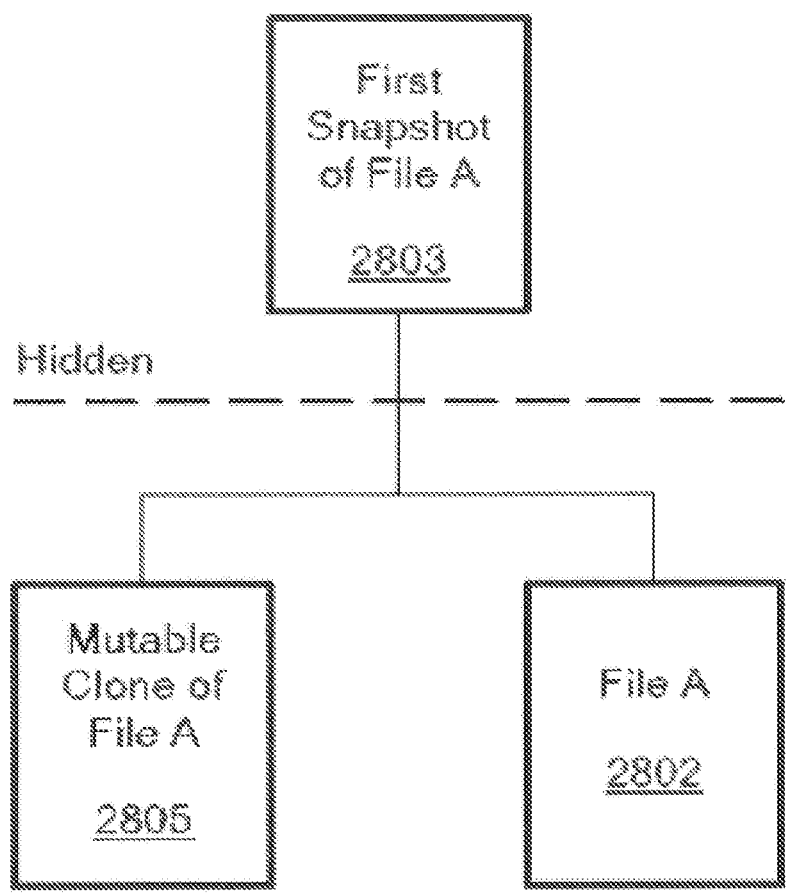
FIG. 17 schematically and exemplarily shows the relationship between a source object, a hidden snapshot-file object, and a mutable clone in accordance with exemplary embodiments.

FIG. 17 schematically shows the relationship between the source object (File A) 2802, the hidden snapshot-file object 2803, and the mutable clone 2805, in accordance with an exemplary embodiment.

As discussed above, after the source object is locked and the checkpoint is taken (steps A1 and A2), the data-stream-snapshot object 2803 is created (step A3), and the block pointers from the source object's root onode 2302 are copied to the data-stream-snapshot object 2803 root onode (step A4). The current checkpoint number is recorded in the source object 2802 root onode (step A5). The handle of the data-stream-snapshot object 2803 is recorded in the source object 2802 metadata (step A6). A reference count and list of objects referencing the data-stream-snapshot object 2803 is recorded in the data-stream-snapshot object 2803 metadata (step A7). At this point, only the source object 2802 references the data-stream-snapshot object 2803, and the reference count is (temporarily) set to one.

Also as discussed above, the mutable (writable) clone 2805 is created (step B1), and the block pointers from the data-stream-snapshot object 2803 root onode are copied to the object 2805 root onode (step B2). The current checkpoint number is recorded in the object 2805 root onode (step B3). The handle of the data-stream-snapshot object 2803 is recorded in the object 2805 metadata (step B4). The reference count in the data-stream-snapshot object 2803 is incremented and the handle of the object 2805 is recorded in the data-stream-snapshot object 2803 list of references (step B5).

It should be noted that when the mutable clone 2805 is created, information such as the block pointers could be copied from the source object 2802 rather than from the DSS object 2803, although copying from the DSS object 2803 is preferred and may allow the source object 2803 to be released from the quiescent state sooner (e.g., after creation of the DSS object 2803 but before creation of the mutable clone 2805).

If the source object 2802 is cloned again prior to being modified, a second mutable clone is created. Then, a second mutable clone is created, and the block pointers from the data-stream-snapshot object 2803 root onode are copied to the new clone object root onode. The current checkpoint number is recorded in the object (second mutable clone) root onode. The handle of the data-stream-snapshot object 2803 is recorded in the object (second mutable clone) metadata. The reference count in the data-stream-snapshot object 2803 is incremented and the handle of the object (second mutable clone) is recorded in the data-stream-snapshot object 2803 list of references.

Since the source object 2802 is effectively a mutable copy of the data-stream-snapshot object 2803, the source object 2802 may be modified over time, which causes the data stream of the source object 2802 to diverge from the data streams of the data-stream-snapshot object and other file clones. For example, with reference again to FIG. 17, modification of data blocks of the source object rooted at 2802 in a later checkpoint could result in a divergent tree structure with the root onode of object 2802 with root onodes of objects 2803 and 2805.

Similarly, mutable clones of the data-stream-snapshot object may be modified over time, which causes the data streams of the mutable copies to diverge from the data streams of the data-stream-snapshot object and other clones.

If, after the source object is modified, a copy of the modified source object is made, then a second data-stream-snapshot object is created for the modified source object using the process described above including the additional steps A4a and A4b, and then a mutable clone of the second data-stream-snapshot object is created.

It should be noted that the logic flows described above with reference to steps A1-A7 including steps A4a and A4b are used to demonstrate how the various objects are created and linked in an exemplary embodiment of the present invention. Implementationally, the optional steps A4a and A4b may be virtual steps in that common logic may be used for both an initial cloning and cloning a clone.

For example, each root onode may include an "up pointer" to refer to a hierarchically higher root onode.

Initially, the up pointer in the source object is null because the source object does not refer to a hierarchically higher DSS object. When the source object is cloned, the common logic may copy the up pointer from the source object root onode into the newly created DSS object (i.e., the first DSS object) and then set the up pointer in the source object root onode to refer to the DSS object, and similarly may copy the current checkpoint number from the source object to the first DSS object and then record the current checkpoint number in the source object.

The source object may then be modified. When the modified source object is cloned, the common logic may copy the up pointer from the modified source object (which refers to the first DSS object) to the newly created second DSS object and then set the up pointer in the modified source object to refer to the second DSS object, and similarly may copy the checkpoint number from the modified object to the second DSS object and record the current checkpoint number in the modified object.

Thus, such common code effectively does not need to distinguish between cloning an uncloned file and cloning a cloned file, and such common code will create any number of hierarchical levels of linking. A particular advantage of such common code is ease of implementation in a hardware-based file system.

The DSS object can be linked to the source object and clone object(s), and vice versa, using the file handles associated with the various objects. Among other thing, such linking allows the storage system controller to quickly identify whether a particular file has been cloned and also to locate objects associated with a cloned file. It should be noted that the present invention is not limited to the use of file handles to link the root onodes. Rather, other information, such as object numbers, could be used in addition to, or in lieu of, file handles.

It should be noted that, the size attributed to a cloned file can be the size of the source file from which the clone was created. Thus, for example, cloning a 1 Gbyte file will result in 1 Gbyte being charged to the quotas associated with the cloned file. Quotas do not take into account any block sharing between clone files.

In terms of performance, reading and writing to a clone object should be in line with that of reading and writing regular non-clone files. As with non-cloned files, the hardware-based file system can auto-inquire and auto-respond NFS/CIFS operations against cloned files. Client-side deletion of a cloned file (e.g., using the "rm" command) can be completed immediately, with actual removal of the cloned file and DSS objects performed in the background.

It should be noted that a clone object may be owned by a different user and group and may be located in a different directory tree than the source object and other clones.

It should be noted that the file cloning structures described above are used for managing the files within the file system and do not affect how the file is accessed outside of the file system. As with non-cloned files, transfer of a cloned file (e.g., HSR/NDMP) transfers the entire file contents, resulting in a "fat" file at the destination.

It should be noted that the cloning logic described above is preferably implemented predominantly in hardware as part of the hardware-based file system, in exemplary embodiments of the invention.

3.4.2 De-Cloning of Cloned Files

As discussed above, in an exemplary embodiment, the DSS objects associated with a particular source object can remain in the file system until the source object and all clones are deleted.

Unless and until the source object diverges significantly from the snapshot versions of the object, the objects should share many data and metadata blocks and therefore maintaining the snapshot objects should not consume much storage space. If necessary or desirable, the snapshot objects could be removed, for example, through a de-cloning operation that essentially restructures the object to appear as an original (i.e., uncloned) object and removes the DSS objects and frees up data and metadata blocks from the DSS objects that are not shared with the object. Some or all of these functions may be performed as "background" tasks, which may be executed sequentially or parallelized.

In an exemplary embodiment, such "de-cloning" can be performed as follows.

When a DSS object's reference count becomes one, and the surviving reference is a clone (not another DSS object), the clone may be "de-cloned" from the DSS object and the DSS object may be deleted.

In exemplary embodiments, such "de-cloning" is performed by transferring ownership of user data blocks from a DSS to its last-surviving live-file mutable clone.

In this regard, regarding the terms "ownership" and "transfer of ownership" in the sense of the present description, an object (e.g. DSS/snapshot-file or mutable file or clone) is deemed to own a block if the block pointer's checkpoint number is greater than or equal to the object's cloned-in-checkpoint number (where ownership means responsibility for freeing).

That is, "ownership" of a data block is associated with a file system object (mutable file/clone or snapshot-file) having a pointer to the respective data block if this pointer is associated with a checkpoint number (second-type checkpoint number) that is equal to or larger than the file system object's cloned-in checkpoint number (first-type checkpoint number).

Accordingly, if an object is deleted, among all data blocks pointed to by pointers of the object are freed if and only if the corresponding blocks are owned by the object to be deleted. And if plural objects share blocks in the sense that they both have pointers that respectively point to one or more same data blocks, only one of these objects shall own the data blocks and the data blocks are freed if and only if the actual owner thereof is deleted, while deleting one of the other objects pointing to the same data block (but not owning them) does not lead to freeing of the respective data blocks.

Ownership of a shared user data block may be transferred from the parent snapshot-file of the live-file to the live-file by:
1. Making the live-file's block pointer's checkpoint number:
a. Greater than or equal to the live-file's cloned-in-checkpoint number.
b. And less than the file system's current CP number (e.g., to ensure the block is preserved, for consistency-on-crash, if it is subsequently modified in the current checkpoint).
2. Making the DSS's block pointer sparse.

In exemplary embodiments, in order to meet the conditions in step 1, the live-file's cloned-in-checkpoint number can be used. A checkpoint is issued before altering any block pointers to ensure the cloned-in-checkpoint number is less than the file system's current CP number.

In exemplary embodiments, the order of these two steps is important, as the update to the DSS will potentially free some of the onodes it owns (and may have been sharing with the live-file, prior to step 1).

Transformations may be performed following the usual rules for preserving modified onodes. Specifically, whenever a block pointer is updated, the checkpoint number associated with the block pointer is updated to the current checkpoint number. Because the block pointer has been modified, the containing onode is written to new space. If that onode is a direct or indirect onode, then the block pointer to that onode in the parent onode is also updated such that the parent onode is modified and written to new space, and so on, until the root onode is processed. At the end of the transfer-of-ownership process from the parent snapshot-file of the live-file to the live-file, the live-file object and the DSS object (parent snapshot-file) no longer share any onodes.

Thus, in an exemplary embodiment, in order to transfer ownership of shared blocks from the DSS object to the live-file object, the live-file object is traversed, and for each region found that is shared and owned by the DSS object, the associated block pointers in the live-file object are "touched" (which updates the checkpoint number of the affected block pointers, similar to updating the checkpoint number when the corresponding block is written but without any data actually being written, so that the live-file object now owns these blocks), and the associated block pointers in the DSS object are made sparse (which makes the affected block pointers point at nothing and also updates the checkpoint number, in effect creating a "hole" in the DSS object, so that when the DSS object is finally deleted, it no longer points to the user data blocks that were transferred to the live-file object). The DSS object can be safely deleted once the block pointers for all shared user data blocks formerly owned by the DSS object have been transformed in this fashion.

The "de-cloning" process copes with the live-file being concurrently changed, by transferring ownership of a limited number of user data blocks at a time while the live-file is held locked. Also, if the live-file is cloned during this process, the process may be aborted. This "de-cloning" process potentially "dirties" many indirect/direct onodes, but no user data blocks. One beneficial by-product, though, is that it leaves the live-file's previously shared onodes with the "correct" object-number and reuse count. After deleting all of live-file's predecessor DSS objects, live-file may be converted back into a regular (non-clone) file.

3.5 Object-Level Replication Overview

In a data storage system, some or all objects of a source file system may be replicated to a target file system, for example, to allow for archiving, backup, maintenance, or disaster recovery. The target file system may be in the same file server as the source file system or may be in a separate file server than the source file system.

Generally speaking, object-level replication involves creating, in the target file system, object structures that correspond to object structures in the source file system. For example, in order to replicate an entire source object in the target file system, the target generally builds an entire tree structure for the object including allocation of blocks of storage for the object data and metadata and creation of the various object onode (node) structures including the root onode (object root node) and any other nodes/blocks, based on information about the source object provided by the source.

It should be noted, however, that the actual layout of objects in the target file system may be (and generally is) different than the layout of the corresponding objects in the source file system because, among other things, replication generally involves the target managing checkpoints in the target file system independently of checkpoints in the source file system (e.g., the source file system may be at checkpoint number 100 while the target file system is at checkpoint number 200) and allocating blocks for onodes and data independently of the source file system For example, while the data blocks for a source object may have been allocated at different times and hence may have been allocated from non-contiguous storage, the data blocks for the target object may be allocated from contiguous storage when the object is first created in the target file system since the data blocks for the object generally are being allocated at substantially the same time.

Thus, replication is generally quite different from merely copying blocks of data from the source file system to the target file system (e.g., such as in mirroring).

In exemplary embodiments, replication generally is performed in cycles, where a replication cycle involves taking a new snapshot, scanning the indirection object in the new snapshot to identify any object that have changed since the previous snapshot associated with the last replication cycle (where changed objects include new objects created since the previous snapshot, existing objects that have been modified since the previous snapshot, and objects that have been deleted since the previous snapshot), and replicating the changed objects to the target file system.

In exemplary embodiments, new and modified objects are identified based on checkpoint numbers (specifically, a new object is one having a creation checkpoint number greater than the checkpoint number of the previous snapshot, while a modified object is one having a creation checkpoint number (first-type checkpoint number) less than or equal to the checkpoint number of the previous snapshot and a last modified checkpoint number (second-type checkpoint number) greater than the checkpoint number of the previous snapshot), while a deleted object is identified by the object's type (i.e., deleted objects have specific object type designations).

After the replication cycle, the new snapshot becomes the previous snapshot for the next replication cycle. Thus, each replication cycle effectively performs an incremental replication of only changed objects.

It should be noted that, although replication generally is performed in cycles, other exemplary embodiments may also permits full replication of the entire source file system, e.g., as the initial replication to the target file system.

It also should be noted that mechanisms for replication of objects described herein may be used in alternative embodiments for full or incremental replication on an object basis rather than on a file system basis, e.g., a selected object may be replicated to the target file system without the remainder of the source file system being replicated.

In certain exemplary embodiments, the indirection object is scanned in chunks by a number of indirection object scanner fibers (which may be referred to herein collectively as the "indirection object scanner") as discussed more fully below, although in alternative embodiments, the indirection object may be processed by a single scanner.

Specifically, a number of indirection object scanner fibers are spawned, and each indirection object scanner fiber scans a designated portion of the indirection object (e.g., a designated range of object numbers) to identify any modified or deleted objects in its respective chunk.

When an indirection object scanner fiber identifies a changed object in its respective chunk, it creates a work item (e.g. a job instruction) in a corresponding Chunk Queue (where an exemplary embodiment maintains one Chunk Queue per indirection object chunk). For convenience, a work item for a new object is referred to as a CREATE work item, a work item for a modified object is referred to as a MODIFY work item, and a work item for a deleted object is referred to as a DELETE work item (or TRUNCATE work item if the deletion is performed by subsequent truncation jobs).

A number of reader fibers take work items off of the Chunk Queues and processes the work items, as discussed more fully below. Among other things, the use of multiple fibers to scan the indirection object and process the work items allows such scanning and processing to be performed in parallel.

3.6. Object-Level Replication of Cloned Objects

Replication of cloned objects is often handled by creating so-called "deep" copies of the cloned objects, i.e., while the cloned objects in the source file system often share various data and metadata blocks, the cloned objects are created in the target file system without such shared data and metadata blocks such that the cloned source objects are essentially de-cloned in the target file system.

For example, two objects that share a particular block in the source file system will not share that block in the target file system; instead, a separate block will be allocated for each of the objects. One disadvantage of using deep copies to replicate cloned objects it that the free space required to replicate the clones on the target file system will be greater than the space they occupy on the source file system.

Thus, while such "deep" replication of cloned objects is relatively simple from an implementation standpoint, some of the advantages of having cloned files (e.g., reduced storage space) are lost in the target file system when such "deep" replication is performed.

However, replication of cloned objects may be performed in such a way that the sharing of data and metadata blocks can be maintained for cloned objects created in the target file system. Because of the way snapshot-file objects (SFs) are used during the cloning process in certain exemplary embodiments as described in U.S. Patent Application Publication No. US 2012/0130949, objects associated with a snapshot-file tree generally must be replicated in a particular order, specifically ensuring that a parent snapshot-file object is replicated before any of its children are replicated.

Thus, when an entire snapshot-file tree is being replicated, replication generally may begin with the root snapshot-file and then replication processes the remainder of the snapshot-file tree in a recursive fashion.

3.7 Summary of Clone Replication Features

Object-level clone replication schemes described herein include some or all of the following features:

Clones maintain their object properties over object replication by emulating the cloning mechanisms used on a live file system to create the clone objects on the target file system.

Replicated clones use the same amount of space on the target. The user/metadata blocks shared between clones on the source file system are also shared on the target file system.

The data transferred between the source and the target when replicating clones is minimized. The shared user/metadata blocks between multiple clones are transferred and written once on the target file system. Only diverged data is transferred and written for each clone object.

The processing resources used to replicate clone objects and other types of objects are shared seamlessly.

The method allows reusing all the existing mechanisms used by object replication to replicate other types of objects.

A file system containing clones is replicated in a single pass replication, i.e., one indirection object scan is sufficient for the detection of all changed objects and their replication.

Only the changed branches of a given snapshot-file tree are processed and replicated. The unchanged branches are not processed.

New clone objects (i.e., a changed object with a creation checkpoint greater than the checkpoint number of the previous snapshot) are replicated starting from the roots of the new trees or branches.

The roots of the new trees or branches are easily identified when processing changed objects by examining the creation checkpoint of the parent of new snapshot-files. For a replication session with N new snapshot-file object, the overhead this incurs is N access to enode metadata and N access to root onodes.

Replication of new clone trees or branches by combining a parallelized level-order walk of the tree with a depth-first preorder walk of the tree depending on resource availability.

There is no limitation on the number of clones processed during a replication, the size of their trees, or the number of clones referencing the same snapshot-file.

The overhead incurred by the replication of a new clone on the target, compared to other types of objects, is a read access to the snapshot-file's root onode, issuing checkpoint if needed, and a write access to the clone's root onode.

No overhead is incurred by the replication of a modified clone on the target compared to other types of objects (a modified object is a changed object with a creation checkpoint less than or equal to the checkpoint of the previous snapshot). Special cases where the clone was the source data stream, the parent snapshot-file has changed, or the clone was de-cloned may incur the transfer and writing of some additional data on the target file system. Such cases can be optimized further, although the additional processing may outweigh the benefits.

No overhead is incurred by the replication of a deleted clone on the target compared to other types of objects (a deleted object is a changed object that exists in the previous snapshot but not in the current snapshot).

Changes to a clone object are replicated in parallel using multiple fibers on both the source and target.

Modified clones, new branches or the same snapshot-file, and new independent trees are replicated in parallel using multiple fibers on both the source and target.

The number of clones processed in parallel is only limited by the overall resources allocated for the replication.

3.8 Clone Replication

The following is a description of clone replication concepts in accordance with an exemplary embodiment, including discussions of specific special cases of clone replication.

3.8.1 Replication of Deleted Clone Objects

When the source detects that an object has been deleted from the source file system, the source instructs the target to delete the corresponding object from the target file system, and the target deletes the object.

In certain situations, even though the object has been deleted from the target file system, certain blocks of the deleted object need to be retained such as for deletion or replication of any clones of the deleted object. In exemplary embodiments, the blocks of the deleted object are automatically retained as part of the snapshot mechanism used during replication and therefore such blocks will remain available until they are no longer being used by any object.

3.8.2 Replication of Newly Created Clone Objects

In the source file system, creating a clone involves creating its snapshot-file first, which is a read-only snapshot of the source data stream. During this process, the source data stream becomes a clone of the snapshot-file.

A mutable (writable) clone of the snapshot-file is then created. Each clone has a cloned-in-checkpoint number, which refers to the checkpoint number where it was associated with its snapshot-file. The clone initially shares all of its data blocks, and the onode tree's metadata blocks describing the data blocks, with its snapshot-file. When a clone's user/metadata block is modified for the first time, it gets written to new space and becomes a diverged block.

During replication, the source uses the cloned-in-checkpoint number to determine if a modified user block being replicated has diverged from the parent snapshot-file by comparing it to the block pointer checkpoint number; if the block pointer checkpoint number is greater than or equal to the cloned-in-checkpoint number, the user/metadata block is diverged and needs to be written to new space on the target file system.

In this exemplary embodiment, it is necessary to ensure that a new snapshot-file object is fully replicated (created and written) on the target file system before its clone is replicated (created and its diverged blocks written) on the target file system. This is to preserve the relationship between a clone's cloned-in-checkpoint number and user/metadata blocks checkpoint number, and therefore to preserve the clone's divergence over replication. This is not limited to regular file clones; it also applies to snapshot-file clones.

In the case, for example, of a clone CL' of a diverged clone CL, where SF' and SF are their respective snapshot-files, SF' shares some of its data blocks with its parent SF.

If SF' and CL' were to be replicated before SF and then SF' is truncated to share its undiverged data blocks with its predecessor SF, these shared blocks would have a checkpoint number greater than the cloned-in-checkpoint number and therefore would be considered as diverged blocks for CL' while not the case.

In order to avoid replicating shared data blocks between related snapshot-files twice and to preserve the integrity of all elements in a snapshot-file tree, a snapshot-file is replicated on the target file system before any successor of any level is created on the target file system.

Thus, while a snapshot-file tree in the source file system begins with a source data stream followed by creation of the snapshot-file object (SF, which effectively becomes a clone of SF) followed by creation of the mutable clone, replication of the snapshot-file tree in the target file system begins with creation of the snapshot-file object followed by creation of the source data stream and creation of the mutable clone; creation of the clones SDS' and CL' may be performed in either order.

When creating a new clone object other than a root snapshot-file object in the target file system (i.e., a clone object that at least initially shared blocks with a parent snapshot-file), the new clone object is initially made to be a clone of its parent snapshot-file object. The new clone object is then diverged as necessary, specifically by unlinking any blocks that are no longer shared with the parent snapshot-file object and adding any new blocks that have diverged from the parent snapshot-file object.

Importantly, when creating the new clone object, the target needs to ensure that the cloned-in-checkpoint (special embodiment of a first-type checkpoint number) of the new clone object is higher than the checkpoint number of all blocks in the parent snapshot-file object; otherwise, blocks shared by the clone and the snapshot-file object will appear to be diverged even though they are not.

Thus, in one exemplary embodiment, when creating the clone object, the target compares the last modified checkpoint of the parent snapshot-file object with the current checkpoint number in the target file system, and if these checkpoint numbers are equal, the target issues a checkpoint in order to advance the checkpoint number of the target file system and sets the cloned-in-checkpoint number (first-type checkpoint number) of the clone object to the advanced checkpoint number to ensure that the cloned-in-checkpoint number of the clone object is higher than the checkpoint of all blocks in the parent snapshot-file object (otherwise the target can simply set the cloned-in-checkpoint number to the current checkpoint number without issuing a checkpoint).

For example, using the above example, when creating a child of SF' in the target file system (e.g., SDS' or CL'), the child object is initially made to be a clone of SF', i.e., the child object initially shares all of the blocks of SF'. The child object is then diverged as necessary, specifically by unlinking any blocks that are no longer being shared with SF' and adding any new blocks that have diverged from SF' (sent to the target by the source).

When creating the child object, the target compares the last modified checkpoint of SF' with the current checkpoint number in the target file system, and if these checkpoint numbers are equal, the target issues a checkpoint in order to advance the checkpoint number of the target file system. The child object is assigned the advanced checkpoint number as its cloned-in-checkpoint number, which ensures that the cloned-in checkpoint number of the child object is higher than the checkpoint of all blocks in SF'.

Thus, in an exemplary embodiment, the following steps are used to replicate a new clone object on the target file system:

Create a new object using the enode information sent from the source. The created object references the parent snapshot-file, given that object numbers are preserved over object replication.

Form a root onode from the parent snapshot-file's root onode (which, by definition, already would have been replicated to the target file system in either the current replication cycle or a previous replication cycle because the parent snapshot-file object is created in the target file system before any of that snapshot-file object's children are created in the target file system).

Issue a checkpoint if the last modified checkpoint number of the parent snapshot-file is equal to the current checkpoint number of the target file system to advance the checkpoint number (the cloned-in-checkpoint number is a checkpoint number used to distinguish between diverged and undiverged user/metadata blocks; user/metadata blocks with a checkpoint number greater than or equal to the cloned-in checkpoint number are diverged).

Set the cloned-in-checkpoint number in the root onode to the current (advanced) checkpoint number.

Write the object's root onode to storage. The object now points to the same block pointers as the snapshot-file.

Write the diverged user/metadata blocks received from the source to new space. The source selectively reads and transfers the clone's diverged user/metadata blocks; that is, any block with a checkpoint number greater than or equal to the cloned-in checkpoint number of the object in the source file system.

A clone object can be either a regular file clone (i.e., a modifiable live copy) or a snapshot-file clone (i.e., a read only snapshot which is generated when cloning a diverged clone). In an exemplary embodiment, clones can be identified by examining a flag in the object's enode.

Creation of root snapshot-file objects (i.e., a snapshot-file generated when cloning a source data stream or an undiverged clone which doesn't have a parent snapshot-file) do not require the special handling described above; they are created on the target file system from scratch because the source data stream object from which to create the root snapshot-file object is not necessarily known in the target file system, and if known, may have moved from its state when it was cloned.

The clone object is initially created as a clone of the parent snapshot-file objects, sharing all blocks with the parent, and then is diverged as necessary as directed by the source.

3.8.3 Object Becomes a Clone Since Previous Snapshot

A regular object that has been replicated to the target file system may gain the property of a clone since the previous snapshot. This can happen, for example, if the object is cloned since the previous snapshot or was in the process of being cloned when the last replication cycle occurred (in an exemplary embodiment, during creation of a clone object in the source file system, the object essentially is created as a regular object and then converted to a clone object that shares all of the user/metadata blocks of its parent snapshot-file, so it is possible for a replication cycle to occur after the object is created but before it has been completely converted into a clone such that the object would be replicated to the target file system as a regular object and then would be identified in the new replication cycle as a modified object that needs to be replicated to the target file system. The object may have diverged from its parent snapshot-file after gaining the property of a clone but before the new replication cycle.

The source can identify an object that has gained the properties of a clone since the previous snapshot (e.g., based on the cloned-in-checkpoint of the object being greater than or equal to the checkpoint number of the previous snapshot) and can determine that the object was in the process of being cloned when the last replication cycle occurred (e.g., if the object's parent snapshot-file is not a new object in the new replication cycle) and, in an exemplary embodiment, the source replicates the object by having the target recreate the object in the target file system as a clone that shares blocks with the parent snapshot-file object (which already has been replicated to the target file system), scanning the object to identify any diverged blocks (i.e., blocks having a checkpoint number greater than or equal to the cloned-in-checkpoint number of the object), and causing replication of the diverged blocks in the target file system.

In an exemplary embodiment, recreating the object in the target file system involves deleting the existing object from the target file system and creating the object anew. If, on the other hand, the object has gained the properties of a clone since the previous snapshot but the parent snapshot-file is new (indicating that the object was cloned since the last replication cycle), then the object will be replicated during replication of the parent snapshot-file object as discussed more fully below.

3.8.4 Simplification of Snapshot-File Tree

When a snapshot-file object has only one child clone, that snapshot-file may be deleted and the clone modified to depend from the parent of the snapshot-file being deleted so as to simplify the snapshot-file tree. For example, in the following, intermediate snapshot-file object SF1 has been deleted since the previous snapshot:

SF0←SF1←Clone has changed to SF0←Clone

The source can identify that such simplification has occurred since the previous snapshot based on the clone object's parent having changed since the previous snapshot.

In an exemplary embodiment, the source instructs the target to delete SF1 when processing its DELETE work item and instructs the target to replicate diverged blocks of the clone object relative to SF0 (the object's metadata has changed, since the object now has a new parent object number) when processing the clone's MODIFY work item.

Such replication of the clone object requires that any blocks that were shared with SF1 be available so that the target can traverse the onode structures of the clone object as part of the replication process. As discussed above, such shared blocks are automatically retained by the target as part of the snapshot mechanism so that, even if SF1 is deleted before the clone object is replicated, the shared blocks will still be available.

3.8.5 Clone Object has been De-Cloned

A clone may be de-cloned, which involves decoupling the object from its parent snapshot-file object and adding blocks to the object corresponding to blocks that previously were shared with the parent snapshot-file object. The source can identify that such de-cloning has occurred since the previous snapshot based on the object having been a clone in the previous snapshot but not being a clone in the new snapshot. The source could replicate the object by "deep copying" the object to the target file system.

3.9 Work Items and Reader Fibers

As mentioned above, in certain embodiments, the indirection object is scanned in chunks during an object-based replication to detect objects that have changed since the previous snapshot.

Generally speaking, when a changed object is detected, a work item containing the object number, checkpoint number, volume number, and object type is added to the corresponding Chunk Queue for the chunk. Specifically, a CREATE work item is added for a new object, a MODIFY work item is added for a modified object, and a DELETE work item is added for a deleted object.

A number of reader fibers take work items off of the Chunk Queues and processes the work items, as discussed more fully below.

In certain exemplary embodiments, processing of the CREATE and MODIFY work items may generate additional work items that are managed using two queues referred to herein as the "pending map" and the "clones queue". Work items placed in the pending map are essentially placeholders that must be moved (promoted) to the clones queue in order to be executed. Work items placed in the clones queue are executed by a pool of process fibers (threads). The work items placed in the clones queue can be executed in any order, and therefore the pending map is used to "stage" how and when work items are promoted to the clones queue to be executed.

When a particular work item is executed, the source interacts with the target to cause replication of the corresponding file system object in the target file system; this involves, among other things, the source passing object data and/or metadata to the target and the target creating or updating the object, as described more fully below. In certain exemplary embodiments, the pending map and the clones queue are logical queues that are part of a single physical fixed-length queue.

In general, the source transmits instructions to replicate an object of the source file system to the target file system, wherein such instructions to replicate may include instructions to create an object in the target file system corresponding to a created object in the source file system (e.g. based on a CREATE work item), instructions to modify an object in the target file system corresponding to a modified object in the source file system (e.g. based on a MODIFY work item), and instructions to delete an object in the target file system corresponding to a deleted object in the source file system (e.g. based on a DELETE work item).

In an exemplary embodiment, clones can be identified by examining a flag in the object's enode. Also, in exemplary embodiments, it can be determined whether an object has been de-cloned by determining that the corresponding flag has changed since the last checkpoint and now indicates "no clone".

3.9.1 the DELETE Work Item

When processing a DELETE work item, the source sends an inquiry to the target to delete the object from the target file system (or one or more TRUNCATE work items).

3.9.2 the CREATE Work Item

When processing a CREATE work item and the object is a clone or a root snapshot-file, it is necessary to determine whether the object will be replicated by the current fiber or whether it will be replicated as part of its parent snapshot-file's tree and should be ignored by the current fiber.

This is done as follows:
a. If the object is a clone and its parent snapshot-file is a new object, the object's replication is omitted by the current fiber.
b. If the object is a root snapshot-file or a clone with an old parent, the object is replicated by the current fiber. If the clone is a snapshot-file, a SPAWN work item to replicate its clones is added to the pending map. When the replication of the snapshot-file is complete, the source adds the pending SPAWN work item to the clones queue for processing.

In the case of a full replication where all objects are new, this process can be simplified as follows:
If the object is a root snapshot-file, the object is replicated as in (b) above.
Otherwise the object's replication is omitted by the current fiber.

3.9.3 the MODIFY Work Item

The MODIFY work item applies to objects that already have been replicated to the target file system but have changed since the previous snapshot. Modifications to a regular file clone object on a live file system result from:
1. De-cloning the object when all its user/metadata blocks become diverged, which can result in the deletion of the parent snapshot-file if the object was its last clone;
2. Changing its parent:
a. When a snapshot-file tree is simplified, when its reference count drops to 1, resulting in the deletion of intermediate snapshot-files. The cloned-in checkpoint number in this case is less than the checkpoint number of the previous snapshot; or
b. When a clone is de-cloned and then cloned again. The cloned-in checkpoint number in this case is greater than or equal to the checkpoint number of the previous snapshot;
3. Cloning the source data stream that is a regular file object, which generates two new objects, namely the snapshot-file and the new clone—the source data stream becomes a clone of the snapshot-file, and has a cloned-in-checkpoint number greater than or equal to the checkpoint number of the previous snapshot; or
4. Simply diverging additional user/metadata blocks of the object—the cloned-in checkpoint number in this case is lower than the checkpoint number of the previous snapshot.

When a source data stream that has already been replicated to the target file system is cloned, a snapshot-file and a clone object will be created, as represented by the following:

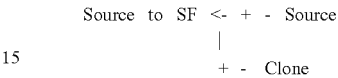

In this case, when scanning the indirection object, the indirection object scanner fiber would see Source as being a modified object and add a MODIFY work item for it, SF as being a new object, and Clone as being a new object. However, in this case, Source should be replicated as part of the replication of SF and thus the reader fiber executing the MODIFY work item for Source will not proceed with replication of Source, as set forth below.

The reader fiber can determine that Source is the source data stream by checking the cloned-in-checkpoint number of Source, and if the cloned-in-checkpoint number is greater than the previous file system snapshot's checkpoint, then Source is the source data stream.

When processing a MODIFY work item from a chunk queue, such transitions are detected and can be handled specifically:
1. If a non-clone regular file object was a clone in the previous snapshot, the object was de-cloned. Such an object can be deep copied, that is, all its user/metadata blocks are replicated.
2. If the object's cloned-in-checkpoint number is greater than the checkpoint number of the previous snapshot:
If the parent snapshot-file is a new object, the object is either a clone that was the source data stream or a clone that was de-cloned then cloned. In both cases, the objects will be replicated from scratch as part of the replication of their parent snapshot-file. The replication of such objects is omitted by the processing fiber.
Otherwise, the object is recreated on the target. This is possible if the previous snapshot was taken when the clone was partially cloned; that is, the snapshot-file was created in the previous snapshot but the clone was cloned after that.
3. If the object is a clone with a cloned-in-checkpoint number is less than the checkpoint number of the previous snapshot and a different parent from the previous snapshot, the clone's parent has changed. All the diverged user/metadata blocks from the new parent are replicated.
4. Otherwise, if the object is a clone, it is a more diverged clone and it is replicated like any other objects. Only the changed diverged user/metadata blocks are replicated in this case.

Unlike on the target file system, some of the special cases covered in (1), (2) and (3) above involve some degree of user/metadata blocks transfer between objects on a live file system.

For example, in the case where a snapshot-file tree is simplified, the user/metadata blocks owned by the intermediate deleted parents are transferred to the clone. If such user/metadata blocks have not changed since the previous snapshot, these could be reused instead of being transferred and written to new space on the target file system.

Also, in the case where the object is the source data stream, its user/metadata blocks are transferred to the snapshot-file it has cloned. If these user/metadata blocks have not changed since the previous snapshot, they could be reused instead of being transferred and rewritten to new space on the target file system.

3.10 Removing Snapshot-Files 3.10.1 Snapshot-File Tree Summary

As discussed above under section 3, when a file is cloned for the first time, a "snapshot-file" object is created in the file system, which assumes ownership of all the metadata and user data blocks that are pointed to by pointers of the file's nodes (e.g. indirect and/or direct nodes). In embodiments, the created "snapshot-file" object may be made read-only, while the file remains mutable/writable. In addition, another copy of the cloned file is created referred to as a clone of the file. Also, the clone may be mutable/writable.

Immediately after the cloning process, before the live-file and the clone thereof are modified, all three objects, i.e. the cloned file, the newly created clone and the newly created parent snapshot-file, do share the same data blocks, namely, all data blocks that have been pointed to by pointers of the file prior to the cloning process.

Moreover, since the pointers have been copied or, more preferably, since the same pointers are used, when the root nodes of the three objects point to the same (uncopied) indirect and/or direct nodes, based on the cloned file's pointers all respective pointers have the checkpoint numbers according to the pointers' checkpoint numbers prior to the cloning.

However, only the newly created snapshot-file may own all or some of the blocks (unless all blocks are still owned by one or more previous snapshot-files, i.e. by ancestors of the newly created snapshot-file) and the clone and the file do not own any blocks as long as they remain unmodified.

As discussed above, ownership of a data block by a certain object is indicated by the cloned-in checkpoint number (as an example of a first-type checkpoint number) of the certain object being equal to or larger than the checkpoint number (as an example of a second-type checkpoint number) of the respective pointer.

At the time of cloning, the cloned-in checkpoint number (CCN) of both writable files, i.e. the cloned file and the newly created clone (clone file), can be set to the current checkpoint number of the file system. The cloned-in checkpoint number of the newly created snapshot-file can be set to the previous cloned-in checkpoint number of the file before cloning.

By such setting, the newly created snapshot-file automatically owns the specific blocks to be owned and the clone and file do not own any of the blocks. Only, if one or more new blocks are pointed to by pointers of the file at the current or later checkpoint numbers due to modification of the file, the ownership condition above will be fulfilled for those blocks pointed to by pointers of the file so that the then modified file will then own the blocks associated with the modification. The same applies for the clone, when modified. Accordingly, the original file and the clone own blocks that are modified subsequent to the cloning operation.

Furthermore, if the file and/or the clone is cloned again after modification since the last cloning operation, another snapshot-file is created and will then reference the previously created snapshot-file, while the cloned file (or cloned clone) will reference the newly created snapshot-file. This newly created snapshot-file will then again assume ownership of all blocks that have diverged since the last cloning operation, while the other (unmodified blocks) will remain to be owned by the previously created snapshot-file or by an ancestor thereof.

Figure 18:
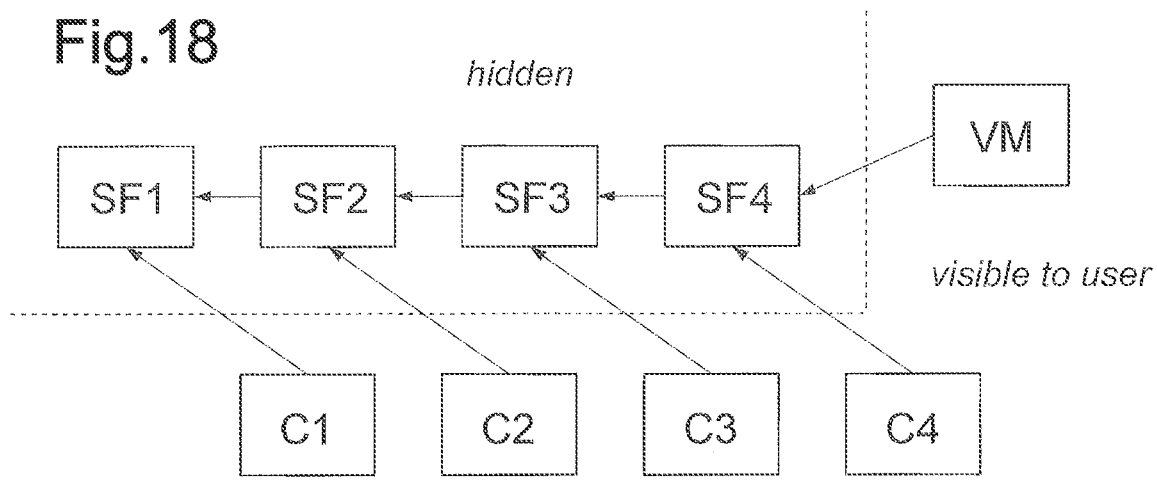
FIG. 18 shows an example of a snapshot-file tree.

As an example, FIG. 18 shows a snapshot-file tree according to which an original file labeled "VM" has been modified and cloned four times, thereby creating clones C1 (may represent a backup file VM-backup1), C2 (may represent a backup file VM-backup2), C3 (may represent a backup file VM-backup3) and C4 (may represent a backup file VM-backup4) and the snapshot-files SF1, SF2, SF3 and SF4.

In FIG. 18, it may be assumed that the file has been modified between each of the cloning operations, and that also the clones may have been modified. For example, if the file is not modified before cloning again since the previous cloning operation, the newly created clone may, alternatively to the structure of FIG. 18, also reference the same existing parent snapshot-file of the previous cloning operation and no new snapshot-file needs to be created.

The dashed line in FIG. 18 separates the hidden snapshot-file objects SF1 to SF4 from the user visible objects like the file VM and the clones C1 to C4. Of course, if one or more of the clones are cloned, the tree of snapshot-files (also herein referred to as a "snapshot-file tree") may become more complex in structure compared to the rather simple structure of a single chain of snapshot-files SF1 to SF4 in FIG. 18, please see e.g. the tree in FIG. 19.

Figure 19:
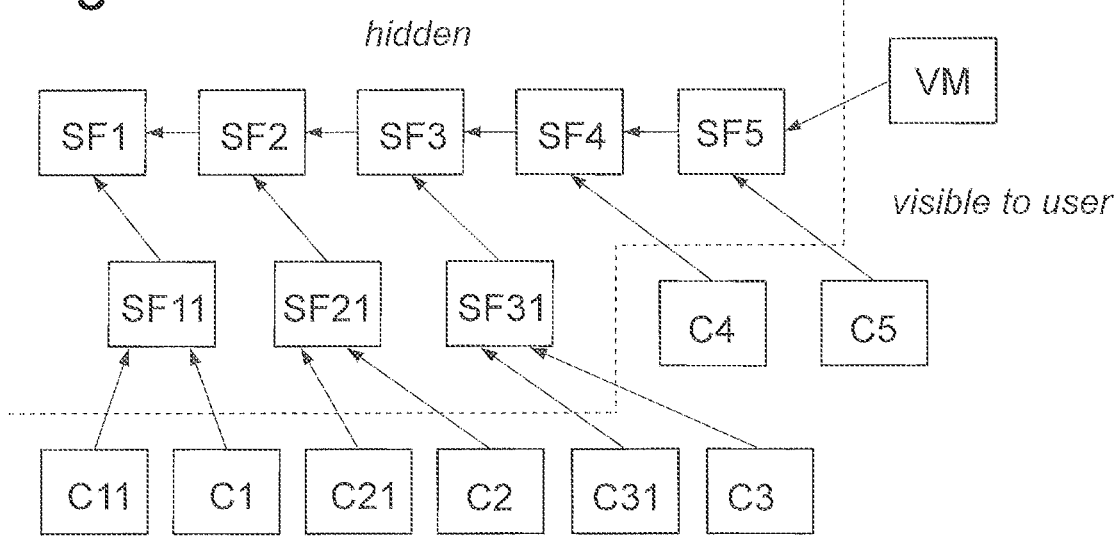
FIG. 19 shows an example of the snapshot-file tree of FIG. 18 at a later time.

In the example of FIG. 18, the snapshot-file tree comprises the snapshot-files SF1 to SF4 similar to the tree of FIG. 18, but new snapshot-files SF11, SF21 and SF31 have been added by cloning the clones C1 to C3 and creating clones thereof referred to as C11, C21 and C31 in FIG. 19. In addition, file VM has been cloned again by creating another snapshot-file SF5 and a new clone C5.

With reference to the example of FIG. 19, the relationship terms between snapshot-files shall be exemplarily specified as follows. A direct successor is referred to as "child", "child snapshot-file", "successor" "successor snapshot-file". For example, in FIG. 19, SF2 and SF11 are the children of SF1 and SF5 is the child of SF4.

Please note that the term "successor" and "child" may be used with the same meaning in the sense that a "successor" of a certain snapshot-file directly references the certain snapshot-file, while later related generations may be referred to as "indirect successors", e.g., while SF3 is not the successor of SF1 because it directly references SF2 and not SF1, SF3 may still be referred to as an indirect successor of SF1.

Vice versa, a direct ancestor is referred to as "parent" or "parent snapshot-file" so that SF1 is the parent of SF11 and SF2 and SF4 is the parent of SF5. The term "ancestor" or "ancestor snapshot-file" refers to all snapshot-file of earlier generations being directly or indirectly related (i.e. in direction of the arrows of FIG. 19).

Accordingly, the root snapshot-file SF1 (a "root snapshot-file" being the single snapshot-file of the tree that does not itself reference another parent snapshot-file, i.e. the snapshot-file of the tree without parent) is an ancestor of all other snapshot-files SF2 to SF5, SF11, SF21 and SF31. SF3 is only ancestor for SF4, SF5 and SF31, while having its own ancestors SF1 and SF2. Also, SF2 has only one ancestor, namely, its own parent SF1.

3.10.2 Changing Snapshot-File Parents

As mentioned above, when a clone is deleted, although the reference count of the snapshot-file referenced to by the clone will decrease, as a hidden and read-only object that cannot be manually deleted by the user because it is hidden, the respective snapshot-file will not be removed and may therefore remain in the file system, unless additional functions of removing snapshot-file and/or changing parent snapshot-files are implemented. Such situation may lead to a configuration in which blocks that have been only shared between the respective snapshot-file and the clone prior to deletion of the clone will still be pointed to by the respective snapshot-file although not pointed to by any user visible object.

Figure 20A:
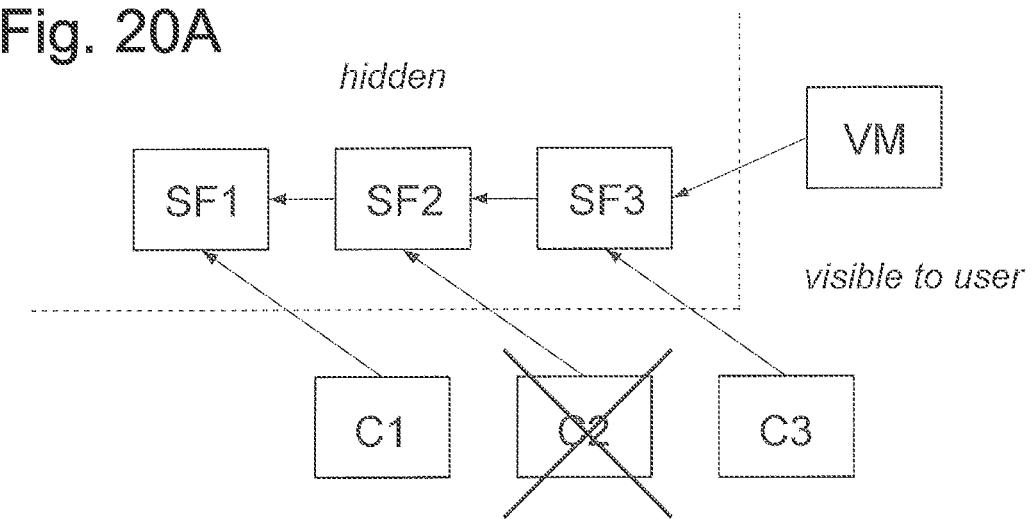
FIGS. 20A to 20C exemplarily illustrate an example of removing a snapshot-file SF2 and changing a parent snapshot-file of another snapshot-file SF3 in accordance with exemplary embodiments.
Figure 20B:
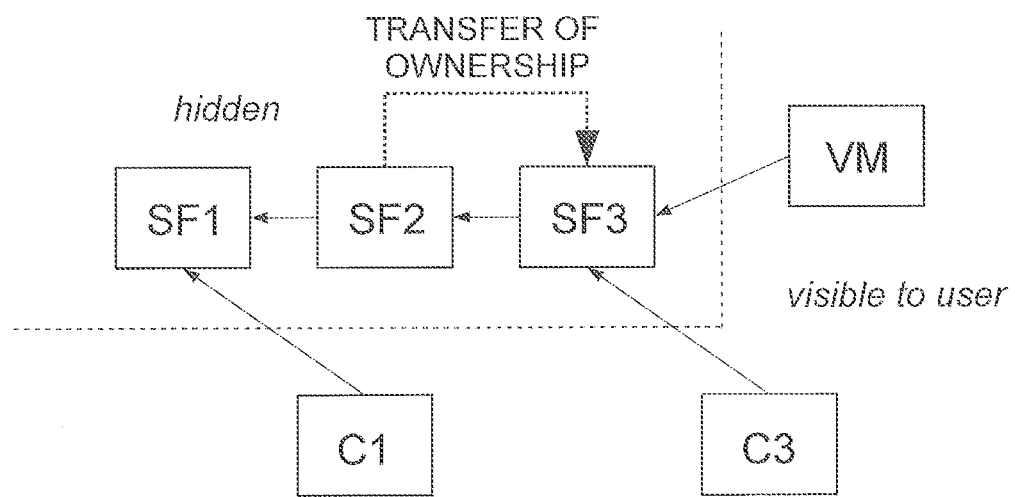
Figure 20C:
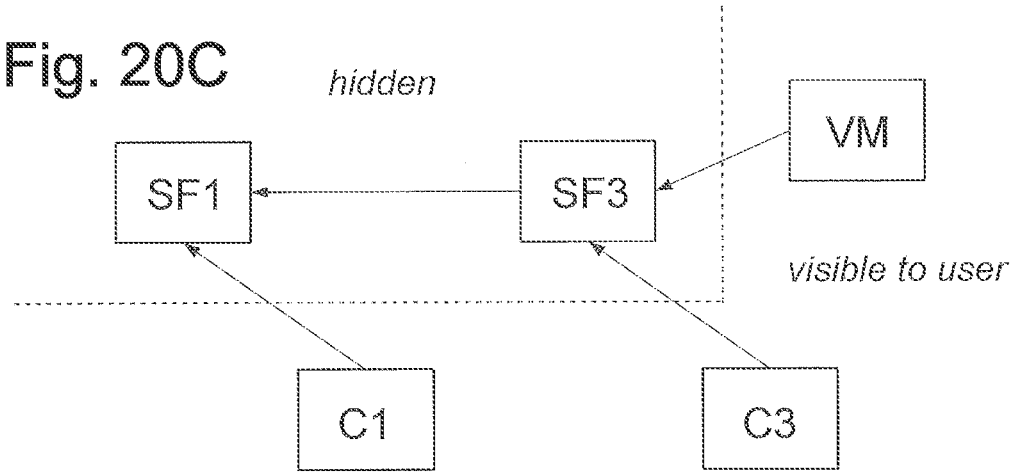

An example of such situation is illustrated with respect to FIGS. 20A to 20C. In a chain of snapshot-files SF1 to SF3 as shown in FIG. 20A and having clones C1 to C3 e.g. due to three times performing a cloning operation of a file VM, if the clone C2 is deleted (see FIGS. 20A and 20B), e.g. by a user, the snapshot-file SF2 that was previously referenced by the deleted clone C2 may become obsolete, because no visible object references the snapshot-file SF2 (see FIG. 20B), and it may be desirable to delete the snapshot-file SF2 to free blocks of storage space and to simplify the tree structure so as to arrive at a structure such as shown in FIG. 20C.

In order to increase storage space efficiency, a mechanism may be implemented according to which a parent snapshot-file of a certain snapshot-file is changed by removing the parent and making the previous closest indirect ancestor the new parent snapshot-file.

However, before deleting the snapshot-file SF2 and thereby freeing all of the data blocks owned by the snapshot-file SF2, the ownership of the data blocks that are shared with the child (in this case snapshot-file SF3) are transferred from the snapshot-file SF2, which is to be deleted, to its child snapshot-file SF3 as indicated by the arrow "transfer of ownership" in FIG. 20B. This makes sure that all data blocks needed (pointed to) by the child snapshot-file SF3 and potentially also by its direct and indirect successors are not unintentionally freed, while all data blocks that are owned by the snapshot-file SF2, which is to be deleted, but which are not shared (unshared data blocks) with the child snapshot-file SF3 will be freed automatically upon deletion of the snapshot-file SF2.

Accordingly, according to embodiments of the invention, there can be provided a process of removing a first snapshot-file of a snapshot-file tree in a file system which has a second snapshot-file as child snapshot-file. It is to be noted that removing a first snapshot-file of a snapshot-file tree in a file system which has a second snapshot-file as child snapshot-file is to be distinguished from "de-cloning of a file" as explained above and as disclosed in US 2012/0130949 A1 in which "de-cloning of a file" refers to removing a snapshot-file in a file system which has a mutable file as child, wherein ownership of shared blocks is transferred to a mutable file in contrast of transfer of ownership from a snapshot-file to another child snapshot-file thereof as in the process described in this section.

An example of a process of removing a first snapshot-file of a snapshot-file tree in a file system which has a second snapshot-file as child snapshot-file is illustrated with reference to the exemplary flow chart of FIG. 21. In step S1301, it is determined that the reference count of a certain snapshot-file, which is referenced by at least one other snapshot-file, has become 1, e.g. as in FIGS. 20A and 20B in which the reference count of snapshot-file SF2 has become 1 after deletion of clone C2 due to the only remaining referencing by its child snapshot-file SF3.

Here, in some embodiments, the step S1301 may be executed such that a walker fiber may repeatedly analyze the reference counts of the snapshot-files of a snapshot-file tree to trigger the process (or create a job in a job queue to instruct the process) as soon as it is determined by the walker fiber that a reference count of one of the snapshot-files has become 1. In other embodiments, it is also possible, that deletion of a clone (identified for example by a flag indicating that it is a clone) triggers the process (or create a job in a job queue to instruct the process).

In step S1302, the process determines, among the one or more blocks owned by the certain snapshot-file of step S1301, the one or more data blocks that are shared between the certain snapshot-file of step S1301 and its child snapshot-file. For example, in FIG. 20B, it is determined which of the block(s) owned by SF2 are shared with its child SF3.

In step S1303, the ownership of the one or more data blocks that are shared between the certain snapshot-file of step S1301 and its child snapshot-file as determined in step S1302 is transferred to the child snapshot-file.

Accordingly, after execution step of step S1303, the child snapshot-file will own the one or more data blocks that are shared between the certain snapshot-file of step S1301 and its child snapshot-file (unless owned by an ancestor of the certain snapshot-file of step S1301, because the ownership of those blocks would not be transferred but remains with the respective ancestor of the certain snapshot-file of step S1301).

According to some embodiments, transfer of ownership of data blocks from one snapshot-file to another snapshot-file can be performed according to a process as exemplarily illustrated with reference to the example of FIGS. 22A to 22C. This process is more advantageous than the process for transfer of ownership as discussed above because it dirties less metadata.

It is to be noted that the process for transfer of ownership as discussed below can replace the other method of transfer of ownership above and can be used also for de-cloning of files in some embodiments instead of the method above in order to reduce dirtying of metadata.

Generally, the process of transferring ownership may comprise a first step of setting the checkpoint number (second-type checkpoint number) of the pointers of the snapshot-file to be deleted (e.g. SF2 in FIG. 20B) that point to unshared blocks equal to or larger than the cloned-in checkpoint number (first-type checkpoint number) of its child snapshot-file (e.g. the CCN of SF3 in FIG. 20B) to which the ownership is to be transferred. In addition, after the above first step, in a second step the cloned-in checkpoint numbers (first-type checkpoint number) of the two snapshot-files are swapped.

Namely, the cloned-in checkpoint number of the snapshot-file to be deleted is increased to the value of the cloned-in checkpoint number of its child so that the unshared blocks of the first step will still be owned by the snapshot-file to be deleted, and the cloned-in checkpoint number of the child snapshot-file is decreased to the previous cloned-in checkpoint number of the snapshot-file to be deleted so that it assumes ownership of the shared blocks previously owned by the snapshot-file to be deleted (for which the pointer's CNs remain unchanged).

Thereafter, the ownership transfer is completed and the snapshot-file to be deleted can be deleted, thereby freeing the blocks still owned by it (i.e. the blocks for which the CN has changed in the first step above).

An example thereof is illustrated in connection with exemplary FIGS. 22A to 22C. FIG. 22A shows examples of the three snapshot-files SF1 having a CCN=10, SF2 having a CCN=20 and SF3 having a CCN=30. Exemplarily, each snapshot-file has four pointers to blocks, wherein the pointers of SF1 point to blocks B1 to B4, respectively, and the pointers to blocks B1 and B4 have CN=10, respectively, and the pointers to blocks B2 and B3 have CN=15, respectively.

Accordingly, since all of SF1's pointers' CNs are equal or larger than the CCN of SF1, SF1 owns all blocks B1 to B4. The pointers of SF2 point still to blocks B1 and B4 with unchanged CNs but SF2's remaining pointers point to blocks B5 with CN=20 and B6 with CN=25. Accordingly, since SF2's pointers to blocks B5 and B6 have CNs that are equal or larger than the CCN of SF2, SF2 owns the blocks B5 and B6, while it furthermore shares blocks B1 and B4 with SF1 that owns these blocks.

The pointers of SF3 point still to blocks B1, B4 and B5 with unchanged CNs so that it shares blocks B1 and B4 with SF1 and SF2 that are owned by SF1, and so that it still shares block B5 with SF2 which is still owned by SF2. However, the fourth pointer of SF3 points to the block B7 having a CN=30 so that it owns the block B7 because its CNN=30 is equal to the CN=30 of the pointer to block B7.

Figure 22B:
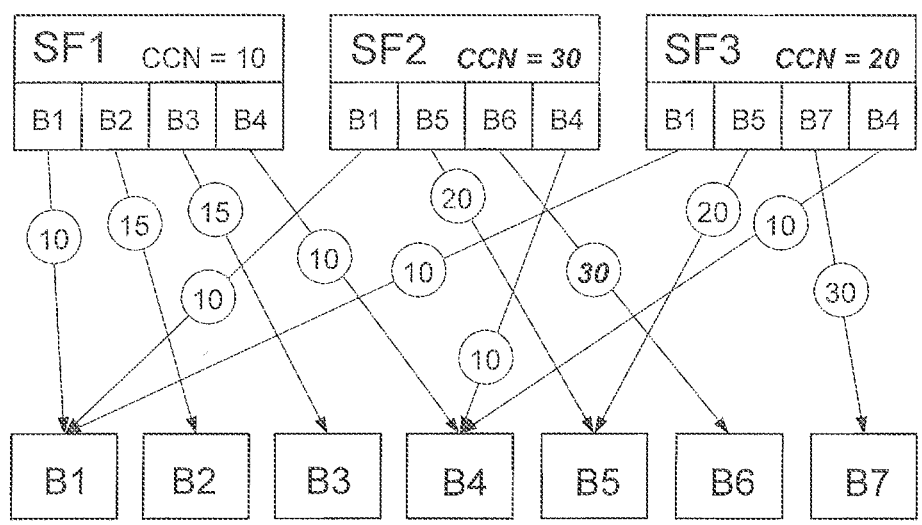

After the transfer of ownership as discussed above, the assignment of CCNs of SF1, SF2, and SF3 and CNs of their block pointers are changed to the numbers as exemplarily indicated in FIG. 22B. Namely, the CCNs of SF2 and SF2 have swapped (SF2 now having the CNN=30 and SF3 now having the CNN=20) and the CN of the block pointer to the unshared data block B6 is made equal to the previous CNN of SF3, i.e. the checkpoint number of the pointer to the unshared block B6 is made CN=30 (it could also be made larger in other embodiments noting however that it should preferably be kept, similar to all other checkpoint numbers, less than or equal to the current checkpoint number of the file system).

In this situation, the blocks B1 to B4 are still owned by SF1 and the block B7 is still owned by SF3, however, SF3 now also additionally owns the shared block B5 because its pointer's CN is now equal to the CNN of SF3. Accordingly, regarding to the shared block B5 (which was previously not owned by SF1 and never was shared with SF1 but was/is shared among SF2 and SF3) a transfer of ownership has occurred. The block B6 is however owned still by SF2.

Figure 22C:
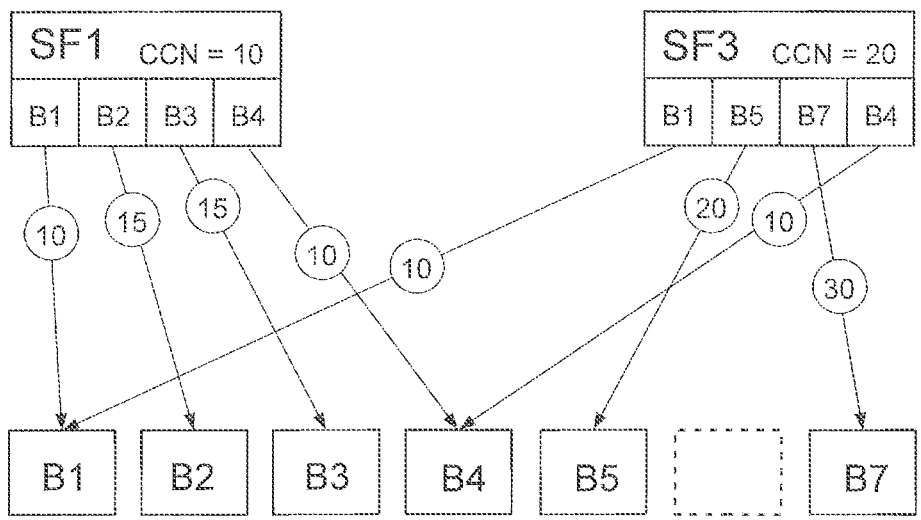

FIG. 22C shows an example after deletion of SF2 which also has the effect that block B6 has been made free as it was owned by SF2 at the time of deletion (indicated as a dashed box). Accordingly, by easy and simple algorithm and without significantly dirtying related metadata, the snapshot-file tree can be simplified and storage space can be managed more efficiently due to reliable and efficient freeing of unneeded data blocks.

3.10.3 Removing a Root Snapshot-File

Figure 23A:
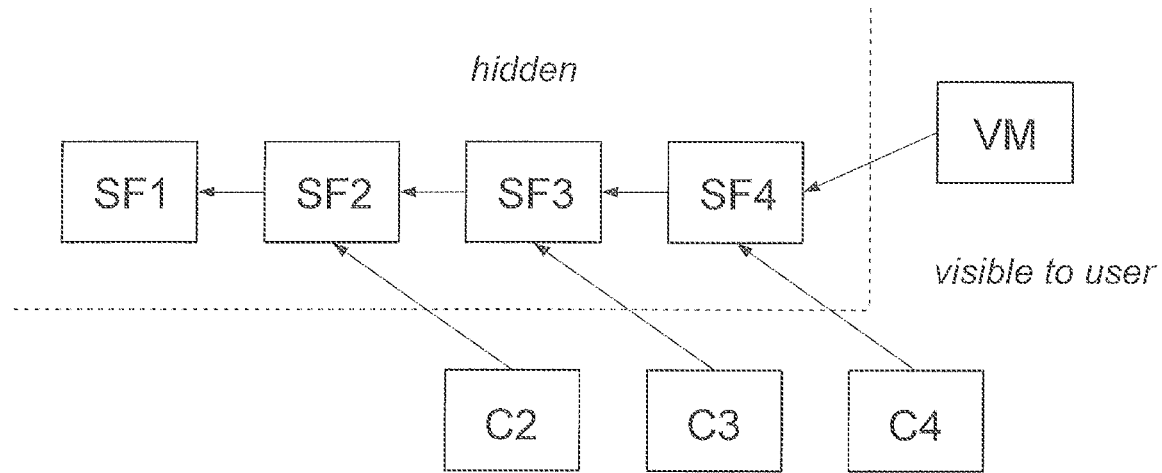
FIGS. 23A and 23B exemplarily illustrate an example of removing a root snapshot-file SF1 in accordance with exemplary embodiments.
Figure 23B:
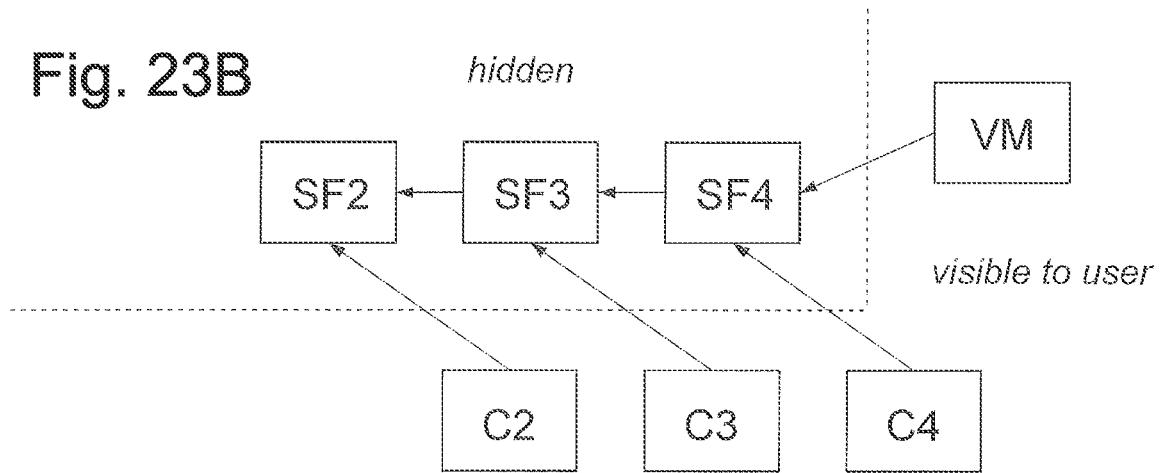

In some embodiments, there may be provided a de-cloning function in connection with de-cloning of snapshot-file in file systems in which the one or more oldest clones are manually or automatically deleted, e.g. with the intent to free storage space. For example, referring again to a snapshot-file tree as exemplarily shown in FIG. 18, if the oldest clone, i.e. clone C1, is deleted, a tree structure as shown in FIG. 23A arises which can be simplified to a tree structure as shown in FIG. 23A by removing the root snapshot-file SF1 after deletion of clone C1 upon which process the child snapshot-file SF2 of the former root snapshot-file SF1 becomes the new root snapshot-file SF2.

Similar to the terminology of "de-cloning a file" as discussed above, such process may be referred to as "de-cloning of a snapshot-file", specifically de-cloning of snapshot-file SF2, performed by removing the parent (while in the process of section 6.2 above, the term "de-cloning" might be inappropriate because the parent is changed and not removed in the sense that there is no parent after completing the process).

An example of a process of removing a root snapshot-file of a snapshot-file tree in a file system which has a second snapshot-file as child snapshot-file of the root snapshot-file is illustrated with reference to the exemplary flow chart of FIG. 24. In step S1601, it is determined that the reference count of a root snapshot-file, which is referenced by at least one other snapshot-file, has become 1, e.g. as in FIG. 23A in which the reference count of root snapshot-file SF1 has become 1 after deletion of clone C1 due to the only remaining referencing by its child snapshot-file SF2.

The steps S1602 of determining shared blocks between the root snapshot-file and its child snapshot-file, S1603 of transferring ownership of shared blocks from the root snapshot-file to its child snapshot-file, and S1604 of deleting the root snapshot-file after the transfer of ownership can be executed similar to steps S1302 to S1304 as explained in connection with FIG. 21 above.

Specifically, according to some embodiments, transfer of ownership of data blocks from one snapshot-file to another snapshot-file can be performed according to the process as exemplarily illustrated with reference to the example of FIGS. 22A to 22C.

In addition, the exemplary process of FIG. 24 may comprise an additional step S1605 of indicating that the child snapshot-file of the former root snapshot-file (that has been deleted in step S1604) is the new root snapshot-file of the snapshot-file tree. Such step may be performed, for example, by setting a respective flag (or alternatively unsetting a respective flag) associated with the new root snapshot-file to a value indicating that the new root snapshot-file is the root snapshot-file of the tree.

Figure 25A:
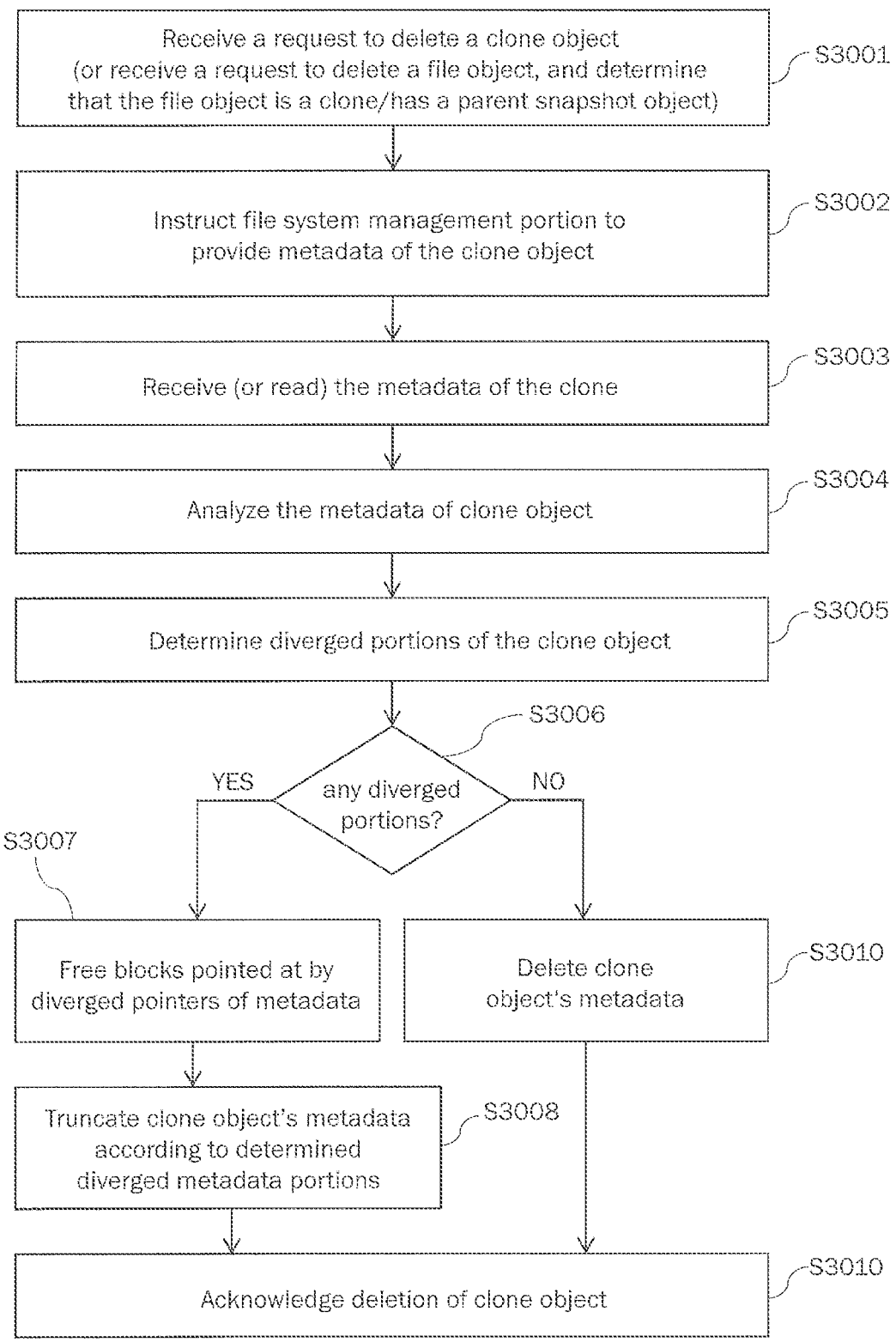
FIG. 25A is an exemplary logic flow diagram schematically illustrating an exemplary process of deleting a cloned object according to exemplary embodiments.

4. Proposed Aspects for Improvement of One or More of the Above Aspects 4.1 Improvements of Deletion of Clones FIG. 25A is an exemplary logic flow diagram schematically illustrating an exemplary process of deleting a cloned object according to exemplary embodiments.

In step S3001, a request for deleting a clone object is received, e.g. received at the software-side processing section (e.g. received from a disk interface portion or a data movement and/or data management portion of a hardware-side). That is, the process of FIG. 25A exemplarily relates to a situation in which a clone object shall be deleted in the file system based on a request from a user or administrator.

Also, it is possible in some exemplary embodiments that a request to delete a file object is received in step S3001 based on a request from a user or administrator, and the software side processing section instructs to read the file object's metadata (in particular and maybe only the root node of the file object to be deleted, and based on the data of the root node, it may be determined that the file object to be deleted is a clone, i.e. has/references a parent snapshot-file object).

In further exemplary embodiments, it is possible that the instruction (or task) to delete the clone object is automatically given, e.g. based on a pre-set clone deletion condition such as a maximum number of clones (e.g. if a user creates another clone of a file for which there are already one or more other clones, and an oldest clone is automatically deleted when the number of clones exceeds the set maximum number of clones).

The situation assumes exemplarily that at least the clone object to be deleted and its corresponding file object(s) (and/or, in other exemplary embodiments, at least its corresponding snapshot object) exist in the file system, and/or one or more further clone objects may exist as well.

It is to be noted that the term "file object" and "clone object" may be interchanged typically in some embodiments, in particular in case both represent basically writable files, which at time of cloning have been identical copies of each other and may have diverged since time of the cloning operation. That is, each one may be regarded as representing the file or file object and the other may regarded as the clone or clone object thereof, both being clones with respect to each other basically. That is, in the present context of the described embodiments for deleting a clone object, the term "clone object" may refer to the file system object that is the one to be deleted among two or more clones/files, or even as the last remaining clone referencing a parent snapshot object.

In step S3002, the software-side continues with instructing the file system management portion to provide some or all metadata of the clone object to be deleted (and in some embodiments also its corresponding file object(s)'s metadata and/or its parent snapshot-file's metadata).

Here, the term "provide" may mean for example, in some embodiments, that the file system management portion may send/transfer the requested metadata to the requesting entity, or, in other preferred exemplary embodiments, this may mean that some or all of the requested metadata is provided in a memory such as e.g. a cache memory which can be accessed by the requesting entity directly or indirectly. For example, by providing the metadata in a cache memory, the metadata may later be provided more efficiently and more quickly by reading the metadata previously stored in cache memory.

In step S3003, the requested metadata is received (or directly or indirectly read) at (by) the software-side processing portion (e.g. also by another instruction to read the metadata from cache memory).

Specifically, in some exemplary embodiments, the received or read metadata may comprise some or all metadata of the clone object to be deleted (and/or some or all metadata of the corresponding file object(s); which may also be another clone object among plural clone objects, for example; and/or some or all metadata of the corresponding parent snapshot-file object), or it may relate to data of partial portions of metadata of the clone object to be deleted (and/or portions of metadata of the corresponding file object(s); and/or portions of metadata of the corresponding parent snapshot-file object).

In step S3004, the received (or read) metadata of the clone object to be deleted is analyzed to determine, based on the analysis of the metadata of the clone object (e.g. by analyzing the metadata of the clone object only, and/or by comparison of clone object's and file object's metadata or clone object's and parent snapshot object's metadata), in step S3005 the portions of the clone object which have diverged since the time of cloning (e.g. since the time of creation of the clone object in connection with cloning of another file object).

That is, at the time of cloning (or creation of the clone object), the clone object may represent basically an identical copy of the file object and the corresponding parent snapshot object (since creation of the clone may mean that only the corresponding root nodes are created but the remaining metadata, including indirect and direct nodes are all shared by the clone(s) and the parent snapshot object), i.e. it is completely undiverged with respect to the file object and/or the parent snapshot object. However, as soon as user data of the clone object and/or the file object will be modified, deleted, truncated, extended, added etc., the clone object will diverge with respect to the file object regarding e.g. the modified, removed or added user data and/or with respect to the parent snapshot object regarding e.g. the modified, removed or added user data.

In step S3006, it is determined whether any diverged portions do exist, and, if the step S3006 returns NO, the clone object's metadata is deleted in step S3010 and the deletion of the clone object is exemplarily acknowledged to the entity which sent the request of step S3001.

In particular, it may be determined that no diverged metadata portions do exist (S3006 returns NO) in case the root node of the clone object points to the same one or more direct and/or indirect nodes compared to the node pointer(s) of the root node of the file object and/or the node pointer(s) of the root node of the parent snapshot object. On the other hand, if the (or at least one of the) node pointer(s) of the root node of the clone object points to a different direct and/or indirect node compared to the node pointer(s) of the root node of the file object and/or the node pointer(s) of the root node of the parent snapshot object, this means that at least some diverged portions exist (S3006 returns NO).

That is, the decision YES/NO in step S3006 may be determined based on the root node metadata only, and, in some embodiments, no additional portions of metadata may be needed for the decision. Accordingly, step S3006 may, in some exemplary embodiments, be performed prior to (or simultaneously to) the step S3005, wherein further the step S3005 may only be performed if step S3006 returns YES.

Also, in some exemplary embodiments, the decision YES/NO in step S3006 may be determined based on the root node metadata of the clone object, and in particular e.g. based on the clone object's cloned-in checkpoint number (first-type checkpoint number) and the clone object's checkpoint number (second-type checkpoint number), based on the clone object's cloned-in checkpoint number and the clone object's root node pointer's checkpoint number(s), or based on the clone object's cloned-in checkpoint number, the clone object's checkpoint number and the clone object's root node pointer's checkpoint number(s). For example, in some exemplary embodiments, if the checkpoint number(s) of the node pointer(s) of the clone object's root node is/are less than the clone object's cloned-in checkpoint number, it may be determined based on the comparison that the clone object is still completely undiverged; or, in other exemplary embodiments, if the checkpoint number of the clone object root node is equal to the clone object's cloned-in checkpoint number, it may be determined based on the comparison that the clone object is still completely undiverged.

On the other hand, if step S3006 returns YES, this means that at least some data has been modified, added or removed etc. and at least some portions of the clone object have diverged from the file object and/or the parent snapshot object since the time of cloning.

Then, in step S3007, the process continued to free the blocks which are pointed at by pointers in the metadata of the clone object which have been determined to have diverged (in some embodiments, this may additionally include determining the diverged portions of metadata of the clone object to be deleted). That is, one or more user data blocks that are respectively referenced by a respective pointer relating to a diverged portion of the metadata of the clone object are freed (which may mean in particular that the blocks are made available for a new data allocation to have new data written thereto).

For example, diverged blocks may be determined based on the cloned-in checkpoint number of the clone object to be deleted (as indicated e.g. in the root node of the clone object and/or in the root node of its parent snapshot object) and the checkpoint numbers of block pointers of the root node and/or one or more direct nodes of the clone object's metadata. Specifically, for data blocks for which the block pointer's checkpoint number is less than the cloned-in checkpoint number of the clone object, it may be determined that the data of the respective block is undiverged (has not diverged since creation of the clone object in connection with cloning of another file object).

Otherwise, if the block pointer's checkpoint number is equal to or larger than the cloned-in checkpoint number of the clone object, the respective data block has diverged or relates to diverged user data of the clone object to be deleted (in that case one may also refer to the situation that the clone object owns the respective data block).

It is also to be noted that the metadata branch of the clone object's metadata object tree structure information which points from the root node to the diverged data block and which may include one or more indirect nodes and does include at least the one direct node pointing at the diverged block (unless being directly pointed at by a block pointer of the root node) relate(s) to the diverged portion(s) of the metadata of the clone object. In some exemplary embodiments, it is possible to determine whether a direct node or indirect node relates to diverged metadata based on a comparison of the cloned-in checkpoint number of the clone object to be deleted with the checkpoint number of the respective direct node/indirect node and/or the respective parent node's node pointer's checkpoint number.

For example, if the checkpoint number of a direct or indirect node is equal to or larger than the cloned-in checkpoint number of the clone object, the respective direct/indirect node may be determined to relate to diverged metadata of the clone object, or, in some embodiments, if the checkpoint number of the node pointer of the parent node pointing to a direct or indirect node is equal to or larger than the cloned-in checkpoint number of the clone object, the respective direct/indirect node may be determined to relate to diverged metadata of the clone object.

In step S3008, the process may continue to truncate (delete) in one step or multiple steps the clone object's metadata according to the determined diverged metadata portions (e.g. the data of the diverged metadata, in particular e.g. the root node and the diverged indirect and/or direct nodes, may be truncated step-by-step, e.g. node-by-node or branch-by-branch). However, it is to be noted that undiverged portions of metadata of the clone object preferably remain to be stored in some exemplary embodiments as they are referenced (pointed at) at least by the metadata of the corresponding parent snapshot object, i.e. by being included also in the object tree structure information of the parent snapshot object's metadata.

For example, as soon as one or more portions of the metadata of the clone are determined to relate to diverged portions in step S3005, the corresponding metadata portion may be truncated, wherein the truncation may be continued until the metadata of the clone object is removed completely (e.g. until a length thereof is set to a minimal length or even set to 0, e.g. by an instruction to set the length to 0 or by applying multiple respective truncation setlength instructions, which may be referred to as intermediate setlength instructions).

The above-mentioned truncation instructions may be performed by one entity (e.g. one processor and one application running on the processor) or may be applied to by multiple entities, e.g. by generating plural truncation jobs to be added to a job queue of jobs (tasks) to be executed by the one or more processors of a software-side of the file server. Such truncation jobs may be executed in sequential order or in parallel, for example.

Also, in some exemplary embodiments, the software-side processing section may create one or more truncation jobs in connection with determined diverged metadata portions (and/or diverged user data portions) to be sent to the file system management portion of the hardware-side, e.g. as internal file system inquiries, to be executed by the file system management portion of the hardware-side (e.g. in parallel or based on background truncation jobs etc.). This may apply to S3008 but also to S3010. Then, in exemplary embodiments, S3010 and S3007 may be interpreted as issuing instructions to the file system management portion of the hardware-side, e.g. to instruct deletion of the clone object's metadata in step S3010 and/or to instruct truncation or multiple truncations of diverged portions of metadata of the clone object.

The above steps, when step S3006 gives YES, may also include freeing (or making sparse) block pointers or other pointers (such as e.g. pointers to direct or indirect nodes) which are diverged or relate to and/or point to diverged metadata. It is to be noted that metadata of undiverged portions cannot be deleted in some embodiments, e.g. when in some embodiments as discussed above and below the undiverged metadata or at least portions of the undiverged metadata is shared between the file object and the clone object to be deleted.

After truncating the clone object's metadata in step S3008, the deletion of the clone object is also acknowledged in step S3009.

In some exemplary embodiments, the above steps may preferably be performed by a software-side processing portion of a file system server, for example, by one or more processors which execute an operation system application and one or more further management and/or control applications.

FIG. 25B is an exemplary logic flow diagram schematically illustrating an exemplary partial process of deleting a cloned object according to exemplary embodiments. Exemplarily, the process may be executed by a processing portion of a file system management portion, unit, section or module of a file server according to any of the above aspects, for example.

In step S3021, at the file system management portion, the inquiry to provide some or all metadata of the clone object is received (e.g. based on or representing the instruction of step S3002 above). Optionally, this may also include receiving the inquiry to provide some or all metadata of the corresponding file object(s) and/or receiving the inquiry to provide some or all metadata of the corresponding parent snapshot object.

In preferred implementations in some embodiments, the deletion of dependent clone objects (that may share a parent) is preferably performed independently, since divergence may typically be a unique characteristic of each clone object in relation to its parent snapshot object(s) as they can be modified independently and differently after the time of cloning in some embodiments, and diverged portions may be unique to the particular clone object to be deleted, and only that clone object's diverged portions are needed for its deletion.

In response to the received inquiry, the file system management portion continues to load the clone object metadata (or portions thereof) in step S3022 (and, optionally, the file object metadata or portions thereof in step S3023 and/or the parent snapshot object metadata or portions thereof in step S3024).

Then, the loaded clone object metadata (and, optionally the optionally loaded file object metadata and/or parent snapshot object metadata) is transferred or provided to the requesting entity in step S3025 e.g. the software-side of the file server (e.g. the provided metadata may be transferred to the software-side of the file server or provided to a memory that can be accessed directly or indirectly by the software-side of the file server, e.g. a cache memory or the like). For example, by providing the metadata in a cache memory, the metadata may later be provided more efficiently and more quickly by reading the metadata previously stored in cache memory.

Exemplarily, in some embodiments, the step(s) of loading metadata or metadata portions in step S3022 (and optionally S3023 and/or S3024) may include reading or loading one or more root nodes (e.g. a root node of the object data and optionally one or more root nodes of the file object(s) and/or a root node of the parent snapshot object), one or more indirect nodes, one or more direct nodes, or portions or partial metadata of the afore-mentioned nodes.

Figure 26:
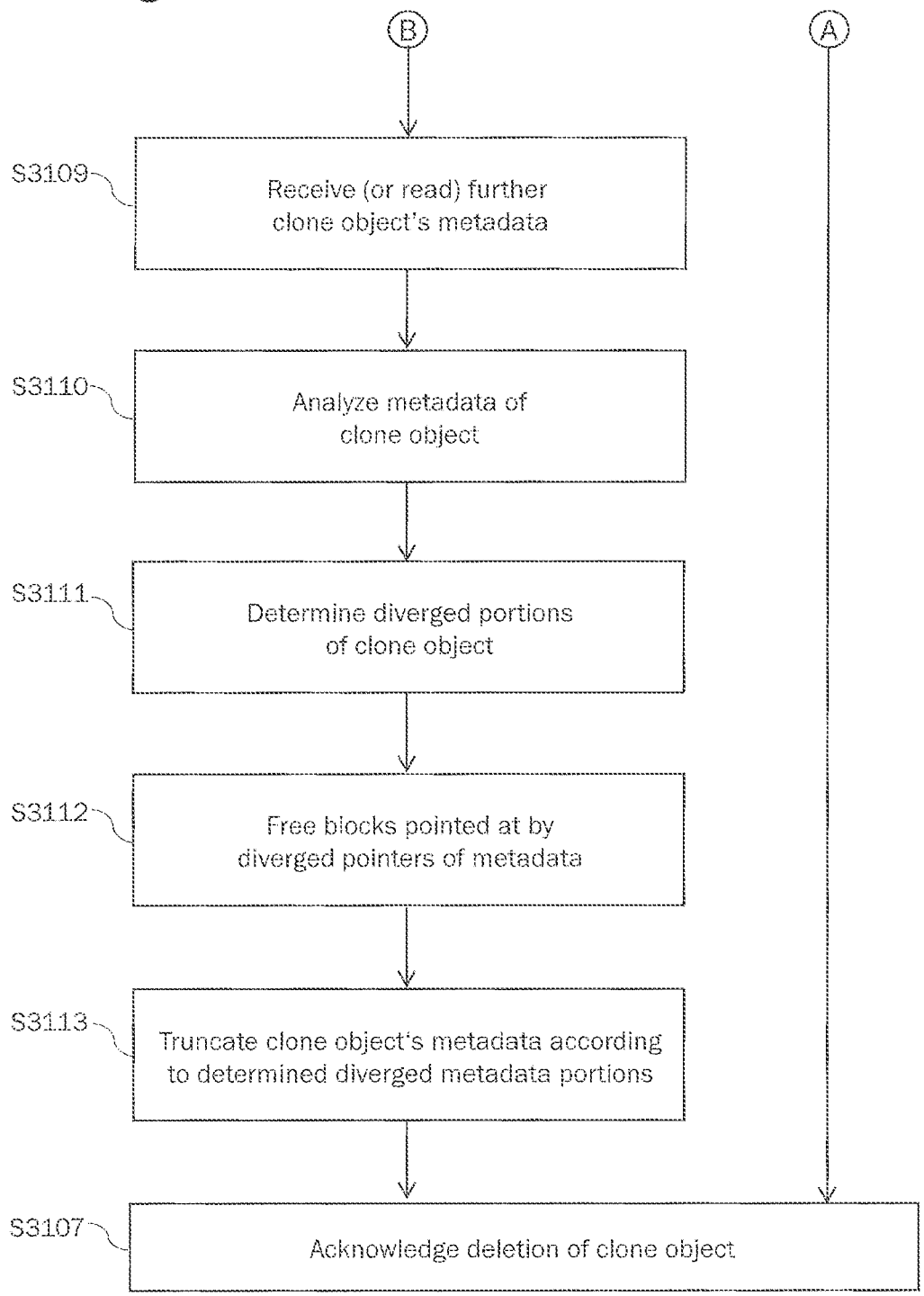
FIG. 26 is another exemplary logic flow diagram schematically illustrating an exemplary process of deleting a cloned object according to further exemplary embodiments.

FIG. 26 is another exemplary logic flow diagram schematically illustrating an exemplary process of deleting a cloned object according to further exemplary embodiments.

In step S3101, a request for deleting a clone object is received, e.g. received at the software-side processing section (e.g. received from a disk interface portion or a data movement and/or data management portion of a hardware-side). Similar aspects as described for step S3001 may apply.

In step S3102, the software-side continues with instructing the file system management portion to provide a root node (or partial data of the root node) of the clone object to be deleted (and a optionally a root node or partial data of the root node of its corresponding file object(s) and/or the root node or partial data of the root node of the parent snapshot object).

Again, the term "provide" may mean for example, in some embodiments, that the file system management portion may send/transfer the requested root nodes' data to the requesting entity, or, in other exemplary embodiments, this may mean that the requested metadata is provided in a memory such as e.g. a cache memory which can be accessed by the requesting entity directly or indirectly. For example, by providing the metadata in a cache memory, the metadata may later be provided more efficiently and more quickly by reading the metadata previously stored in cache memory.

In step S3103, the requested root nodes' metadata is received (or directly or indirectly read from cache memory) at (by) the software-side processing portion.

In step S3104, for example, the received (or read) root node's metadata of the clone object to be deleted is analyzed to determine, based on the clone object's root node or portions thereof, whether the clone object has diverged from the parent snapshot object (with respect to the parent snapshot object) based on the received (or read) root node's metadata or portions thereof.

In some exemplary embodiments, the analysis may include the comparison of root nodes metadata of the root nodes of the clone object with the root node(s) of the corresponding file object(s) and/or the root node of the parent snapshot object, and may include comparing pointers of the root nodes to determine whether there is a divergence at the level of leaf nodes of the root nodes.

For example, if one or more of the pointers of the clone object's root node point to other leaf nodes than corresponding pointers of the file object's root node(s) or the parent snapshot's root node, it can be determined that the clone object has diverged. On the other hand, if all pointers of the root node of the clone object still point to the same leaf nodes as the pointers of the root node of the file object(s) or the parent snapshot's root node, it can be deduced that the clone object has not diverged with respect to the file object(s) and/or with respect to the parent snapshot object.

In particular, it may be determined that no diverged metadata portions do exist in step S3104 in case the root node of the clone object points to the same one or more direct and/or indirect nodes compared to the node pointer(s) of the root node of the file object and/or the node pointer(s) of the root node of the parent snapshot object. On the other hand, if the (or at least one of the) node pointer(s) of the root node of the clone object points to a different direct and/or indirect node compared to the node pointer(s) of the root node of the file object and/or the node pointer(s) of the root node of the parent snapshot object, this means that at least some diverged portions exist.

In some embodiments, the determination of step S3104 may be performed based on the root node metadata only, and, in some embodiments, no additional portions of metadata may be needed for the decision.

In some exemplary embodiments, the determination of step S3104 may be performed based on the root node metadata of the clone object, and in particular e.g. based on the clone object's cloned-in checkpoint number (first-type checkpoint number) and the clone object's checkpoint number (second-type checkpoint number), based on the clone object's cloned-in checkpoint number and the clone object's root node pointer's checkpoint number(s), or based on the clone object's cloned-in checkpoint number, the clone object's checkpoint number and the clone object's root node pointer's checkpoint number(s). For example, in some exemplary embodiments, if the checkpoint number(s) of the node pointer(s) of the clone object's root node is/are less than the clone object's cloned-in checkpoint number, it may be determined based on the comparison that the clone object is still completely undiverged; or, in other exemplary embodiments, if the checkpoint number of the clone object root node is equal to the clone object's cloned-in checkpoint number, it may be determined based on the comparison that the clone object is still completely undiverged.

In further exemplary embodiments, the determination of step S3104 may be performed on the basis of further metadata (metadata portion) included in the root node of the clone object, e.g. a bit, flag or indicator to indicate whether the clone object has diverged (which may need to be set or switched to "diverged" the first time of modifying the clone object or divergence of the clone object after its creation) or even a data field indicating a level of divergence (e.g. low, middle or high divergence or even indication of a percentage of divergence) with respect to the file object (which may need to be adapted or adjusted each time of modifying the clone object or divergence of the clone object). In such exemplary embodiments, when the divergence may be determined on the basis of metadata included in the root node of the clone object, steps S3102 and S3103 may avoid requesting/providing/receiving the root node and/or metadata portions of the file object.

If step S3105 returns NO, e.g. in case it is determined that the clone object does not diverge or has not diverged with respect to the file object, the method may continue already with the deletion of the clone object's metadata (which may basically correspond to deleting the root node of the clone object) in step S3106 and acknowledgement thereof in step S3107, in particular without loading or requesting further metadata, e.g. by just issuing an instruction to fully truncate the clone object's metadata (e.g. by instructing to set the length of the clone object or clone object's metadata to 0, e.g. by an instruction: setlength to 0).

This may assume in some embodiments that the instruction to delete a clone object or clone object's metadata may be issued to the file management portion which then executes the deletion, and may be assumed to be configured to determine, on the hardware-side, the metadata's divergence, preferably to only load and/or process the diverged portions, which in case of S3106 in FIG. 26 may mean only the root node of the clone object if all other metadata is still shared because it is undiverged.

This is especially even more efficient compared to the above process of FIGS. 25A and 25B because it does not need to be requested to load the full metadata of clone object and file object in the cases in which no divergence has actually occurred (i.e. in which case the full metadata would be needed to be loaded including multiple and sometimes up to hundreds or even thousands of nodes etc.). That is, the improvement is a significant improvement in efficiency and reduction of processing burden and latencies.

On the other hand, if step S3105 returns YES, the method may continue with steps S3108 to S3107 in accordance or similar to steps S3002 (may be excluding the root node, and maybe in steps of requesting groups of direct and/or indirect nodes or portions thereof), S3003, S3004, S3005, S3007, S3008 and S3009. However, a step similar to step S3006 is omitted in FIG. 26 as it might be regarded as being redundant because such step cannot give NO based on the outcome of step S3105 for reasons of logic. Similar aspects as described above for FIGS. 25A and 25B may apply.

It is to be noted that, in some exemplary embodiments, the group of steps S3108 to S3113 may be performed repeatedly, e.g. in a loop, or e.g. step-by-step, node-by-node or branch-by-branch, only for portions of metadata of the object clone object's metadata object tree structure information.

In such exemplary embodiments, the step S3108 may include instructing to provide only a portion of metadata including e.g. one or more indirect and/or direct nodes, or one or more branches of the clone object's metadata object tree structure information. Then, the steps S3109 to S3113 may only be performed for the instructed portion of clone object's metadata including e.g. one or more indirect and/or direct nodes, or one or more branches of the clone object's metadata object tree structure information.

In further exemplary embodiments, it is even more efficient if another instruction to read-ahead (read-ahead instruction or read-ahead inquiry) the clone object's metadata object tree structure information is issued from the software-side to the file management portion of the hardware side. Such instruction to read-ahead the clone object's metadata object tree structure information may be processed by the hardware-side similar to exemplary aspects above or below relating to "providing object tree structure information" or "providing clone object's metadata", but the loaded metadata is provided to a cache memory, so that the instruction to provide/transfer a portion of metadata in step S3108 may be handled more efficiently as the metadata can be transferred to the software-side quickly from a cache memory.

In some embodiments, the hardware-side may read-ahead the full object tree structure information of the metadata of the clone object, but in some more preferred exemplary embodiments, the file system management portion may be configured to only load diverged portions of the object tree structure information of the metadata of the clone object to the cache memory, e.g. based on a process analogous or similar to the exemplary process of FIG. 27 below.

The read-ahead mechanism of the metadata object tree information of a file object to be deleted according to some of the above-mentioned exemplary embodiments and mechanisms may also be used in further exemplary embodiments, e.g. when deleting non-clone objects for same or similar reasons, e.g. to accelerate deletion of large file system objects and make the freed space available more quickly. The potential only difference in such embodiments could be, for example, that, in the deletion of non-clone file objects, there does not need to be performed any analysis of metadata divergence by neither the software-side nor the hardware-side.

Also, in step S3113 the software-side processing section may create one or more truncation jobs to execute the truncation of the diverged portions of the metadata of the clone object in one or more truncation steps to be executed by the hardware-side processing section(s) of the file system management portion. This may involve the requirement to read the diverged portions of the metadata of the clone object (again) by the hardware-side processing section(s) of the file system management portion, which can be done more efficiently if the diverged portions of the metadata of the clone object are already stored previously in the cache memory e.g. based on the above-mentioned read-ahead of diverged portions of the metadata of the clone object.

Figure 27:
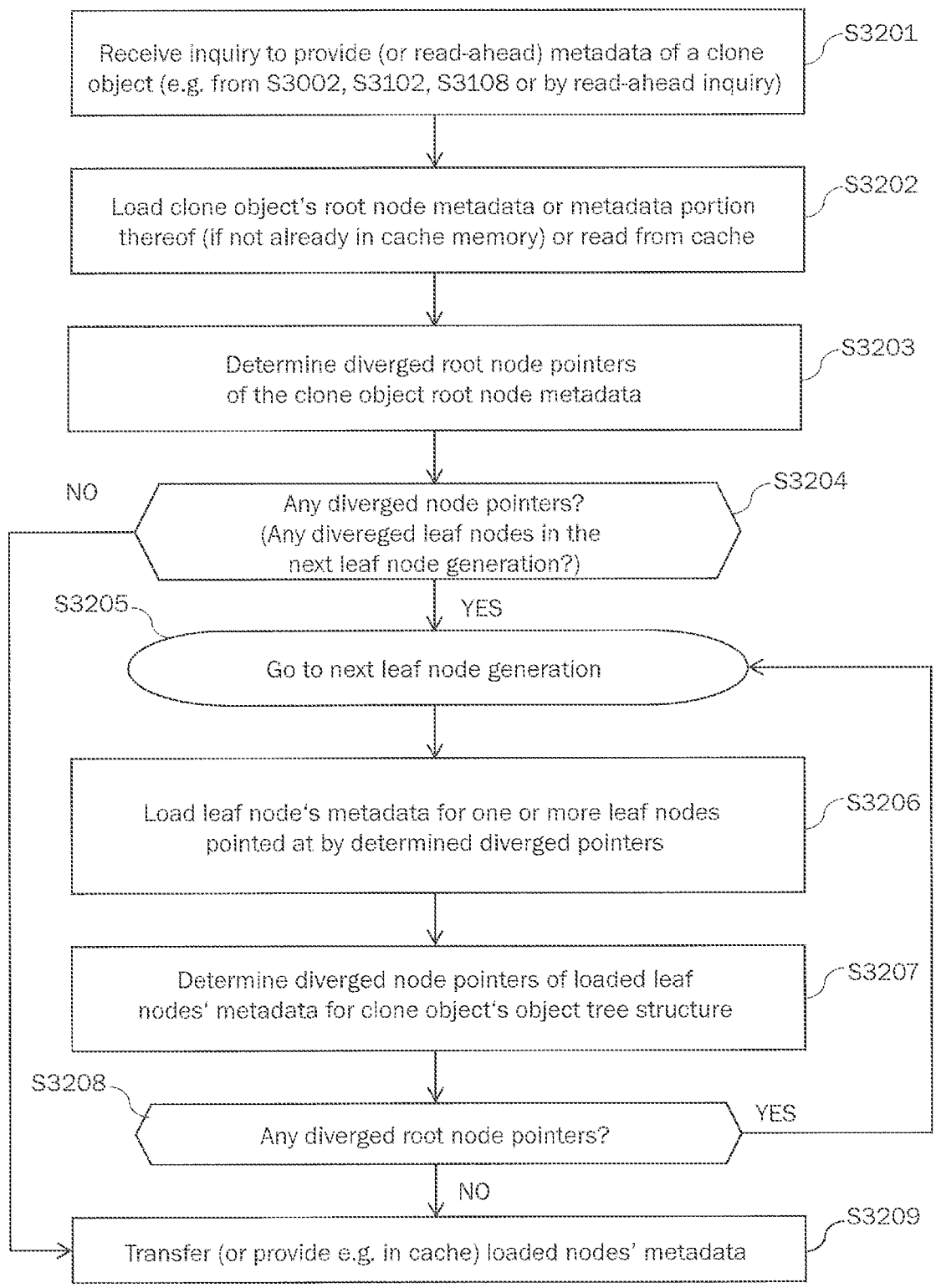
FIG. 27 is an exemplary logic flow diagram schematically illustrating an exemplary process of determining diverged portions of a cloned object according to exemplary embodiments.

FIG. 27 is an exemplary logic flow diagram schematically illustrating an exemplary process of determining diverged portions of a cloned object according to exemplary embodiments.

In step S3201, the file system management portion of the hardware-side of the file server may receive an inquiry to provide the metadata of the clone object (and optionally the metadata of the corresponding file object(s) and/or the parent snapshot object). Such inquiry may be a generic inquiry or an inquiry which is specifically designated to deletion of clones e.g. based on the instruction of steps S3002, S3102 or S3108 above.

The inquiry may relate generally to the full metadata of the clone object (and optionally the full metadata of the corresponding file object (s) and/or the parent snapshot object), or it may relate to specific portions thereof (e.g. specific one or more root, direct and/or indirect nodes, or nodes of a specific node generation or node branch in particular of the clone object's object tree structure).

As exemplary explained above, the instruction or inquiry may also only relate to specified portions of the clone object's object tree structure metadata, or it may relate to an inquiry to read-ahead (to provide in the cache memory) specified portions of the clone object's object tree structure metadata, specified portions of diverged metadata of the clone object's object tree structure metadata, or the complete clone object's object tree structure metadata.

At first, in step S3202, the file system management portion may load the root node of the clone object to be deleted (and optionally the root node of the corresponding file object(s) and/or the parent snapshot object), or a portion thereof such as pointers or the above-mentioned flag, indicator, bit or data field indicating divergence of the clone object. In some exemplary embodiments, if the root node of the clone object to be deleted is already provided in the cache memory, the respective root node metadata may be efficiently retrieved from the cache memory (e.g. in case the inquiry is issued after a previously issued a read-ahead inquiry or if the inquiry is received in connection with step S3108 and the root node metadata has been provided in cache memory already upon receiving the inquiry of step S3102 previously).

Based on the loaded information (or the information retrieved from cache memory), the file system management portion may determine in step S3203 the diverged root node pointers of the clone object's root node metadata, e.g. based on the root node metadata of the clone object or portions thereof, e.g. based on the cloned-in checkpoint number of the clone object e.g. based on or compared with at least one of the checkpoint number of the root node/clone object and/or the checkpoint number(s) of the one or more leaf node pointers of the root node of the clone object (or e.g. also based a comparison of data related to pointers of the clone object's and parent snapshot object's root nodes or direct comparison of pointers thereof).

In step S3204, the file system management portion determines based on step S3203 whether there are any diverged pointers in the root node of the clone object (or in general whether any of the leaf node(s) of the root node of the clone object are diverged with respect to the object tree structure of the parent snapshot object).

If step S3204 returns NO, then the file system management portion may continue with transferring (or providing, e.g. indirectly providing in the cache memory) the up to now loaded metadata to the software-side (which at this point may be no data at all, if the root node metadata has been transferred or provided previously or the root node data itself or portions thereof).

On the other hand, if the step S3204 returns YES, the file system management portion may start to walk through the branches of the object tree of the clone object to be deleted to determine the nodes and/or branches of the object tree structure of the clone object to be deleted to determine the diverged regions, nodes, branches or portions of the object tree structure information of the clone object to be deleted. This walk-through may be performed node-by-node, node-generation-by-node-generation or branch-by-branch, wherein this exemplary embodiment exemplarily assumes a walk-through node-generation-by-node-generation.

The underlying idea of some of the exemplary embodiments is that the file system management portion does not walk through and observe (load) the complete object tree structure information including undiverged regions, nodes, branches or portions of the object tree structure information of the clone object to be deleted, but rather only follows and observes (loads) the diverged regions, nodes, branches or portions of the object tree structure information of the clone object to be deleted (and to only provide the diverged regions, nodes, branches or portions of the object tree structure information of the clone object to be deleted to the software-side) so as to save storage space in a memory and/or to reduce processing burden on the side of the hardware-side and/or the software-side.

Especially, due to the enhanced and more quick process of analyzing and loading only the diverged portions of the metadata, it is efficiently and advantageously possible to accelerate the overall process of deleting clones resulting in more efficient and more quick freeing of metadata blocks and user data blocks associated with diverged portions of a clone object to be deleted so that such freed blocks may be made available for reuse (e.g. for re-allocation for further updated user data or metadata for other objects in the file system).

Exemplarily, in step S3205 the process continues with the next leaf node generation (e.g. including in this case the leaf nodes pointed at by pointers of the root node of the clone, which typically may include mostly indirect nodes but may include also direct nodes), i.e. according to the exemplary generation-by-generation process. In exemplary node-by-node processes, the process could simply continue with one or more nodes of the next generation or of the same object tree structure branch. In exemplary branch-by-branch processes, the process could continue with all or some indirect nodes of the same branch, e.g. until arriving at one, two, or more direct nodes of the branch.

For these (or selected) leaf nodes pointed at by pointers of the root node of the clone object, in step S3206, the file system management portion loads the metadata (e.g. the leaf nodes themselves or at least portions thereof) for the leaf nodes for which it has been determined in step S3203 that the pointers pointing at them have diverged (see e.g. the illustrative example of FIG. 33 below).

That is, the file system management portion may preferably refrain from loading the metadata (e.g. the leaf nodes themselves or at least portions thereof) for the leaf nodes for which it has been determined in step S3203 that the pointers pointing at them have not diverged. Leaf nodes of the current (or next) generation of leaf nodes which have not diverged are preferably refrained from being loaded to only load the diverged portions.

Alternatively, if already available in cache memory, the respective metadata may be retrieved from cache memory. Also, if relating to a read-ahead operation, the loaded metadata may be provided in the cache memory to be used later (e.g. to be transferred to the software side upon further inquiries or to be used by the file system management portion themselves to execute truncation of diverged metadata portions).

In addition, in some embodiments, the file system management portion may load the metadata (e.g. the leaf nodes themselves or at least portions thereof) for the corresponding leaf nodes of the corresponding file object and/or parent snapshot object (to which the leaf nodes of the clone object have diverged, respectively, i.e. to load the unshared leaf nodes of the present leaf node generation for the clone object, the parent snapshot object and/or the file object).

This may only be required in some exemplary embodiments, in which step S3207 uses a comparison of metadata portions of the clone object, the parent snapshot object and/or the file object.

In other embodiments it is exemplarily sufficient to load/retrieve the metadata portions of the clone object's nodes in step S3202, e.g. if divergence is determined based on comparison of the clone object's cloned-in checkpoint number with the respective node pointers' checkpoint numbers and/or with the node's checkpoint number.

Based on the data loaded in step S3206, the file system management portion determines the diverged pointers of the loaded leaf nodes of the clone object with respect to corresponding pointers of corresponding leaf nodes of the file object in step S3207, and determines in step S3208 whether any diverged pointers to leaf nodes of the next generation of leaf nodes exist.

In this connection, it is emphasized that the term "leaf node" is a relative term indicating that for a node which points to one or more further nodes, the nodes pointed at may be referred to as its leaf nodes which may then point to further nodes being the leaf nodes of the previous leaf node etc. For example, an alternative term may be "child node" (being pointed at by pointers of its parent node).

If step S3208 returns YES, the process continues with the next generation of leaf nodes to return to step S3205.

Exemplarily, in step S3205 the process continues with the next leaf node generation (e.g. including in this case the leaf nodes pointed at by pointers of the leaf nodes of the clone object and/or the file object or the previous generation of leaf nodes, which typically may include indirect nodes and/or direct nodes).

For these leaf nodes pointed at by pointers of the leaf nodes of the clone object and/or the file object of the previous leaf node generation, in step S3206, the file system management portion loads the metadata (e.g. the leaf nodes themselves or at least portions thereof) for the leaf nodes for which it has been determined in step S3203 that the pointers pointing at them have diverged (see e.g. the illustrative example of FIG. 33 below).

In addition, in some exemplary embodiments, the file system management portion may load the metadata (e.g. the leaf nodes themselves or at least portions thereof) for the corresponding leaf nodes of the file object(s) and/or of the parent snapshot object (to which the leaf nodes of the clone object have diverged, respectively, i.e. to load the unshared leaf nodes of the present leaf node generation).

However, leaf nodes of the current generation of leaf nodes which have not diverged are preferably refrained again from being loaded to only load the diverged portions. That is for each generation of leaf nodes, only the leaf nodes for which the pointers of the previous leaf node generation have diverged are loaded, and undiverged leaf nodes do not need to be loaded.

Based on the data loaded in step S3206, the file system management portion determines the diverged pointers of the loaded leaf nodes of the clone object to be deleted in step S3207 of the present leaf node generation, and determines in step S3208 whether any diverged pointers to leaf nodes of the next generation of leaf nodes exist.

The loop to walk through the generations of leaf nodes only along the tree branches that have diverged is continued until step S3208 returns NO and/or until the last generation of direct nodes pointing directly at user data blocks is reached for the diverged branches.

However, the process preferably refrains from walking through undiverged branches and therefore advantageously refrains from unnecessarily loading the metadata thereof.

Then, in step S3209, the gathered loaded metadata related to diverged regions, nodes, branches or portions of the object tree structure information of the clone object to be deleted, and/or corresponding regions, nodes, branches or portions of the object tree structure information of the file object are transferred or provided to the software-side, or provided in the cache memory for later use (read-ahead).

Step S3209 may be performed to provide/transfer all gathered metadata in one batch or at once, but in some embodiments, the metadata may also be provided/transferred in smaller data portions or chunks (e.g. including metadata in connection with a certain number of nodes, or metadata in connection with branches leading to a certain number of diverged direct nodes, or metadata in connection with branches leading to a certain number of direct nodes but only the data to diverged portions being provided/transferred, etc.).

In some embodiments, step S3209 may only provide the gathered metadata of the diverged portions of the clone object in the cache memory for later use (read-ahead), e.g. based on a read-ahead inquiry issued from the software-side, automatically triggered upon receiving an inquiry to provide root node metadata of the clone object from the software side, automatically triggered upon receiving an inquiry to provide a portion of metadata of the clone object from the software side, and/or on the basis of receiving a first truncation job in connection with portion of metadata of the clone object from the software side, or according to an internally scheduled proactive read-ahead process. Then, if later the software-side inquires further metadata of portions thereof, or if the metadata may be needed to process one or more (further) truncation jobs, the respective metadata of diverged portions of the object tree structure information of the clone object may be quickly and efficiently retrieved from cache memory.

In some embodiments, the walking through only the diverged portions of the object tree structure information may be disabled automatically in cases in which the percentage of divergence is above a configurable or pre-set threshold, for example. Then, instead, the process may load and provide/transfer the complete object tree structure information of the clone object (and optionally also the object tree structure information of the corresponding file object(s) and/or the parent snapshot object).

It is to be noted that the above exemplary process assumes that efficiently only diverged portions of the complete object tree structure information of the clone object are loaded (provided in cache) or the like.

Figure 28:
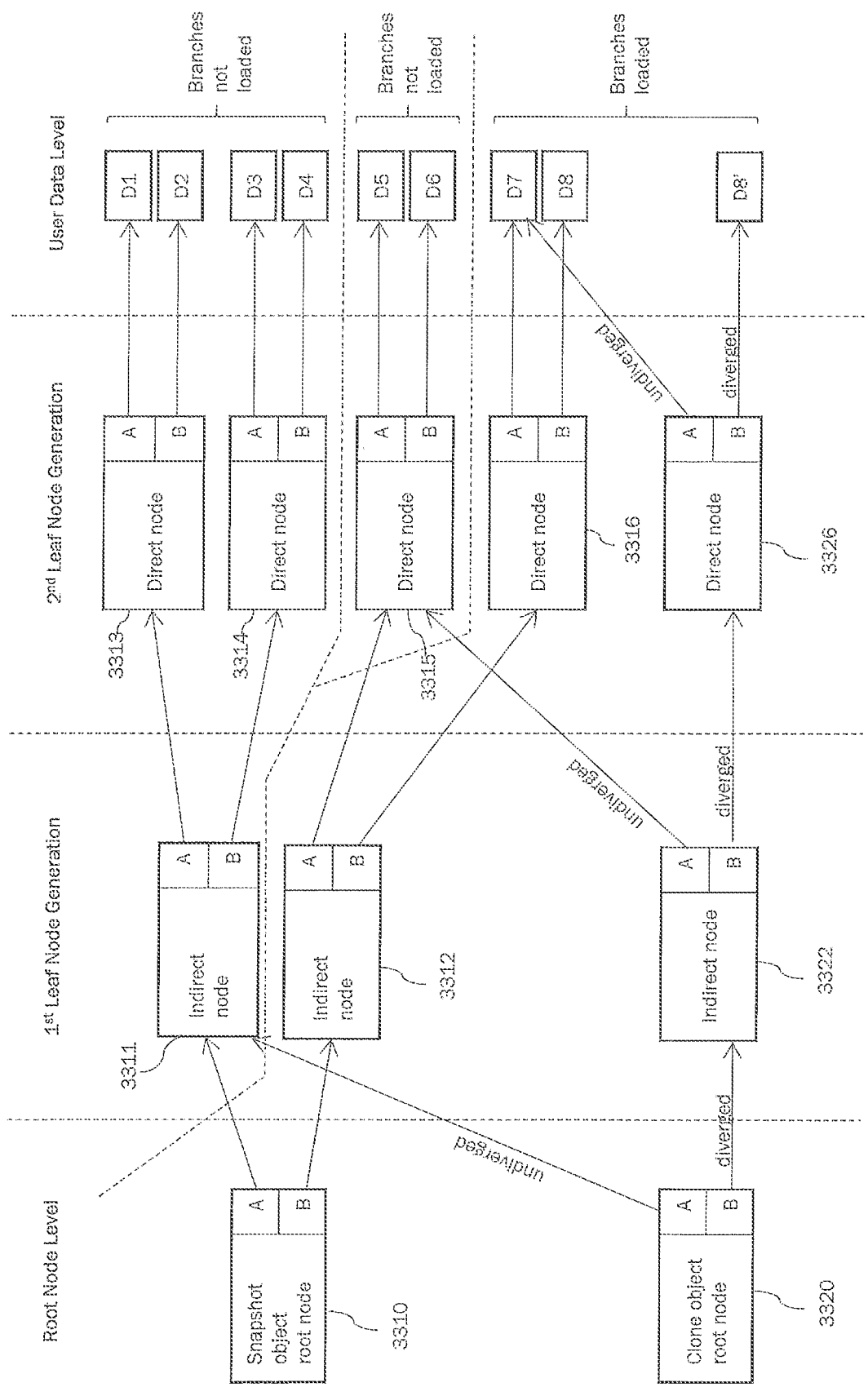
FIG. 28 is an exemplary metadata object tree structure illustrating an example situation of a process of determining diverged portions of a cloned object according to FIG. 27.

When deleting a clone object, this may involve loading (or reading-ahead) the root node thereof, and optionally one or more diverged direct nodes and optionally one or more diverged indirect nodes, and typically, if there is at least one diverged user data block, it may include at least one diverged branch of the clone object's object structure information including the root node (typically loaded previously and may be available in cache already) and at least the diverged direct node pointing at the diverged user data block. If any (i.e. if the diverged direct node is not directly pointed at from the root node), this may additionally involve loading (or reading-ahead) the one or more diverged indirect nodes of the diverged branch, i.e. the root node, the one or more diverged indirect nodes and the diverged direct node(s) pointing from the root node via these nodes to the diverged user data block(s). In FIG. 28 below, this relates to loading (reading ahead) the branch of indirect node 3322 and direct node 3326 pointing from the root node 3320 (which is either loaded also or may already have been previously loaded or read-ahead) to the diverged user data block D8'.

When decloning a live file, or when deleting (or removing) a snapshot object, the process may be basically similar to the above aspects and examples. When deleting (or removing) a snapshot object, it may only be necessary to load (read-ahead) metadata portions of its object tree structure information which have diverged with respect to the parent snapshot object of the snapshot object to be removed/deleted. When deleting a root snapshot object, it may be required to load/read-ahead the full object tree structure information of the root snapshot object to be deleted.

FIG. 28 is an exemplary metadata object tree structure illustrating an example situation of a process of determining diverged portions of a cloned object according to FIG. 27.

Exemplarily, object tree structure information of the parent snapshot object may include the root node 3310 having pointers A and B (only exemplarily two pointers are shown and in general in some embodiments, the number of pointers may be higher, of course; and in some embodiments, the root node may have only one single node pointer).

Pointers A and B of the root node 3310 of the parent snapshot object point to indirect nodes 3311 and 3312 of the first leaf node generation (e.g. the leaf nodes of the root nodes, i.e. being pointed at by pointers of the root node), respectively, and the respective pointers A and B of the indirect nodes 3311 and 3312 point to the direct nodes 3313, 3314, 3315 and 3316 of the second leaf node generation (e.g. the leaf nodes of the leaf nodes of the first generation, i.e. being pointed at by pointers of the leaf nodes of the first leaf node generation). The direct nodes 3313, 3314, 3315 and 3316 also have respective pointers A and B respectively pointing directly at user data blocks D1 to D8. It is to be noted that further leaf node generations including indirect nodes (and potentially direct nodes) may be provided as further leaf node generations, and the situation having two leaf node generations in FIG. 28 is only for exemplary purposes.

Exemplarily, object tree structure information of the clone object may include the root node 3320 having pointers A and B (only exemplarily two pointers are shown and in general in some embodiments, the number of pointers may be higher, of course).

Pointers A and B of the root node 3320 of the clone object point to indirect nodes 3311 and 3322 of the first leaf node generation (e.g. the leaf nodes of the root nodes, i.e. being pointed at by pointers of the root node), respectively, and the respective pointers A and B of the indirect nodes 3311 and 3322 point to the direct nodes 3313, 3314, 3315 and 3326 of the second leaf node generation (e.g. the leaf nodes of the leaf nodes of the first generation, i.e. being pointed at by pointers of the leaf nodes of the first leaf node generation).

The direct nodes 3313, 3314, 3315 and 3326 also have respective pointers A and B respectively pointing directly at user data blocks D1 to D7 and D8'.

Accordingly, regarding divergence between the clone object and the parent snapshot object in this example, it is observed that exemplarily the nodes 3311, 3313, 3314, and 3315 are shared among the object tree structure information of the clone object and the parent snapshot object.

That is, the pointer A of the root node 3320 (with respect to pointer A of the root node 3310), the pointer A of the indirect node 3322 (with respect to pointer A of the indirect node 3312) and the pointer A of the direct node 3326 (with respect to pointer A of the direct node 3315) are or can be considered as being undiverged. On the other hand, the pointer B of the root node 3320 (with respect to pointer B of the root node 3310), the pointer B of the indirect node 3322 (with respect to pointer B of the indirect node 3312) and the pointer B of the direct node 3326 (with respect to pointer B of the direct node 3315) are or can be considered as being diverged.

So, in the step of loading (reading-ahead) metadata of the first leaf node generation, the metadata related to the indirect node 3311 (which is shared in the object tree structure of both the parent snapshot and the clone object) is not loaded/read-ahead, and, in the step of loading (reading-ahead) metadata of the second leaf node generation, the metadata related to the direct nodes 3313, 3314 and 3315 is not loaded/read-ahead.

That is, from the perspective of the root node 3320, the above branch of indirect node 3311 (which is shared in the object tree structure of both the parent snapshot and the clone object) including also direct nodes 3313 and 3314 (which are shared in the object tree structure of both the parent snapshot and the clone object) is not loaded/read-ahead, and, from the perspective of the indirect node 3322, the above branch of direct node 3315 (which is shared in the object tree structure of both the parent snapshot and the clone object) is not loaded/read-ahead, and only the diverged branch(es) including nodes 3322 and 3326 of the object tree structure of the clone object need to be loaded/read-ahead.

In summary, the process becomes more efficient and having less processing burden as only the diverged regions branches of the metadata (object tree structure information) of clone object need to be loaded/read-ahead and be provided in cache memory to the software-side to instruct execution of the deletion of the clone object according to exemplary embodiments and/or for truncation jobs executed by the file system management portion of the hardware-side.

4.2 Improvements of Decloning and/or Removing of Snapshot Objects

Figure 29:
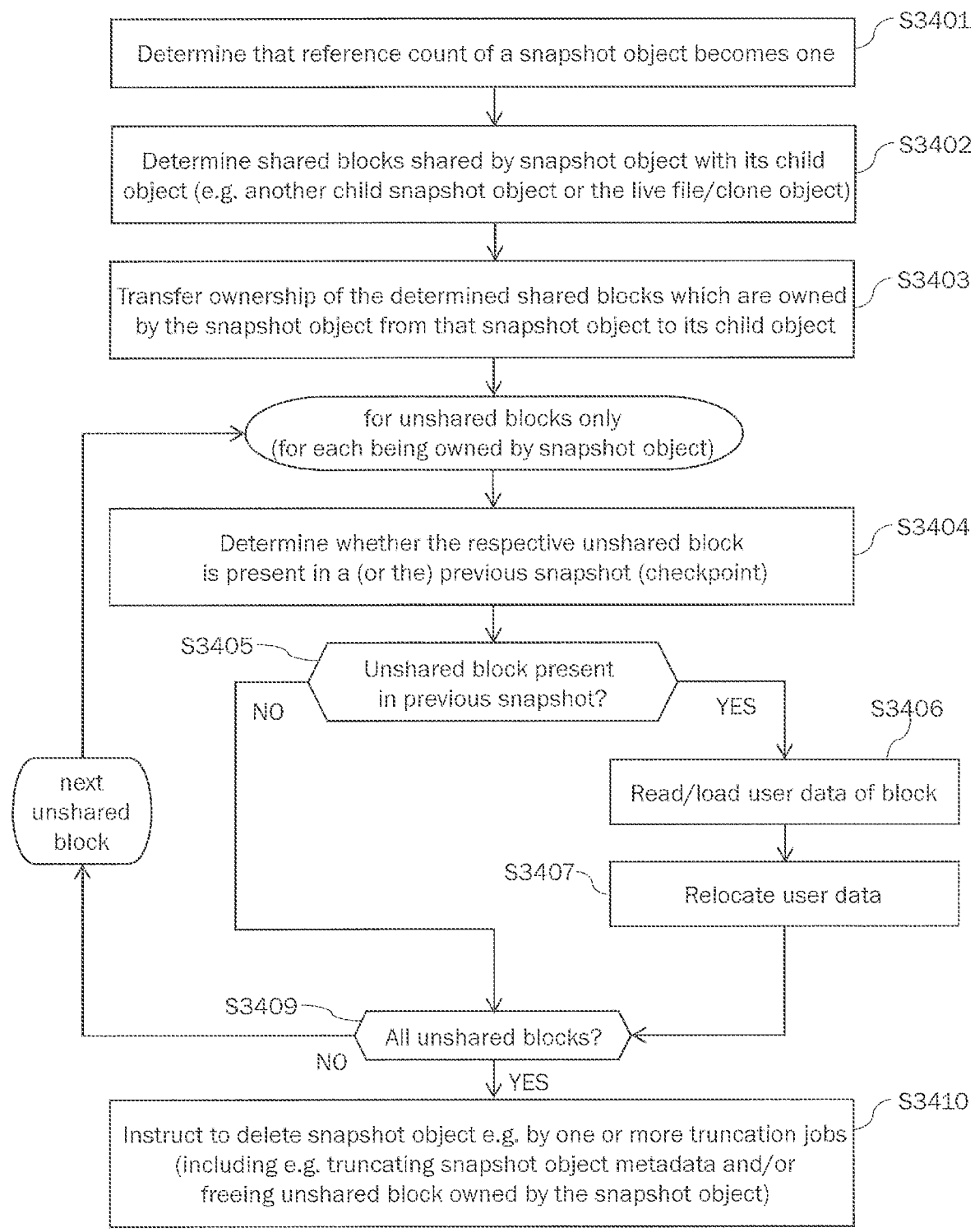
FIG. 29 is an exemplary logic flow diagram schematically illustrating another exemplary process of removing a snapshot object (and/or decloning a file and/or clone object) according to exemplary embodiments.

FIG. 29 is an exemplary logic flow diagram schematically illustrating another exemplary process of removing a snapshot object (and/or decloning a file and/or clone object) according to exemplary embodiments.

In step S3401, it is determined that a reference count of a snapshot object has become one (e.g. only one child exists such as e.g. only one live file or only another one single child snapshot object being referenced by the present snapshot object), please also see above explanations e.g. in connection with steps S1301 and S1601, or other explanations for decloning or removing snapshot objects above and below.

In step S3401, the shared blocks are determined, and specifically, the blocks shared between the present snapshot object and its child object (or the blocks shared between the present snapshot object and its child object which are also owned by the snapshot object) are determined (see e.g. the above explanation in connection with steps S1302 and S1602, or other explanations for determination of shared blocks above and below).

In step S3403, the ownership of the shared blocks determined in step S3401 (or the shared blocks which are determined in step S3401 and which are further owned by the present snapshot object) are transferred to the child object of the present object (i.e. to the live file or the child snapshot object), please also see the explanations in connection with steps S1303 and S1603, or other explanations for transfer of ownership above and below.

In some exemplary embodiments, the method may continue with some or all of the following steps S3404 to S3409, however, only for unshared blocks (i.e. unshared with the child object, that is, not referenced by or pointed at by any direct nodes of the child object) which are owned by the present snapshot object to be removed (i.e. among the blocks owned by the present snapshot object to be removed this refers to the blocks other than the blocks determined in step S3402).

For one of the unshared blocks which are owned by the present snapshot object to be removed, in step S3404, it is determined whether the unshared block is present in a previous snapshot/checkpoint (or even the previous snapshot/checkpoint). The determination may be performed based on a comparison of a cloned-in checkpoint number (first-type checkpoint number) of the present snapshot object and a checkpoint number (second-type checkpoint number) of the previous snapshot/checkpoint, e.g. the present snapshot object may be determined to be present in the previous snapshot if the cloned-in checkpoint number (first-type checkpoint number) of the present snapshot object is equal to the checkpoint number (second-type checkpoint number) of the previous snapshot/checkpoint.

Here, it is emphasized again, that the terms "snapshot object"/"snapshot file"/"snapshot file object" (which may be used interchangeably in the present description) are to be distinguished from the term "snapshot" itself. The latter one does not refer to a file system object or object managed similar to writable file system, objects such as single files, but the term "snapshot" refers to a checkpoint which gives an image of the file system or at least portions thereof (including multiple file system objects) at a certain point of time.

If step S3405 returns NO, then the process continues with freeing the unshared block to be available for further allocations again. On the other hand, if step S3405 returns YES, the process may continue with a step S3406 of reading the user data of the unshared block (to preserve it prior to deletion of the present snapshot object and/or to provide it for preservation or for checking whether it should be preserved based on further conditions or the like) and/or with a step S3407 of relocating the user data of the unshared block (to preserve it prior to deletion of the present snapshot object at another data storage location), before freeing the unshared block later e.g. in step S3410 below or by one or more separate truncation or deletion job(s). In step S3406 the user data may also be only stored in the cache memory, so that they are available more efficiently for later jobs, if needed. Then, also the step S3407 may be performed later by one or more separate jobs, e.g. based on data stored/provided to the cache memory.

Preferably, in some embodiments, the steps S3404, S3405 and/or S3406 may be performed by the file system management portion of the hardware-side, e.g. to later provide it to a software-side processing to preserve data of previous checkpoints or the like. Step S3407 may be performed by the file system management portion of the hardware-side or be controlled by a relocation job executed on a processor of the software-side.

In step S3409, it is determined whether all unshared blocks (which are owned by the present snapshot object) have been analyzed or observed, to continue with the next unshared block if step S3409 returns NO, or to instruct to delete the snapshot object such as deletion of snapshot object metadata (e.g. by freeing the associated metadata blocks) and/or freeing user data blocks still owned by the snapshot object in step S3410 if step S3409 returns YES.

Here, step S3410 may directly instruct deletion of the snapshot object including freeing the associated metadata blocks and/or freeing user data blocks which are still owned by the snapshot object. Alternatively, this may involve creation of deletion job(s) and/or truncation job(s) which will later be executed in the job queue by the file system management portion of the hardware-side.

As mentioned above, at the end of the blocks' ownership transfer, a separate job may be scheduled to delete the redundant snapshot-file object and this may involve freeing the blocks.

There are at least two types of de-cloning: a. de-cloning of a live clone, which may involve "touching" the shared blocks (i.e. updating block pointer's checkpoint numbers of shared blocks) in both the clone and parent snapshot-file; and b. de-cloning of a snapshot-file, which may involve "touching" the unshared blocks (i.e. updating block pointer's checkpoint numbers of unshared blocks) in the parent snapshot-file.

During the block transfer (transfer of ownership), and more specifically when the file system management portion of the hardware-side "touches" the metadata blocks to update their checkpoint number (e.g. with current checkpoint number) in a given object (clone or snapshot-file), it also needs to manipulate/relocate the user data blocks—only—when present in a file system snapshot. To accelerate this process in some exemplary embodiments, the software-side may—before issuing the respective "touch requests" to the file system management portion of the hardware-side—issues read-ahead requests to load the blocks ahead (read ahead) so they are provided already in the cache memory when they need to be "touched". Preferably, the metadata blocks may always be loaded, however the user data blocks are only loaded when present in a file system snapshot such as e.g. in the previous snapshot (S3406) above.

4.3 Improvements of Transfer of Ownership

The following aspects may be applied independently or in combination to processing of transfer of ownership of exemplary embodiments explained above or below, in particular in connection with steps S3403, S1303 and/or S1603 etc.

FIG. 30 is an exemplary logic flow diagram schematically illustrating another exemplary process of transferring ownership according to exemplary embodiments, in particular in transfer of ownership between a snapshot object and its child live file/clone object.

The process of transfer of ownership exemplarily starts by setting an auxiliary counting parameter to 1 (i.e. n=1) in step S3501. Then, in step S3502, the process locks (e.g. blocks or holds off) the client/user access to data storage blocks n to n+M referenced by block pointers of the present snapshot object to be deleted/removed (which may be shared with the live file/clone object so they might be updated in the meantime) or the process locks the (e.g. blocks or holds off) the client/user access to data storage blocks n to n+M referenced by block pointers of the live file/clone object referencing the present snapshot object to be deleted/removed, wherein the number M may be pre-set or be configurable.

In the above, S3502 refers to locking the user data blocks, but in even more preferable exemplary embodiments in step S3502 the process would lock access to the respective user data blocks and to its respective associated metadata or metadata blocks as changing user data blocks by a client also may typically results in changing corresponding metadata blocks. In other embodiments it is even possible to lock the whole file object including all associated user and metadata blocks, but to temporarily release the lock and allow user access after transfer of ownership in connection with a group of blocks n to n+M. Similar arguments and possible implementations also apply to FIGS. 31A to 31D below (e.g. steps S3604 and S3903, and S4502 and/or S4509 may lock access to the user data blocks n to n+M and the associated metadata blocks in some exemplary embodiments, or even lock the client access to the whole file object in some exemplary embodiments).

In step S3503, among the locked data storage blocks n to n+M, the shared blocks (e.g. the shared blocks owned by the present snapshot object, or just the shared blocks to then determine which of those are owned by the present snapshot object in a separate step) are determined, and the ownership of the determined shared blocks among the data storage blocks n to n+M which are also owned by the present snapshot object to be removed/deleted is transferred from the present snapshot object to its child live file/clone object (here, similar methods or combinations thereof may be used as explained for some exemplary embodiments above and/or below).

After transfer of ownership in step S3504, the user/client access to the data blocks n to n+M is released again in step S3505 so that clients/users may access again the data of data blocks n to n+M (while other data blocks of the present snapshot object directly or indirectly shared with the live file, one or more live clones or the like could be efficiently and without latency accessed even between the steps S3502 and S3505).

That is, the exemplary embodiments of FIG. 30 advantageously allow to reduce latencies for clients/user when accessing data of data blocks which are owned by a snapshot object while the deletion of the snapshot object may be ongoing (including the transfer of ownership during which an access may need to be blocked, locked or held off at least for the blocks which are currently ownership transferred), e.g. if the deletion of the snapshot object may be ongoing by a background process which is invisible to the clients.

Once the blocks n to n+M have been processed for transfer of ownership and access thereto is released or granted again, it is determined in step S3506 whether all blocks have been observed (i.e. whether ownership for all shared blocks previously owned by the present snapshot object has been transferred to its child object). If step S3506 returns NO, the method repeats the steps S3502 to S3505 for the next M blocks (i.e. for blocks n+M+1 to n+2M+1) by setting n to n+M+1.

FIG. 31A is another exemplary logic flow diagram schematically illustrating another exemplary process of transferring ownership according to exemplary embodiments, in particular in transfer of ownership between a snapshot object and its child live file/clone object.

The process of transfer of ownership exemplarily starts, in step S3601, by instructing to maintain update information for all blocks referenced by the snapshot object to be removed, or exemplarily for all blocks referenced and owned by the snapshot object to be removed. In other embodiments, the similar information may be determined more efficiently by referring to checkpoint numbers of the respective blocks, please see e.g. FIGS. 31B, 31C and 31D below.

In step S3602, the process continues with determining the initially (e.g. currently) shared blocks (e.g. blocks which are currently shared between the snapshot object to be removed and its child file/clone object).

It is to be noted that in some embodiments in which step S3602 is performed before or simultaneously with step S3601, the update information may also be instructed to be maintained for all blocks referenced by the snapshot object to be removed and being shared with its child object, or exemplarily for all blocks referenced and owned by the snapshot object to be removed and being shared with its child object.

It is to be noted that in some embodiments, step S3602 may also be performed under the lock of access of step S3604.

The maintained update information associated with the snapshot object is maintained and updated to indicate the zero, one or more blocks which have been modified or updated by user/client access since start of maintaining the update information. Such update information may in a simple form be provided e.g. by a bit mask which indicates one bit for each related block, the bit indicating whether the associated block has been modified or updated by user/client access or not. In some embodiments, the bit mask may include bits to identically identify modified bits (or bytes) of the associated block. Also, other more complex metadata structures compared to bit masks (such as tables or even a file system metadata object managed by the file system management unit is possible).

Then, the process exemplarily continues with setting an auxiliary counting parameter to 1 (i.e. n=1) in step S3603. Then, in step S3604, the process locks (e.g. blocks or holds off) the client/user access to data storage blocks n to n+M referenced by block pointers of the present snapshot object to be deleted/removed (which may be shared with the live file/clone object so they might be updated in the meantime) or the process locks the (e.g. blocks or holds off) the client/user access to data storage blocks n to n+M referenced by block pointers of the live file/clone object referencing the present snapshot object to be deleted/removed, wherein the number M may be pre-set or be configurable. As mentioned above, step S3604 may also lock access to the user data blocks n to n+M and the associated metadata blocks in some preferred exemplary embodiments, or even lock the client access to the whole file object in some exemplary embodiments (see e.g. explanations for S3502 above).

In step S3605, among the locked data storage blocks n to n+M, the actually shared blocks are determined by determining, for all blocks among the data storage blocks n to n+M which have been determined to be initially shared in step S3602, whether the maintained update information indicates that the associated data of the block has been updated or modified since step S3601 and/or S3602 (indicating that the respective block is no longer shared but meanwhile has become unshared).

Accordingly, it is advantageously possible to not perform the determination of the (possibly large number of) initially shared blocks during the time of blocking, locking or holding off user access between steps S3604 and S3607, but to perform it previously and prior to step S3602 to further reduce potential latencies for accessing users/clients. Still, it is guaranteed efficiently that ownership of blocks which are not longer shared (which typically can be expected to be a randomly distributed but rather small number) is still attempted to be transferred to the child object (despite being unshared data).

Accordingly, the ownership of the determined still shared blocks among the data storage blocks n to n+M which are also owned by the present snapshot object to be removed/deleted and still shared based on the result of step S3605 is transferred from the present snapshot object to its child object (here, similar methods or combinations thereof may be used as explained for some exemplary embodiments above and/or below).

After transfer of ownership in step S3606, the user/client access to the data blocks n to n+M is released again in step S3607 so that clients/users may access again the data of data blocks n to n+M (while other data blocks of the present snapshot object directly or indirectly shared with the live file, one or more live clones or the like could be accessed efficiently and without latency even between the steps S3604 and S3607).

That is, the exemplary embodiments of FIG. 31A also advantageously allow to reduce latencies (and even further reduce such latencies) for clients/user when accessing data of data blocks which are owned by a snapshot object while the deletion of the snapshot object may be ongoing (including the transfer of ownership during which an access may need to be blocked, locked or held off at least for the blocks which are currently ownership transferred), e.g. if the deletion of the snapshot object may be ongoing by a background process which is invisible to the clients.

Once the blocks n to n+M have been processed for transfer of ownership and access thereto is released or granted again, it is determined in step S3608 whether all blocks have been observed (i.e. whether ownership for all shared blocks previously owned by the present snapshot object has been transferred to its child object). If step S3608 returns NO, the method repeats the steps S3604 to S3607 for the next M blocks (i.e. for blocks n+M+1 to n+2M+1) by setting n to n+M+1.

On the other hand, if step S3608 returns YES, the process may exemplarily continue with a step S3609 of stopping (or instructing to stop) the maintenance of the update information for the present snapshot object (and possible also deleting the maintained update information to avoid storage space built up by update information of deleted snapshot objects).

FIG. 31B is another exemplary logic flow diagram schematically illustrating another exemplary process of transferring ownership according to exemplary embodiments, in particular in transfer of ownership between a snapshot object and its child live file/clone object.

The process of transfer of ownership exemplarily starts, in step S3901 with determining the initially (e.g. currently) shared blocks (e.g. blocks which are currently shared between the snapshot object to be removed and its child file/clone object).

It is to be noted that in some embodiments, step S3901 may also be performed under the lock of access of step S3903.

The process exemplarily continues with setting an auxiliary counting parameter to 1 (i.e. n=1) in step S3902. In step S3903, the process locks (e.g. blocks or holds off) the client/user access to data storage blocks n to n+M referenced by block pointers of the present snapshot object to be deleted/removed (which may be shared with the live file/clone object so they might be updated in the meantime) or the process locks the (e.g. blocks or holds off) the client/user access to data storage blocks n to n+M referenced by block pointers of the live file/clone object referencing the present snapshot object to be deleted/removed, wherein the number M may be pre-set or be configurable. As mentioned above, step S3904 may also lock access to the user data blocks n to n+M and the associated metadata blocks in some preferred exemplary embodiments, or even lock the client access to the whole file object in some exemplary embodiments (see e.g. explanations for S3502 above).

In step S3904, among the locked data storage blocks n to n+M, the actually shared blocks are determined by determining, for all blocks among the data storage blocks n to n+M which have been determined to be initially shared in step S3602, whether the associated data of the block has been updated or modified since step S3901 (indicating that the respective block is no longer shared but meanwhile has become unshared).

Here, it is efficiently possible to determine whether the data block is still shared based on the block's checkpoint number and/or the block pointer's checkpoint number. Specifically, if the block's checkpoint number and/or the block pointer's checkpoint number is equal to or larger than the cloned-in checkpoint number of the snapshot-object/clone object, it may be determined that the initially shared block has diverged in the meantime and is no longer shared.

Accordingly, it is advantageously possible to not perform the determination of the (possibly large number of) initially shared blocks during the time of blocking, locking or holding off user access between steps S3903 and S3907, but to perform it previously and prior to step S3602 to further reduce potential latencies for accessing users/clients. Still, it is guaranteed efficiently that ownership of blocks which are not longer shared (which typically can be expected to be a randomly distributed but rather small number) is still attempted to be transferred to the child object (despite being unshared data).

Accordingly, the ownership of the determined still shared blocks among the data storage blocks n to n+M which are also owned by the present snapshot object to be removed/deleted and still shared based on the result of step S3904 is transferred from the present snapshot object to its child live file/clone object (here, similar methods or combinations thereof may be used as explained for some exemplary embodiments above and/or below). However, it may be efficiently and reliably be refrained from transferring ownership (e.g. including touching the block pointers) for blocks which are determined to be not longer shared.

In addition, in some exemplary embodiments, the additional step S3906 may be performed to update block transfer management information associated with the process of transfer of ownership, which may indicate which of the initially determined shared blocks have been transferred in step S3905 because they were determined to be still shared in step S3904, and which of the initially determined shared blocks have not been transferred in step S3905 because they were determined to be not longer shared in step S3904.

The maintained block transfer management information associated with the snapshot object is maintained and updated to indicate the zero, one or more blocks which have been transferred (i.e. transfer of ownership thereof to the live file/clone object) among the initially shared blocks due to being still shared at the time of transfer of ownership, and/or to indicate the zero, one or more blocks which have not been transferred (i.e. no transfer of ownership thereof to the live file/clone object) among the initially shared blocks due to being not longer shared at the time of transfer of ownership.

Such block transfer management information may in a simple form be provided e.g. by a bit mask which indicates one bit for each related block, the bit indicating whether the associated block has been ownership-transferred or not. Also, other more complex metadata structures compared to bit masks (such as tables or even a file system metadata object managed by the file system management unit is possible).

After transfer of ownership in step S3905, the user/client access to the data blocks n to n+M is released again in step S3907 so that clients/users may access again the data of data blocks n to n+M (while other data blocks of the present snapshot object directly or indirectly shared with the live file, one or more live clones or the like could be accessed efficiently and without latency even between the steps S3903 and S3907).

That is, the exemplary embodiments of FIG. 31B also advantageously allow to reduce latencies (and even further reduce such latencies) for clients/user when accessing data of data blocks which are owned by a snapshot object while the deletion of the snapshot object may be ongoing (including the transfer of ownership during which an access may need to be blocked, locked or held off at least for the blocks which are currently ownership transferred), e.g. if the deletion of the snapshot object may be ongoing by a background process which is invisible to the clients.

Once the blocks n to n+M have been processed for transfer of ownership and access thereto is released or granted again, it is determined in step S3908 whether all blocks have been observed (i.e. whether ownership for all still shared blocks previously owned by the present snapshot object has been transferred to its child live file/clone object). If step S3908 returns NO, the method repeats the steps S3903 to S3907 for the next M blocks (i.e. for blocks n+M+1 to n+2M+1) by setting n to n+M+1.

On the other hand, if step S3908 returns YES, the process may end or exemplarily continue with a step S3909 returning the updated block transfer management information preferably indicating all of the blocks which have been transferred because of having been still shared at the time of ownership, and/or indicating all of the initially shared blocks which have not been transferred because of having been not longer shared at the time of ownership.

Such block transfer management information may be used in later processes, e.g. by the processing section of the software-side, e.g. to update the corresponding blocks in the file/clone object and/or the snapshot object if the data needs to be updated in both of the live file/clone object and the snapshot object. This may be used to update, in the snapshot object, only the blocks which have been updated in the file/clone object.

Figure 31C:
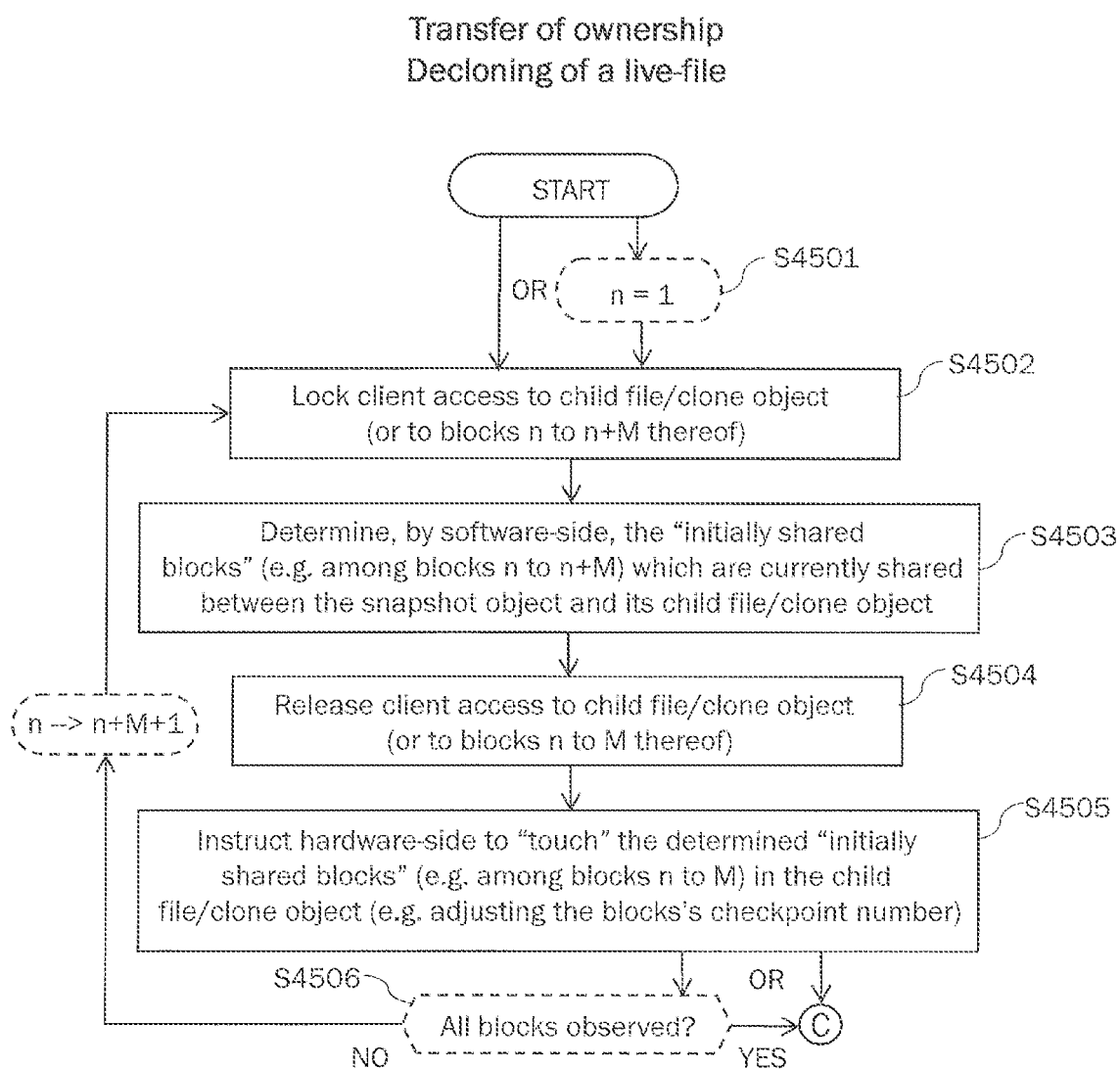
FIG. 31C is another exemplary logic flow diagram schematically illustrating another exemplary process of transferring ownership according to exemplary embodiments.
Figure 31C:
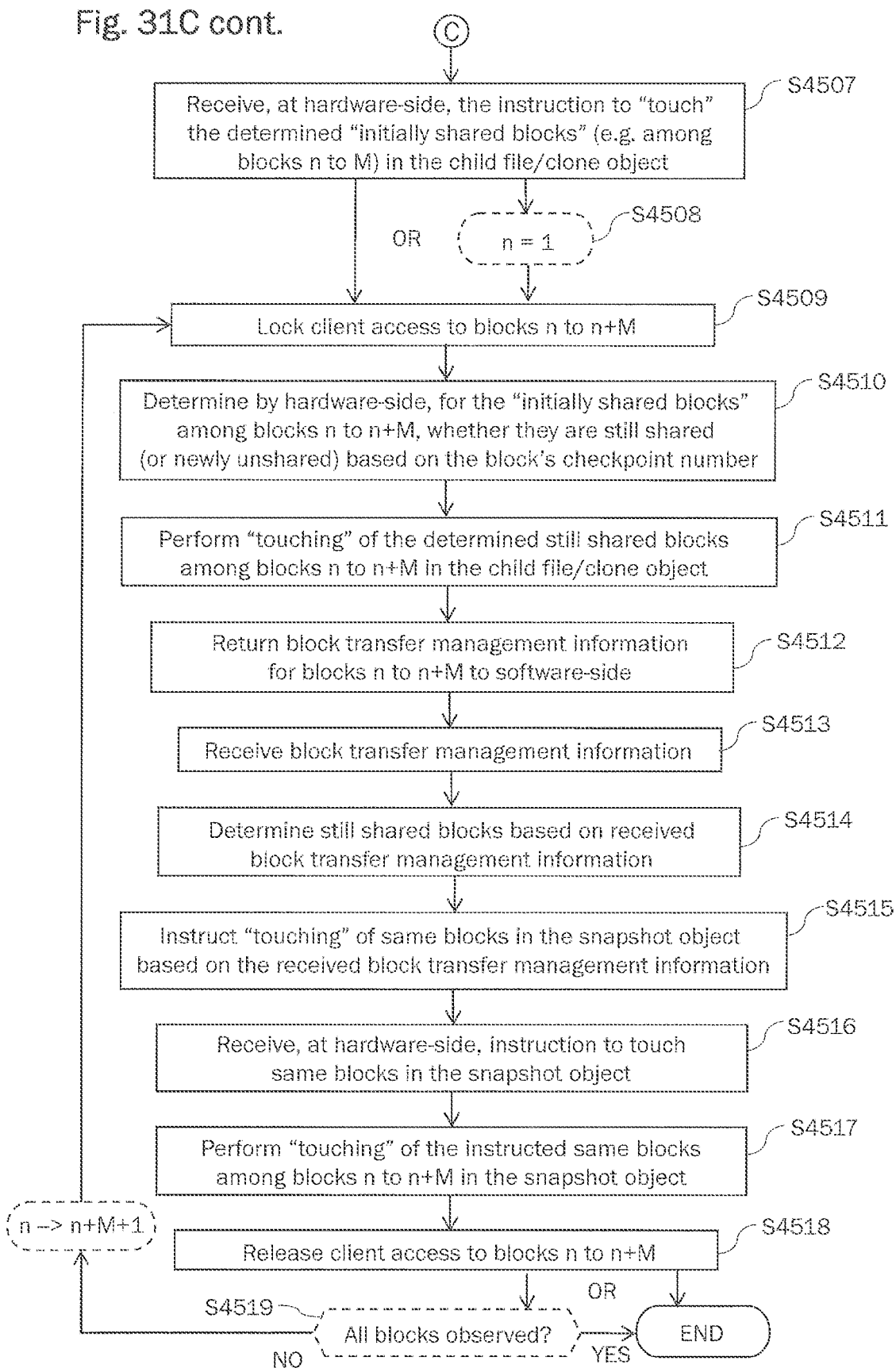

FIG. 31C is another exemplary logic flow diagram schematically illustrating another exemplary process of transferring ownership according to exemplary embodiments.

Here, this process exemplarily is directed to decloning of a live-file object, i.e. removal of a snapshot object which has a child object being the live-file object and which has the (remaining) reference count one (e.g. no additional clone object but the live-file object exists, e.g. because the respective clone has been deleted).

In the exemplary embodiments according to FIG. 31C, the process may involve performing steps S4502 to S4505 for all blocks (i.e. for all user data blocks pointed at by the root node and/or direct nodes of the live-file metadata or object tree structure information and the associated metadata blocks) of the live-file object to be decloned (i.e. the child object of the snapshot object to be deleted). Alternatively, steps S4502 to S4505 for all blocks may be repeated for chunks of blocks e.g. for groups of blocks n to n+M similar to some of the above aspects.

In the exemplary embodiments according to FIG. 31C, the process exemplarily starts with locking client access to the live-file in step S4502 (e.g. the last remaining mutable child clone/file object of a snapshot object which does not have any child snapshot object).

Exemplarily this may involve locking access to all user data blocks and associated metadata blocks of the live-file object. Alternatively, in further exemplary embodiments this may additionally involve the optional step S4501 of setting an auxiliary parameter n to 1 and similar to above example the process may be performed in chunks of blocks, e.g. by at one time locking only access to currently processed blocks n to n+M (and preferably also to the associated metadata blocks) at a time to traverse the object tree structure information of the live-file and/or its parent snapshot object only for the currently locked blocks n to n+M.

Then, after step S4502, preferably performed by the software-side processing section, the object tree structure information of the live-file (and/or its parent snapshot object) is traversed/observed as a whole (or iteratively for each group of blocks n to n+M, if S4502 only locks access to the blocks n to n+M) to determine the blocks which are owned by the snapshot object to be deleted and shared with the live-file in step S4503.

This may involve issuing one or more instructions to the hardware-side to provide metadata or metadata portions of the object tree structure information of the child file/clone object and/or of the parent snapshot object, potentially also including instructions to read-ahead the respective object tree structure information so as to have the information in the cache memory for increasing the efficiency (here the software may provide all metadata or only metadata associated with diverged portions e.g. as in above exemplary embodiments).

For example, if the process is performed in chunks, and the blocks n to n+M are currently processed, this may involve issuing read-ahead instructions to provide metadata associated with the next chunk/group of blocks n+M+1 to n+2M and/or also with one, more or all chunks of blocks to be processed in the cache memory for efficient future access.

In step S4504, the client access to the live-file object as locked in step S4502 is released again. In case S4502 only locked access to some blocks (and preferably the associated metadata blocks), the loop may continue with repeating S4502 to S4504 for the next blocks by iterating n→n+M+1 until all blocks have been observed in a respective step S4506.

Then, based on the blocks that have been determined to be shared between the snapshot object to be deleted and its child object (e.g. the live file object) in step S4503, i.e. blocks that have been determined to be "initially shared", the software-side may issue one or more instructions (inquiries) in step S4505 to the file system management portion of the hardware-side to perform a first step of transfer of ownership in connection with the blocks determined to be "initially shared" in step S4503.

Exemplarily, in FIG. 31C, it is assumed that each instruction of plural instructions can issued in step S4505 for each of the currently processed blocks n to n+M after releasing client access and before going to the next chunk of blocks n+M+1 to n+2M by iterating n→n+M+1. However, in other exemplary embodiments, it is also possible to perform step S4505 before S4504, and even in case of processing the loop of steps S4502 to S4504 for chunks of blocks n to n+M successively, it is possible in some exemplary embodiments to send one single instruction to the hardware-side after step S4506 in connection with determined "initially shared blocks" for the whole live-file object and/or snapshot object.

Accordingly, such instruction may be issued as one instruction exemplarily instructing the first step of transfer of ownership in connection with all initially shared blocks, or as multiple instructions, each instruction of the multiple instructions exemplarily instructing the first step of transfer of ownership in connection with a respective group of blocks, e.g. a group of blocks among the currently observed n to n+M blocks or the like.

The instructed first step of transfer of ownership may involve e.g. the so-called "touching" of blocks or the respective block-pointers in the metadata of the child object (e.g. live-file object) pointing to the determined initially shared blocks, e.g. setting the second-type checkpoint number thereof to equal or larger than a current checkpoint number.

In step S4507 the respective one or more instructions may be received by the file system management portion of the hardware-side. Exemplarily, the process of performing the instructed operations is performed in respective chunks of blocks n to n+M, but may be alternatively be performed for all blocks in other exemplary embodiments.

The process exemplarily continues with setting an auxiliary counting parameter to 1 (i.e. n=1) in the optional step S4508, e.g. in case an instruction is received in step S4507 indicating all initially shared blocks of the live-file object/snapshot object, and the below described steps S4509 to S4518 may be performed iteratively for the chunks of blocks (loop of steps S4508 and S4519). Alternatively, e.g. if an instruction in connection with a certain group/chunk of blocks n to n+M is received in S4507, the step S4508 (and S4519) can be omitted as the below described steps S4509 to S4518 may only be performed for the blocks n to n+M indicated in the received instruction.

In step S4509, the process exemplarily locks (e.g. blocks or holds off) the client/user access to data storage blocks n to n+M referenced by block pointers of the present snapshot object to be deleted/removed (which may be shared with the live file/clone object so they might be updated in the meantime) or the process locks the (e.g. blocks or holds off) the client/user access to data storage blocks n to n+M referenced by block pointers of the live file/clone object referencing the present snapshot object to be deleted/removed, wherein the number M may be pre-set or be configurable. As mentioned above, step S4509 may also lock access to the user data blocks n to n+M and the associated metadata blocks in some preferred exemplary embodiments, or even lock the client access to the whole file object in some exemplary embodiments.

In step S4510, among the locked data storage blocks n to n+M, the actually shared blocks are determined by determining, by the file system management portion of the hardware-side and for all blocks among the data storage blocks n to n+M which have been determined to be initially shared in step S4503 by the software-side and as indicated in the received instruction(s), whether the associated data of the block has been updated or modified since step S4503 (indicating that the respective block is no longer shared but meanwhile has become unshared), or rather since step S4505 after which data modifying client access was possible again.

Here, it is efficiently possible to determine whether the data block is still shared based on the block's checkpoint number and/or the block pointer's checkpoint number. Specifically, if the block's checkpoint number and/or the block pointer's checkpoint number is equal to or larger than the cloned-in checkpoint number of the snapshot-object/clone object, it may be determined that the initially shared block has diverged in the meantime and is no longer shared. This again helps to reduce latencies for clients because client access is at least temporarily possible after step S4504 until S4509.

In step S4511, the file system management portion performs the instructed operation (e.g. the "touch" operation including e.g. the adjusting or setting of the respective block pointer's checkpoint number) for the blocks of the live-file object among the blocks n to n+M, and specifically among the "initially shared blocks" of the blocks n to n+M, which are additionally determined to be still shared in S4510.

Accordingly, it may be efficiently and reliably be refrained from transferring ownership (e.g. including touching the block pointers) for blocks which are determined to be not longer shared, and exemplarily the software-side specifically performs the instructed operation for the blocks which are determined to be still shared (e.g. performing the instructed above first step of transfer of ownership, e.g. the "touching" of the still shared blocks or block pointers thereof in the metadata of the child live-file object).

In addition, in some exemplary embodiments, the additional step S4512 may be performed to return to the software-side the respective block transfer management information associated with the process of transfer of ownership (at least in connection with currently processed blocks n to n+M), which information may indicate which of the initially determined shared blocks have been actually processed (e.g. touched) in step S4511 by the hardware-side because they were determined to be still shared in step S4510 by the hardware-side, and which of the initially determined shared blocks have not been "touched" because they were determined to be not longer shared. The respective block transfer management information for blocks n to n+M does not need to be maintained at the hardware-side (or software-side) after the processing of blocks n to n+M. For example, the hardware-side does not need to maintain the block transfer management information for blocks n to n+M after S4512, and/or the software-side does not need to maintain the block transfer management information for blocks n to n+M after S4514/S4515.

Accordingly, the maintained block transfer management information associated with the live-file object can be maintained until being transferred and can be updated to indicate the zero, one or more blocks which have been processed/touched among the initially shared blocks of blocks n to n+M due to being still shared, and/or to indicate the zero, one or more blocks which have not been processed/touched among the initially shared blocks due to being not longer shared.

Such block transfer management information may in a simple form be provided e.g. by a bit mask which indicates one bit for each related block among blocks n to n+M, the bit indicating whether the associated block has been ownership-transferred or not. Also, other more complex metadata structures compared to bit masks (such as tables or even a file system metadata object managed by the file system management unit is possible).

In step S4512, the block transfer management information for blocks n to n+M is returned to the software-side to inform the software-side processing section about which blocks among blocks n to n+M are "still shared" (or alternatively about which blocks among blocks n to n+M are determined in S4510 to be not longer shared although having been "initially shared" according to S4503), and the information is received at the software-side in S4513.

In step S4513, the software-side received the block transfer management information (e.g. as transferred upon step S4512 from the hardware-side), and based on the block transfer management information e.g. indicating the still shared blocks which have been transferred for the child file object or which have at least been touched by the hardware-side, the software-side processing section may determine in step S4514 the "still shared" blocks at the time of transfer of ownership or at least at the time of touching the respective block pointers from the received block transfer information, and the software-side may continue to issue to the hardware-side (e.g. the file system management portion thereof) in step S4515 the one or more (second) instructions to also touch the same blocks (i.e. only the "still shared blocks" as indicated based on the received block transfer management information) also in the respective snapshot object to be deleted (if the same blocks need to be updated in the live-file and the snapshot object).

Upon receiving the instruction to touch the same block pointers in the parent snapshot object at the hardware-side in step S4516, the file system management portion of the hardware-side may continue to process the instruction(s) to touch the same block pointers in the snapshot object in step S4517. It is to be noted that the process has the advantage that steps S4511 and S4517 for the still shared blocks among currently locked blocks n to n+M (e.g. touching the block pointers for still shared blocks among blocks n to n+M in both the live file object metadata in S4511 and the snapshot object metadata in S4517) are performed consistently before releasing the client access to blocks n to n+M again.

Exemplarily, the user/client access to the data blocks n to n+M is released again in step S4518 so that clients/users may access again the data of data blocks n to n+M (while other data blocks of the present snapshot object directly or indirectly shared with the live file, one or more live clones or the like could be accessed efficiently and without latency even between the steps S4509 and S4518).

That is, the exemplary embodiments of FIG. 31C also advantageously allow to reduce latencies (and even further reduce such latencies) for clients/user when accessing data of data blocks which are owned by a snapshot object while the deletion of the snapshot object may be ongoing (including the transfer of ownership during which an access may need to be blocked, locked or held off at least for the blocks which are currently ownership transferred), e.g. if the deletion of the snapshot object may be ongoing by a background process which is invisible to the clients.

Exemplarily, in particular in case the instruction of S4507 related to multiple chunks of blocks or even to all blocks, once the blocks n to n+M have been processed and access thereto is released or granted again, it is determined in step S4519 whether all blocks have been observed (processed/touched). If step S4519 returns NO, the method repeats the steps S4509 to S4518 for the next M blocks (i.e. for blocks n+M+1 to n+2M+1) by setting n to n+M+1.

On the other hand, if step S4519 returns YES or in case the instruction of S4507 only related to blocks n to n+M at present, the process may end on the hardware-side until further inquiries or instructions are received from the software side.

Figure 31D:
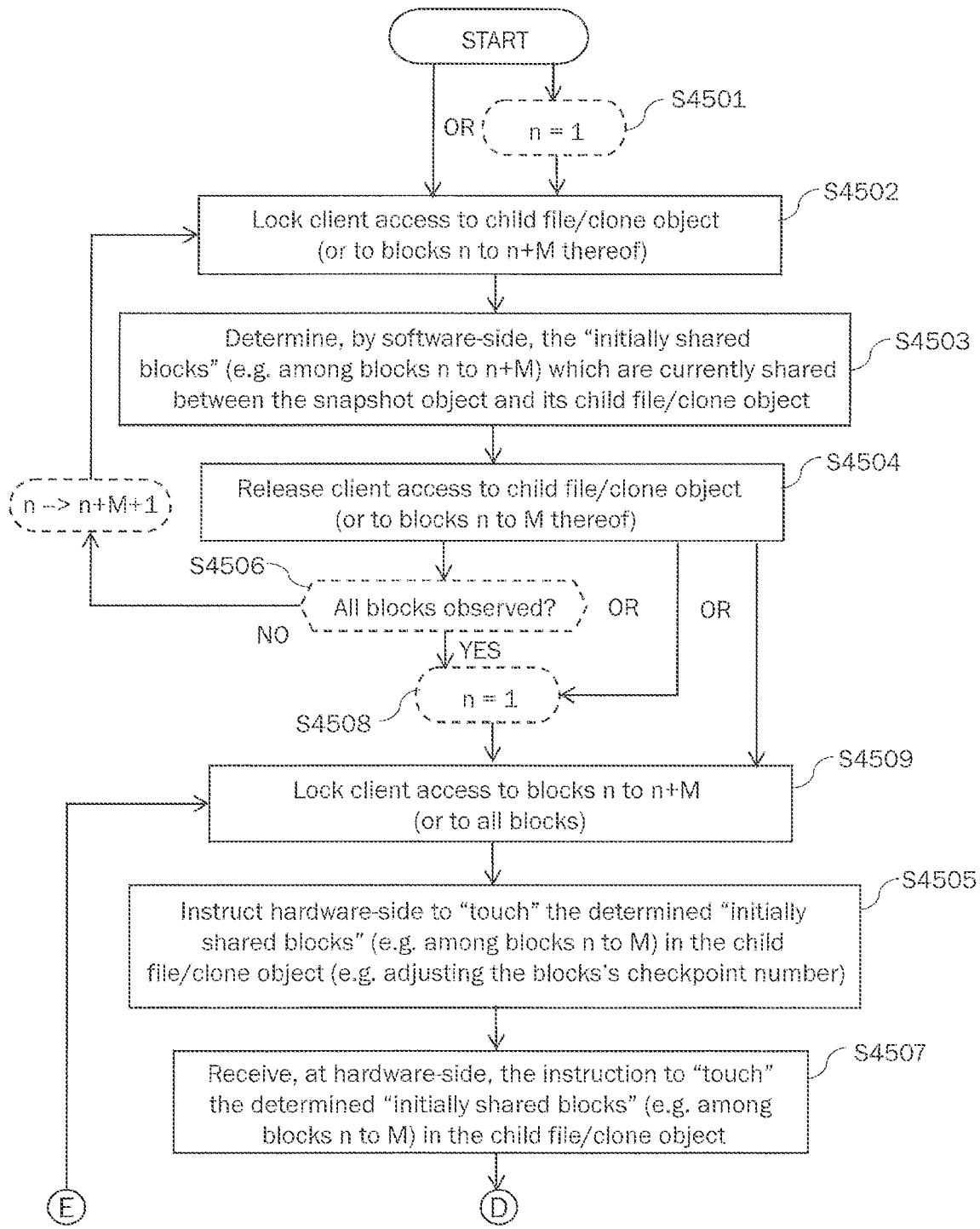
FIG. 31D is another exemplary logic flow diagram schematically illustrating another exemplary process of transferring ownership according to exemplary embodiments.
Figure 31D:
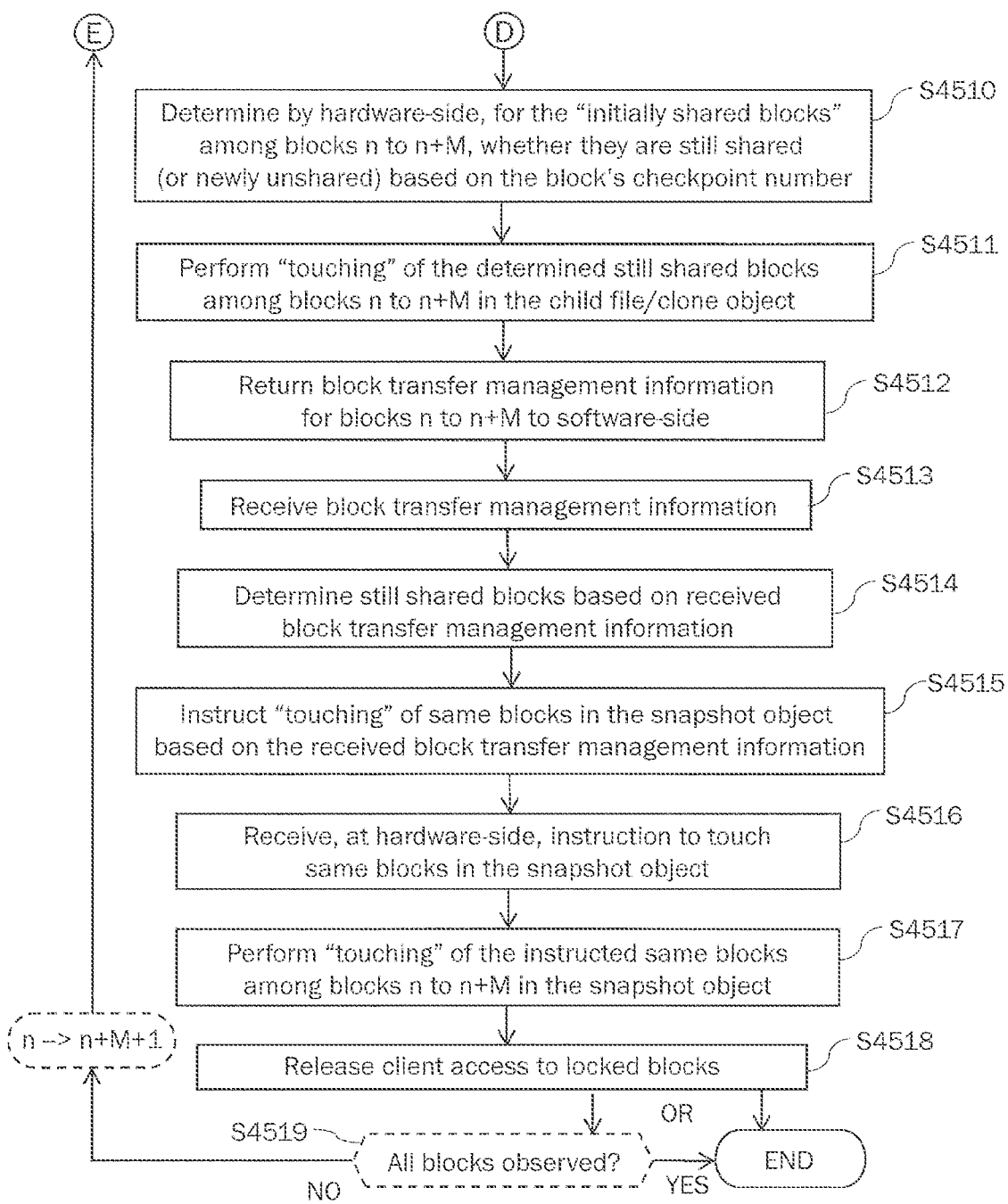

FIG. 31D is another exemplary logic flow diagram schematically illustrating another exemplary process of transferring ownership according to exemplary embodiments. The exemplary process of FIG. 31D may have basically the same or similar steps as the process of FIG. 31C, i.e. e.g. one or more of the steps S4501 to S4519 described above, and above descriptions and considerations may apply mutatis mutandis also for FIG. 31D.

However, exemplarily and as a difference to the exemplary process of FIG. 31C, in FIG. 31D the steps S4505 of instructing, by the software-side, the hardware-side to perform at least a first step of the transfer of ownership (including e.g. the performing of "touching" the determined initially shared blocks in the child object e.g. by setting or adjusting their block-pointer's second-type checkpoint numbers in the child object metadata object tree structure information e.g. as described in above exemplary aspects of transfer of ownership) in one or more instructions (e.g. to all initially shared blocks in one instruction, or with plural instructions to the initially shared blocks among respective chunks of blocks n to n+M), and S4507 of receiving the one or more instructions of S4505 at the file system management portion of the hardware-side are both exemplarily performed after step S4509 in which the client access to the child object is blocked or at least client access to a current chunk of blocks n to n+M is locked, e.g. by performing step S4509 of locking the client access by the software-side before issuing the one or more instructions, or each time for a respective chunk of blocks before instructing a respective instruction to that chunk of blocks among multiple instructions.

4.4 Further Improvements of Removing Snaphots and/or Decloning

Figure 32:
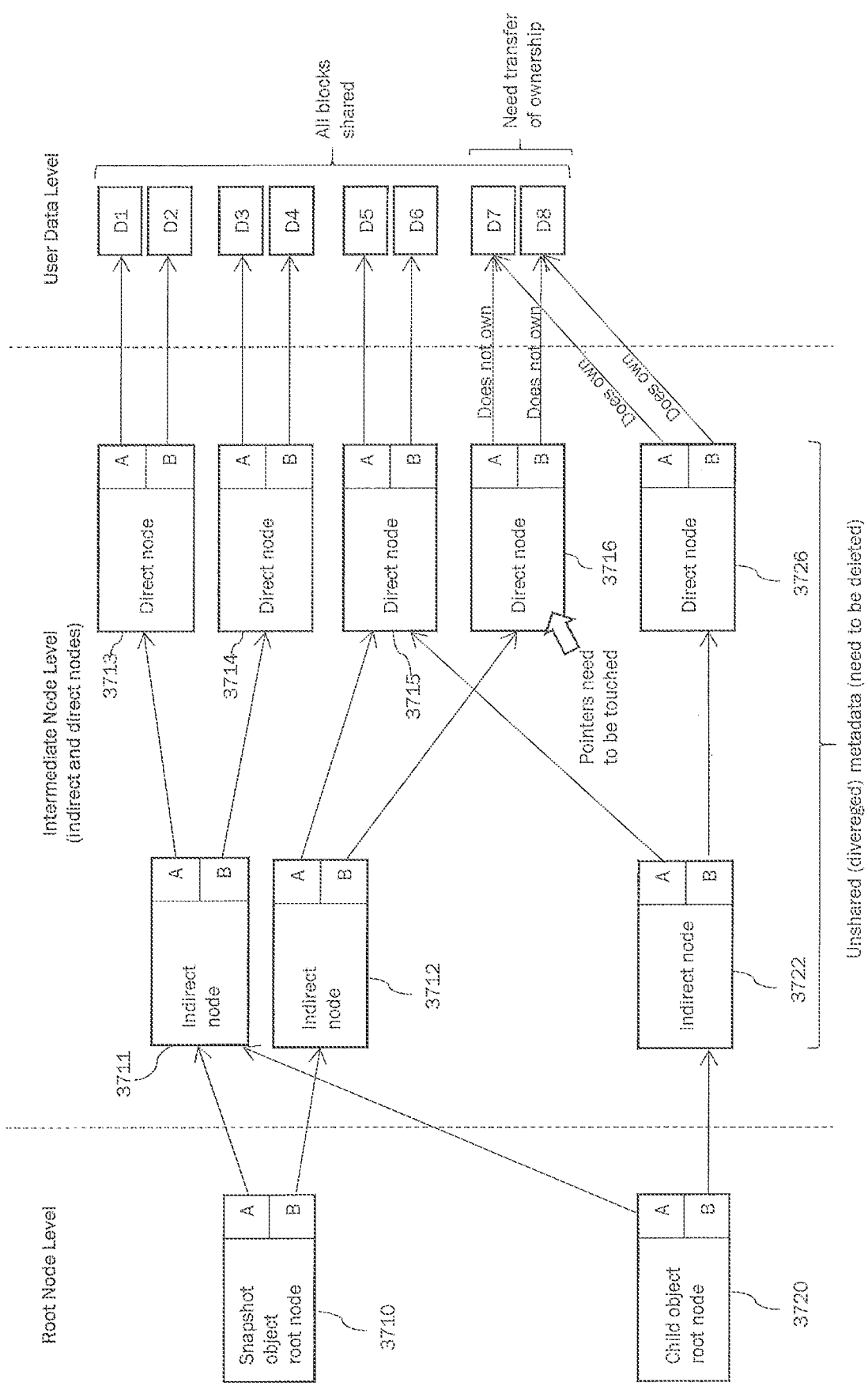
FIG. 32 is an exemplary metadata object tree structure illustrating an example situation of a process of removing a snapshot object (and/or decloning a file and/or clone object) according to exemplary embodiments, in particular in relation to the process of FIG. 33A.

FIG. 32 is an exemplary metadata object tree structure illustrating an example situation of a process of removing a snapshot object (and/or decloning a file and/or clone object) according to exemplary embodiments, in particular in relation to the process of FIG. 33A below.

The situation of FIG. 32 illustrates a situation in which all blocks D1 to D8 are shared between the snapshot object to be deleted and its only remaining child object.

Exemplarily, at the root node level, the snapshot object may include the root node 3710 having pointers A and B (only exemplarily two pointers are shown and in general in some embodiments, the number of pointers may be higher, of course). Pointers A and B of the root node 3710 of the snapshot object point to indirect nodes 3711 and 3712, respectively, and the respective pointers A and B of the indirect nodes 3711 and 3712 point to the direct nodes 3713, 3714, and 3715, 3716, respectively. The direct nodes 3713, 3714, 3715 and 3716 also have respective pointers A and B respectively pointing directly at user data blocks D1 to D8.

Exemplarily, object tree structure information of the corresponding child object may include the root node 3720 having pointers A and B (only exemplarily two pointers are shown and in general in some embodiments, the number of pointers may be higher, of course). Pointers A and B of the root node 3720 of the clone object point to indirect nodes 3711 and 3722, respectively, and the respective pointers A and B of the indirect nodes 3711 and 3722 point to the direct nodes 3713, 3714, and 3715, 3726, respectively.

The direct nodes 3713, 3714, 3715 and 3726 also have respective pointers A and B respectively pointing directly at user data blocks D1 to D8.

Accordingly, the blocks D1 to D8 are fully shared between the snapshot object to be removed and the child object. However, while being owned by the child object it has to be made sure that the ownership of blocks D7 and D8 needs to remain at the child object in a process of transfer of ownership based on swapping cloned-in checkpoint numbers according to exemplary embodiments as described above, and it has to be made sure that the unshared metadata of the snapshot object including indirect node 3712 and direct node 3716 need to be identified to be deleted or freed, even in cases in which all blocks are shared but metadata may be unshared (e.g. if the metadata of the child object is extended due to situations as may occur in generation of chains of snapshot objects without modifying the shared data inbetween).

For such situations, some exemplary embodiments as explained below may be applied.

Figure 33A:
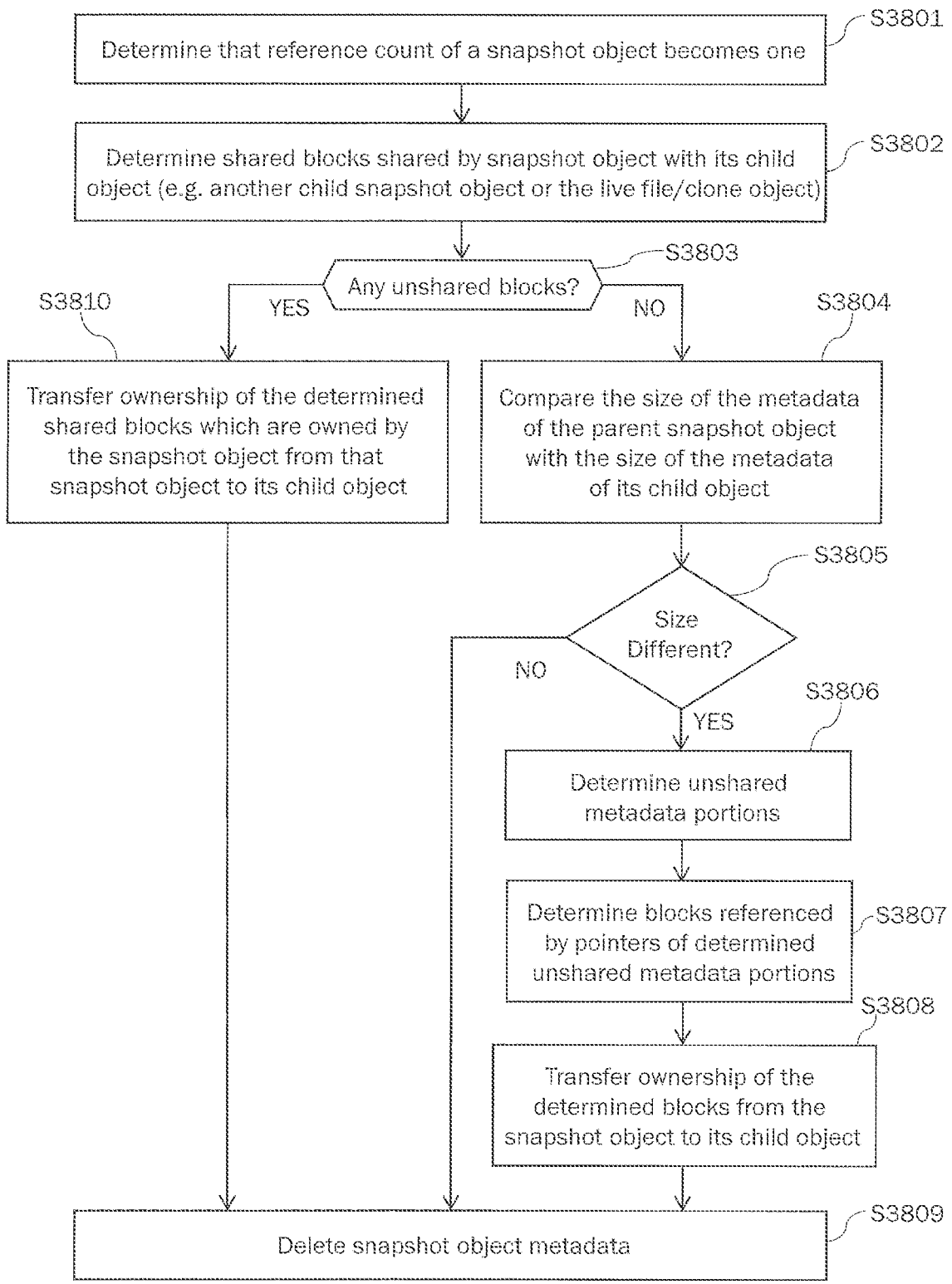
FIG. 33A is another exemplary logic flow diagram schematically illustrating another exemplary process of removing a snapshot object (and/or decloning a file and/or clone object) according to exemplary embodiments.

FIG. 33A is another exemplary logic flow diagram schematically illustrating another exemplary process of removing a snapshot object (and/or decloning a file and/or clone object) according to exemplary embodiments.

Similar to above exemplary embodiments, step S3801 determines that a reference count of a snapshot object has become 1 or is 1 (so that the respective snapshot object may be deleted), and the unshared data blocks are determined in step S3802 e.g. similar as in one or more of the above exemplary embodiments. In some embodiments, it may alternatively be performed by determining the shared blocks or determining, for each block of the snapshot object, whether it is shared or not. In other exemplary embodiments, S3802 may determine the unshared blocks for step S3803, and if step S3803 returns YES, determine the shared blocks to be transferred in step S3810.

In step S3803, it is determined whether any unshared blocks exist (or whether all blocks are shared as exemplarily illustrated in FIG. 32 above). If step S3803 returns YES, the method may continue with step S3810 of transferring ownership of blocks which are determined to be shared between the snapshot object to be deleted and its child object and which are owned by the snapshot object to be deleted (e.g. transfer of ownership for shared blocks in this case in step S3810 can be done in some exemplary embodiments by means of e.g. touching the unshared blocks in the snapshot object then swapping the cloned-in checkpoint numbers, e.g. as explained in more detail for exemplary aspects further above), and S3809 of subsequently deleting the snapshot object metadata (and e.g. freeing unshared user data blocks).

In some exemplary embodiments, the other steps of de-cloning can be performed in the process to transfer ownership e.g. touching, swapping cloned-in checkpoints and/or decoupling the snapshot object from its clone object; however, while it is possible in principle to immediately delete the snapshot object in some embodiments, it is efficiently possible that in other exemplary embodiments a separate deletion job may then be scheduled in step S3809 to delete the snapshot object automatically later by executing the separate deletion job.

However, if step S3803 returns NO, which means that in rare cases a situation as exemplarily shown in FIG. 32 may occur in which still unshared metadata exists, it is determined in step S3804 whether unshared metadata exists, in particular exemplarily by comparing a size of metadata of the parent snapshot object to be deleted and a size of the child object's metadata. Such comparison may be performed e.g. by comparing a length of the snapshot object and the child object, wherein equal length may indicate that no unshared metadata exists and different length may indicate that unshared metadata does exist (e.g. if the metadata of the child object has been extended and its length is larger than the length of the parent snapshot object).

In step S3805, it is determined whether the size of metadata of the parent snapshot object to be deleted and the size of the child object's metadata compared in step S3804 is different, and if step S3805 returns NO (i.e. no unshared metadata), the process continues with step S3809 of deleting the snapshot object's metadata.

On the other hand, if step S3805 returns YES (i.e. there is unshared metadata), the process continues with determining the unshared metadata portions (e.g. by walking through all or only unshared branches of the object tree structure information such as discussed in exemplary embodiments above for deletion of clones).

In step S3807, it determines the blocks which are referenced by pointers of determined unshared metadata portions (e.g. pointers of unshared direct nodes such as e.g. direct node 3716, and blocks D7 and D8 in FIG. 32), and step S3808 transfers ownership of the determined blocks from the snapshot object to its child object (including the case of making ownership be remained at the child object during transfer of ownership processing). This may include updating the block pointers pointing to determined data blocks, and/or "touching" the identified unshared metadata blocks to prevent them from being disowned from the parent snapshot file e.g. when performing a swapping operation of swapping cloned-in checkpoint numbers between the child object and the snapshot object to be deleted/removed, wherein "touching" may include updating the checkpoint number with a current checkpoint number, to avoid leaking the data when deleting the snapshot object).

Then, in step S3809, the snapshot object metadata (including the unshared metadata determined in step S3806) is deleted in step S3809.

Figure 33B:
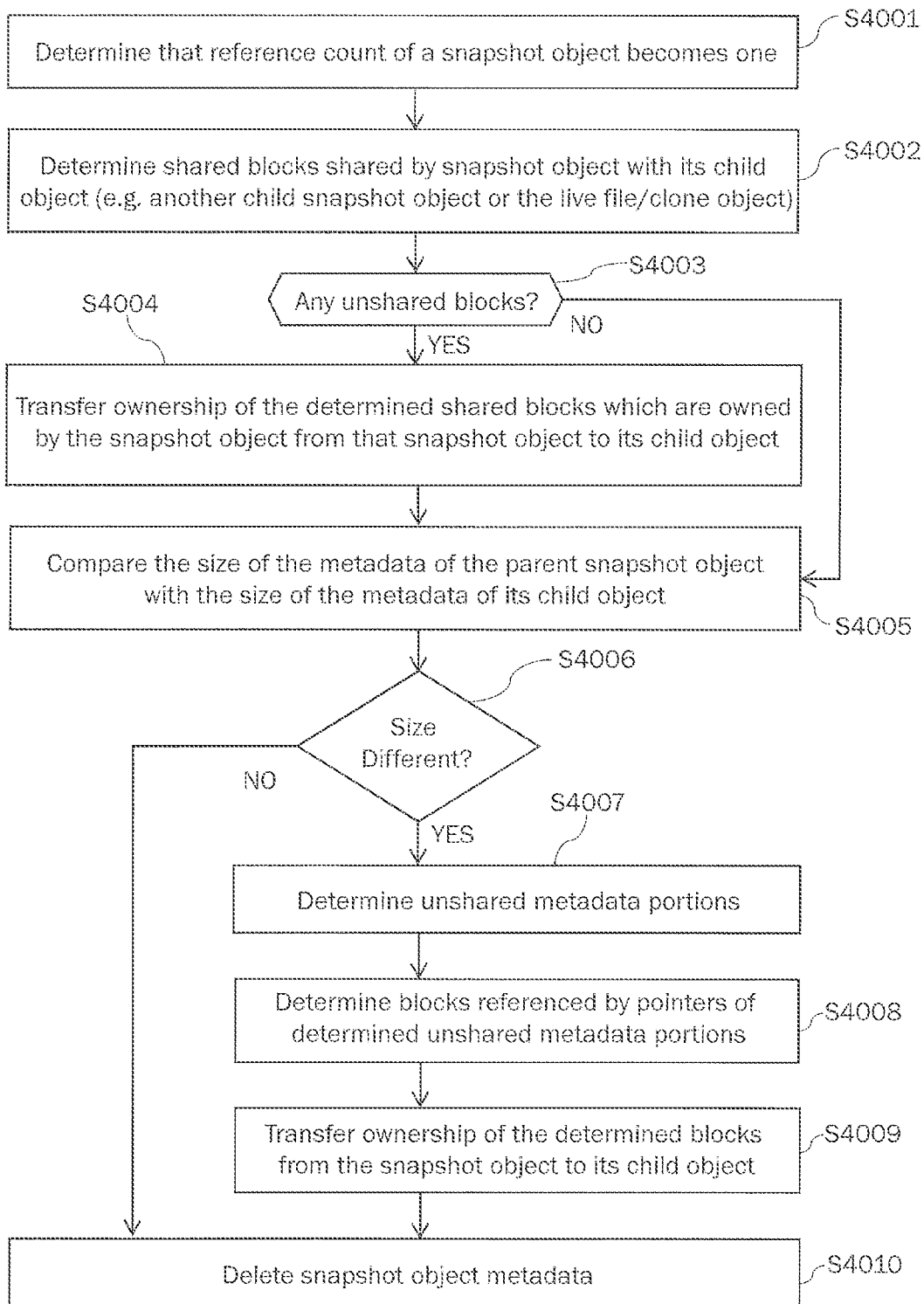
FIG. 33B is another exemplary logic flow diagram schematically illustrating another exemplary process of removing a snapshot object (and/or decloning a file and/or clone object) according to exemplary embodiments.

FIG. 33B is another exemplary logic flow diagram schematically illustrating another exemplary process of removing a snapshot object (and/or decloning a file and/or clone object) according to exemplary embodiments. Specifically, even in case there are unshared user data blocks because of divergence between the parent snapshot object to be removed and its child object, in rare cases additional unshared metadata portions may exist. Such scenarios may include a scenario in which a completely diverged clone was extended and cloned again. The below example may be even more efficient and reliable in such scenarios because unshared metadata portions are determined also in the case that unshared blocks do exist.

Similar to above exemplary embodiments, step S4001 determines that a reference count of a snapshot object has become 1 or is 1 (so that the respective snapshot object may be deleted), and the unshared data blocks are determined in step S4002 e.g. similar as in one or more of the above exemplary embodiments. In some embodiments, it may alternatively be performed by determining the shared blocks or determining, for each block of the snapshot object, whether it is shared or not. In other exemplary embodiments, S4002 may determine the unshared blocks for step S4003, and if step S4003 returns YES and/or NO, determine the shared blocks to be transferred in step S4004.

In step S4003, it is determined whether any unshared blocks exist (or whether all blocks are shared as exemplarily illustrated in FIG. 32 above).

If step S4003 returns YES, the method may continue with step S4004 of transferring ownership of blocks which are determined to be shared between the snapshot object to be deleted and its child object and which are owned by the snapshot object to be deleted (e.g. transfer of ownership for shared blocks in this case in step S4004 can be done in some exemplary embodiments by means of e.g. touching the unshared blocks in the snapshot object then swapping the cloned-in checkpoint numbers, e.g. as explained in more detail for exemplary aspects further above).

Then, it is determined in step S4005, also for the case that step S4003 returns YES, whether unshared metadata exists, in particular exemplarily by comparing a size of metadata of the parent snapshot object to be deleted and a size of the child object's metadata. Such comparison may be performed e.g. by comparing a length of the snapshot object and the child object, wherein equal length may indicate that no unshared metadata exists and different length may indicate that unshared metadata does exist (e.g. if the metadata of the child object has been extended and its length is larger than the length of the parent snapshot object)

Also if step S4003 returns NO, which means that in rare cases a situation as exemplarily shown in FIG. 32 may occur in which still unshared metadata exists, it is determined in step S4005 whether unshared metadata exists, in particular exemplarily by comparing a size of metadata of the parent snapshot object to be deleted and a size of the child object's metadata.

In step S4006, it is determined whether the size of metadata of the parent snapshot object to be deleted and the size of the child object's metadata compared in step S4005 is different, and if step S4006 returns NO (i.e. no unshared metadata), the process continues with step S4010 of deleting the snapshot object's metadata (and potentially freeing unshared user data blocks owned by the snapshot object to be deleted, if step S4003 returned YES).

On the other hand, if step S4006 returns YES (i.e. there is unshared metadata), the process continues with determining the unshared metadata portions (e.g. by walking through all or only unshared branches of the object tree structure information such as discussed in exemplary embodiments above for deletion of clones).

In step S4008, it determines the blocks which are referenced by pointers of determined unshared metadata portions, and transfers ownership of the determined blocks from the snapshot object to its child object (including the case of making ownership be remained at the child object during transfer of ownership processing) in step S4009.

This may include updating the block pointers pointing to determined data blocks, and/or "touching" the identified unshared metadata blocks to prevent them from being disowned from the parent snapshot file e.g. when performing a swapping operation of swapping cloned-in checkpoint numbers between the child object and the snapshot object to be deleted/removed, wherein "touching" may include updating the checkpoint number with a current checkpoint number, to avoid leaking the data when deleting the snapshot object).

It may be notable, that at least some partial steps of transfer of ownership may be performed simultaneously for steps S4004 and S4009, such as e.g. the swapping operation of interchanging the cloned-in checkpoint numbers of the snapshot object to be deleted and the child object with each other (swapping) may be performed only once to complete steps S4004 and S4009 in one step.

Then, in step S4010, the snapshot object metadata (including the unshared metadata determined in step S4008) is deleted (and potentially freeing unshared user data blocks owned by the snapshot object to be deleted, if step S4003 returned YES).

In some exemplary embodiments, the other steps of de-cloning can be performed in the process to transfer ownership e.g. touching, swapping cloned-in checkpoints and/or decoupling the snapshot object from its clone object; however, while it is possible in principle to immediately delete the snapshot object in some embodiments, it is efficiently possible that in other exemplary embodiments a separate deletion job may then be scheduled in steps S4010 to delete the snapshot object automatically later by executing the separate deletion job (potentially including freeing the associated blocks).

The above-described exemplary embodiments and exemplary aspects can be combined or provided as independent aspects. In particular, the present specification discloses various exemplary independent aspects and exemplary embodiments in connection with deleting clones, transfer of ownership, removing a snapshot-file and/or changing parent snapshot-files of snapshot-files in the file system, in particular for de-cloning of snapshot-files in the file system, independent of whether replication is involved or not. Furthermore, the present specification discloses various exemplary independent aspects and exemplary embodiments in connection with performing a transfer of ownership in the file system independent of whether replication is involved or not, and independent of whether the ownership is transferred from a snapshot-file to another snapshot-file or to a live file/clone. Furthermore, the present specification discloses various exemplary independent aspects and exemplary embodiments in connection with performing deletion of one or more clone objects in the file system independent of whether replication is involved or not, and independent of aspects of transfer of ownership.

5. Miscellaneous

It should be noted that headings are used above for convenience and readability of the detailed description and are not to be construed as limiting the present invention in any way.

As will be appreciated by one of skill in the art, the present invention, as described hereinabove and the accompanying figures, may be embodied as a method (e.g., a computer-implemented process, a business process, or any other process), apparatus (including a device, machine, system, computer program product, and/or any other apparatus), or a combination of the foregoing.

Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, create means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

Those skilled in the art will also appreciate, in view of this disclosure, that different embodiments of the invention described herein may be combined to form other embodiments of the invention.

The invention claimed is:

1. A non-transitory computer-readable medium storing program instructions which, when running on or loaded into a file system server or computer connected to a file system server or when being executed by one or more processors or processing units of the file system server or the computer, cause the file system server to execute a method for managing file system objects of a file system in a data storage system comprising the file system server;

wherein the file system server comprises:
a computer system including a processor configured to execute an operating system and further software components executed on the operating system, and
a programmable logic device interfacing with the computer system and including a file system management unit configured to manage a file system;
the method performing to remove a parent snapshot object, which previously referenced a first clone object that has been deleted and is currently referencing a single child snapshot object, where the parent snapshot object and the child snapshot object are not visible to a user of the file system server and where the child snapshot object references a second clone object which has not been deleted and is visible to the user, comprising:
identifying the parent snapshot object as a candidate for deletion by determining that the parent snapshot object does not currently reference any existing clone object that are visible to the user,
identifying one or more data blocks which are owned by the parent snapshot object and which are shared between the parent snapshot object and the child snapshot object,
transferring ownership of the identified data blocks from the parent snapshot object to the child snapshot object, and
deleting at least portions of the parent snapshot object after performing the transfer of ownership,
wherein deleting at least portions of the parent snapshot object comprises deleting one or more data blocks which are still owned by the parent snapshot object after performing the transfer of ownership and which are not related to any previous parent snapshot of the file system managed by the file system server;
and preserving data of one or more data blocks which are still owned by the parent snapshot object after performing the transfer of ownership, if the respective one or more data blocks are related to a previous parent snapshot of the file system managed by the file system server.

2. The non-transitory computer readable medium according to claim 1, wherein:
deleting at least portions of the parent snapshot object comprises freeing one or more data blocks which are still owned by the parent snapshot object after performing the transfer of ownership, if the respective one or more data blocks are not related to the previous parent snapshot of the file system managed by the file system server.

3. The non-transitory computer readable medium according to claim 1, the method further comprising:
relocating data of one or more data blocks which are still owned by the parent snapshot object after performing the transfer of ownership, if the respective one or more data blocks are related to the previous parent snapshot of the file system managed by the file system server, and
freeing the respective one or more data blocks after relocating the data; and/or
determining whether data blocks, which are still owned by the parent snapshot object after performing the transfer of ownership, are related to the previous parent snapshot of the file system based on a comparison of their associated block pointer's second-type checkpoint numbers and a first-type checkpoint number being associated with the previous parent snapshot of the file system.

4. The non-transitory computer readable medium according to claim 1, wherein the transferring ownership of the identified data blocks from the parent snapshot object to the child snapshot object comprises:
setting the checkpoint number of the pointers of the parent snapshot-file, that point to unshared blocks, equal to or larger than a first-type checkpoint number of the child snapshot-file; and
exchanging the first-type checkpoint number of the parent snapshot-file with the first-type checkpoint number of the child snapshot-file.

5. A non-transitory computer-readable medium having program instructions which, when running on or loaded into a file system server or computer connected to a file system server or when being executed by one or more processors or processing units of the file system server or the computer, cause the file system server to execute a method for managing file system objects of a file system in a data storage system comprising the file system server;
wherein the file system server comprises:
a computer system including a processor configured to execute an operating system and further software components executed on the operating system, and
a programmable logic device interfacing with the computer system and including a file system management unit configured to manage a file system;
the method performing to remove a parent snapshot object, which previously referenced a first clone object that has been deleted and is currently referencing a single child snapshot object, where the parent snapshot object and the child snapshot object are not visible to a user of the file system server and where the child snapshot object references a second clone object which has not been deleted and is visible to the user, comprising:
identifying the parent snapshot object as a candidate for deletion by determining that the parent snapshot object does not currently reference any existing clone object that are visible to the user,
identifying one or more data blocks which are owned by the parent snapshot object and which are shared between the parent snapshot object and the child snapshot object,
transferring ownership of the identified data blocks from the parent snapshot object to the child snapshot object, and
deleting at least portions of the parent snapshot object after performing the transfer of ownership by deleting one or more data blocks which are still owned by the parent snapshot object after performing the transfer of ownership and which are not related to any previous parent snapshot of the file system managed by the file system server,
wherein transferring ownership of the identified data blocks from the parent snapshot object to the child snapshot object is performed successively for plural groups of data blocks,
the method comprising, for each group of data blocks, holding off client access to the data blocks of the respective group of data blocks before transferring ownership of the data blocks of the respective group of data blocks.

6. The non-transitory computer readable medium according to claim 5, further comprising:
for each group of data blocks, releasing the data blocks of the respective group of data blocks for client access after transferring ownership of the data blocks of the respective group of data blocks and/or before transferring ownership of data blocks of a next group of data blocks.

7. The non-transitory computer readable medium according to claim 5, wherein:
identifying one or more data blocks which are owned by the parent snapshot object and which are shared between the parent snapshot object and the child snapshot object include:
identifying, by the computer system, one or more data blocks which are owned by the parent snapshot object and which are initially shared between the parent snapshot object prior to holding off client access to the respective data blocks, and
identifying, by the programmable logic device and among the identified initially shared data blocks, one or more data blocks which are no longer shared between the parent snapshot object and the child snapshot object based on a checkpoint number being associated with the respective data block,
wherein transferring ownership from the parent snapshot object to the child snapshot object is performed for the initially identified data blocks which are determined to be still shared when identifying, among the identified initially shared data blocks, one or more data blocks which are no longer shared between the parent snapshot object and the child snapshot object.

8. The non-transitory computer readable medium according to claim 5, wherein the transferring ownership of the identified data blocks from the parent snapshot object to the child snapshot object comprises:
setting the checkpoint number of the pointers of the parent snapshot-file, that point to unshared blocks, equal to or larger than a first-type checkpoint number of the child snapshot-file; and
exchanging the first-type checkpoint number of the parent snapshot-file with the first-type checkpoint number of the child snapshot-file.

9. A method for managing file system objects of a file system in a data storage system comprising a file system server, wherein the file system server comprises:
a computer system including a processor configured to execute an operating system and further software components executed on the operating system, and
a programmable logic device interfacing with the computer system and including a file system management unit configured to manage a file system;
the method performing to remove a parent snapshot object, which previously referenced a first clone object that has been deleted and is currently referencing a single child snapshot object, where the parent snapshot object and the child snapshot object are not visible to a user of the file system server and where the child snapshot object references a second clone object which has not been deleted and is visible to the user, comprising:
- identifying the parent snapshot object as a candidate for deletion by determining that the parent snapshot object does not currently reference any existing clone object that are visible to the user,
- identifying one or more data blocks which are owned by the parent snapshot object and which are shared between the parent snapshot object and the child snapshot object,
- transferring ownership of the identified data blocks from the parent snapshot object to the child snapshot object, and
- deleting at least portions of the parent snapshot object after performing the transfer of ownership,
- wherein deleting at least portions of the parent snapshot object comprises deleting one or more data blocks which are still owned by the parent snapshot object after performing the transfer of ownership and which are not related to any previous parent snapshot of the file system managed by the file system server; and preserving data of one or more data blocks which are still owned by the parent snapshot object after performing the transfer of ownership, if the respective one or more data blocks are related to a previous parent snapshot of the file system managed by the file system server.

10. The method according to claim 9, wherein the transferring ownership of the identified data blocks from the parent snapshot object to the child snapshot object comprises:
- setting the checkpoint number of the pointers of the parent snapshot-file, that point to unshared blocks, equal to or larger than a first-type checkpoint number of the child snapshot-file; and
- exchanging the first-type checkpoint number of the parent snapshot-file with the first-type checkpoint number of the child snapshot-file.

11. A method for managing file system objects of a file system in a data storage system comprising a file system server, wherein the file system server comprises:
- a computer system including a processor configured to execute an operating system and further software components executed on the operating system, and
- a programmable logic device interfacing with the computer system and including a file system management unit configured to manage a file system;
- the method performing to remove a parent snapshot object, which previously referenced a first clone object that has been deleted and is currently referencing a single child snapshot object, where the parent snapshot object and the child snapshot object are not visible to a user of the file system server and where the child snapshot object references a second clone object which has not been deleted and is visible to the user, comprising:
  - identifying the parent snapshot object as a candidate for deletion by determining that the parent snapshot object does not currently reference any existing clone object that are visible to the user,
  - identifying one or more data blocks which are owned by the parent snapshot object and which are shared between the parent snapshot object and the child object,
  - transferring ownership of the identified data blocks from the parent snapshot object to the child snapshot object, and
  - deleting at least portions of the parent snapshot object after performing the transfer of ownership by deleting one or more data blocks which are still owned by the parent snapshot object after performing the transfer of ownership and which are not related to any previous parent snapshot of the file system managed by the file system server,
- wherein transferring ownership of the identified data blocks from the parent snapshot object to the child snapshot object is performed successively for plural groups of data blocks,
- the method comprising, for each group of data blocks, holding off client access to the data blocks of the respective group of data blocks before transferring ownership of the data blocks of the respective group of data blocks.

12. The method according to claim 11, wherein the transferring ownership of the identified data blocks from the parent snapshot object to the child snapshot object comprises:
- setting the checkpoint number of the pointers of the parent snapshot-file, that point to unshared blocks, equal to or larger than a first-type checkpoint number of the child snapshot-file; and
- exchanging the first-type checkpoint number of the parent snapshot-file with the first-type checkpoint number of the child snapshot-file.

\* \* \* \* \*